United States Patent
Komatsu et al.

(10) Patent No.: US 9,757,827 B2
(45) Date of Patent: Sep. 12, 2017

(54) TIRE MOUNTING METHOD USING A TIRE MOUNTING DEVICE

(71) Applicant: HONDA MOTOR CO., LTD., Minato-ku, Tokyo (JP)

(72) Inventors: Saeko Komatsu, Utsunomiya (JP); Yoshito Otake, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 14/295,240

(22) Filed: Jun. 3, 2014

(65) Prior Publication Data
US 2014/0310933 A1   Oct. 23, 2014

Related U.S. Application Data

(62) Division of application No. 12/863,156, filed as application No. PCT/JP2009/050527 on Jan. 16, 2009, now Pat. No. 8,776,345.

(30) Foreign Application Priority Data

Jan. 30, 2008 (JP) ................ 2008-019126
Jan. 30, 2008 (JP) ................ 2008-019131
(Continued)

(51) Int. Cl.
*B23P 19/00* (2006.01)
*B23P 19/04* (2006.01)
(Continued)

(52) U.S. Cl.
CPC ........... *B23P 19/04* (2013.01); *B23P 19/06* (2013.01); *B23P 19/069* (2013.01); *B23P 21/00* (2013.01);
(Continued)

(58) Field of Classification Search
CPC ........... B23P 19/04; B23P 19/06; B23P 21/00; B23P 19/069; B62D 65/024; B62D 65/12;
(Continued)

(56) References Cited

U.S. PATENT DOCUMENTS 3,491,427 A   1/1970   Zimmerman et al.
4,841,632 A   6/1989   Namiki et al.
(Continued)

FOREIGN PATENT DOCUMENTS

CN   101247984 A   8/2008
JP   58-143774   9/1983
(Continued)

OTHER PUBLICATIONS

U.S. Office Action, U.S. Appl. No. 14/295,254, issued Mar. 7, 2016, 10 pages.
(Continued)

*Primary Examiner* — Richard Chang
(74) *Attorney, Agent, or Firm* — Rankin, Hill & Clark LLP

(57) ABSTRACT

A tire mounting method is provided for automatically mounting a tire onto hub bolts of a motor vehicle. The method includes gripping the tire and temporarily tightening nuts on the hub bolts on which the tire has been placed with a first working mechanism. The nuts that have been temporarily tightened by the first working mechanism are fully tightened with a second working mechanism, which is disposed in association with a first mounting region on a front wheel side or on a rear wheel side of the motor vehicle. The nuts that have been temporarily tightened by the first working mechanism are fully tightened with a third working mechanism, which is disposed in association with a second mounting region on the rear wheel side or on the front wheel side of the motor vehicle.

4 Claims, 44 Drawing Sheets

(30) Foreign Application Priority Data

| Feb. 1, 2008 | (JP) | ................................. | 2008-022395 |
| Jul. 3, 2008 | (JP) | ................................. | 2008-174717 |
| Jul. 3, 2008 | (JP) | ................................. | 2008-174722 |
| Jul. 3, 2008 | (JP) | ................................. | 2008-174726 |

(51) Int. Cl.

| *B23P 19/06* | (2006.01) |
| *B25J 15/10* | (2006.01) |
| *B62D 65/12* | (2006.01) |
| *B23P 21/00* | (2006.01) |
| *B62D 65/02* | (2006.01) |

(52) U.S. Cl.
CPC ............ *B25J 15/10* (2013.01); *B62D 65/024* (2013.01); *B62D 65/12* (2013.01); *B23P 2700/50* (2013.01); *Y10T 29/49764* (2015.01); *Y10T 29/49769* (2015.01); *Y10T 29/49829* (2015.01); *Y10T 29/49948* (2015.01); *Y10T 29/53039* (2015.01); *Y10T 29/53052* (2015.01); *Y10T 29/53383* (2015.01); *Y10T 29/53417* (2015.01); *Y10T 29/53687* (2015.01); *Y10T 29/53922* (2015.01)

(58) Field of Classification Search
CPC .................. B25J 15/10; Y10T 29/9769; Y10T 29/53383; Y10T 29/53687; Y10T 29/49948; Y10T 29/53052; Y10T 29/49829; Y10T 29/53922; Y10T 29/53039; Y10T 29/53
See application file for complete search history.

(56) References Cited

U.S. PATENT DOCUMENTS

| 5,125,298 | A | * | 6/1992 | Smith | ................... | B23P 19/006 |
| | | | | | | 29/798 |
| 5,257,443 | A | | 11/1993 | Tanimura et al. | | |
| 5,345,675 | A | | 9/1994 | Yamanaka et al. | | |
| 5,509,190 | A | * | 4/1996 | Nakagawa | .............. | B23P 19/10 |
| | | | | | | 29/712 |
| 5,640,750 | A | * | 6/1997 | Yoshida | ............... | B23Q 7/1426 |
| | | | | | | 29/281.5 |
| 6,196,089 | B1 | | 3/2001 | Choi | | |
| 2009/0297301 | A1 | | 12/2009 | Shim et al. | | |

FOREIGN PATENT DOCUMENTS

| JP | 01-150102 U | 10/1989 |
| JP | 03-239433 A | 10/1991 |
| JP | 4-45637 U | 4/1992 |
| JP | 05-340107 A | 12/1993 |
| JP | 08-142947 A | 6/1996 |
| JP | 09-001492 A | 1/1997 |
| JP | 11-019833 A | 1/1999 |
| JP | 2000-210825 A | 8/2000 |
| JP | 2001-139300 A | 5/2001 |
| JP | 2004-058196 A | 2/2004 |
| JP | 2007-030165 A | 2/2007 |

OTHER PUBLICATIONS

U.S. Office Action dated Nov. 22, 2016 issued in U.S. Appl. No. 14/295,246, filed Jun. 3, 2014, 7 pages.

\* cited by examiner

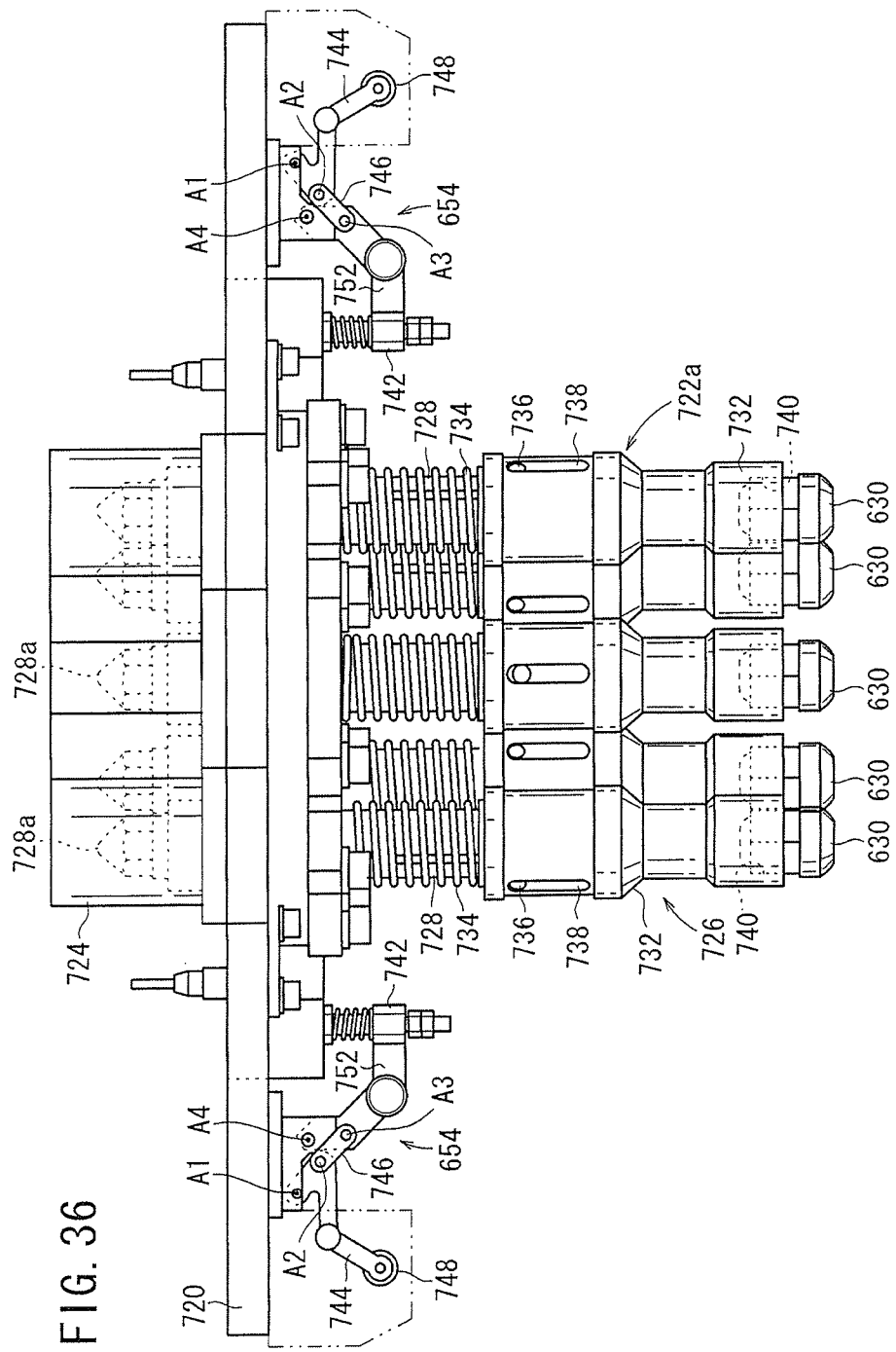

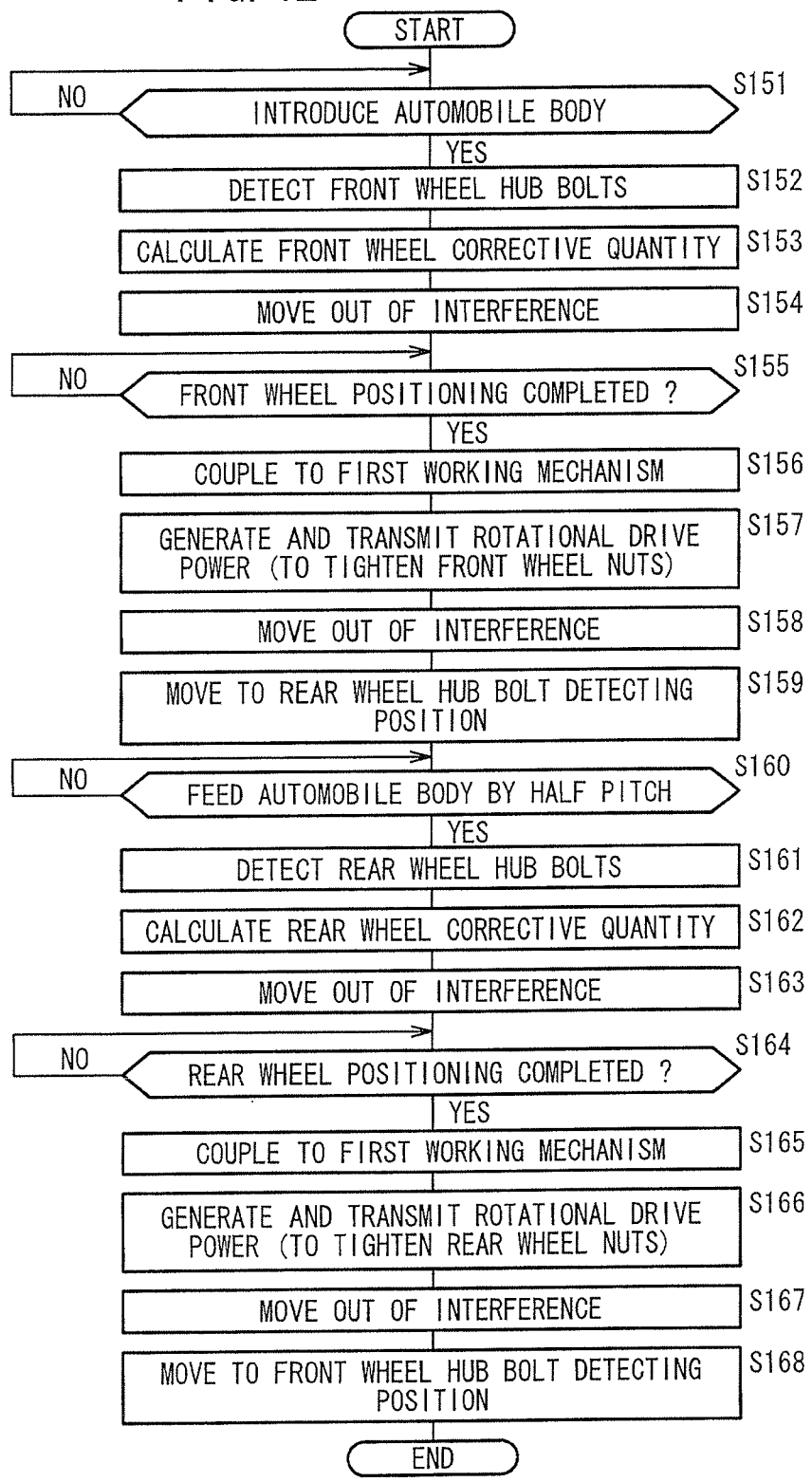

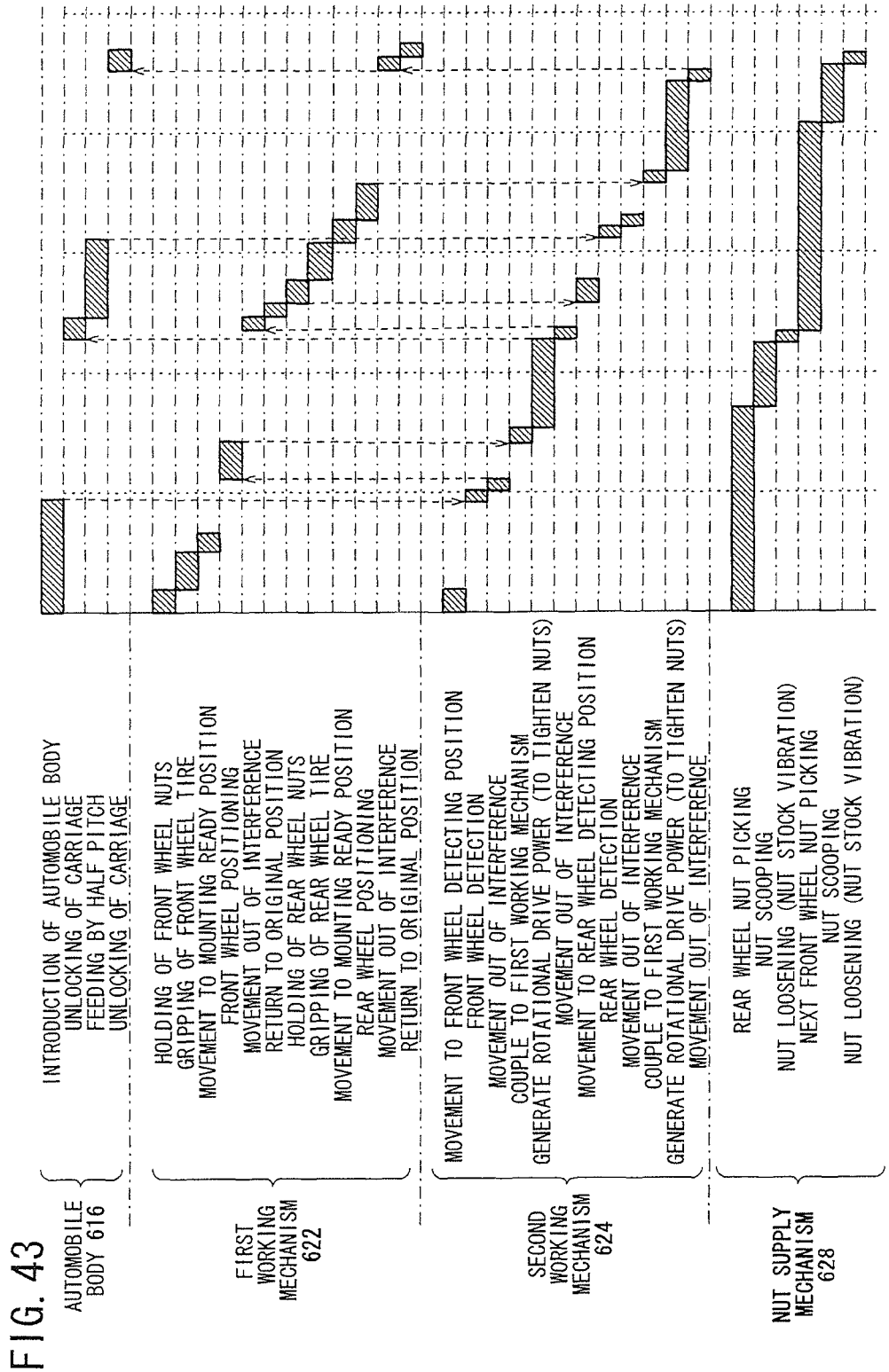

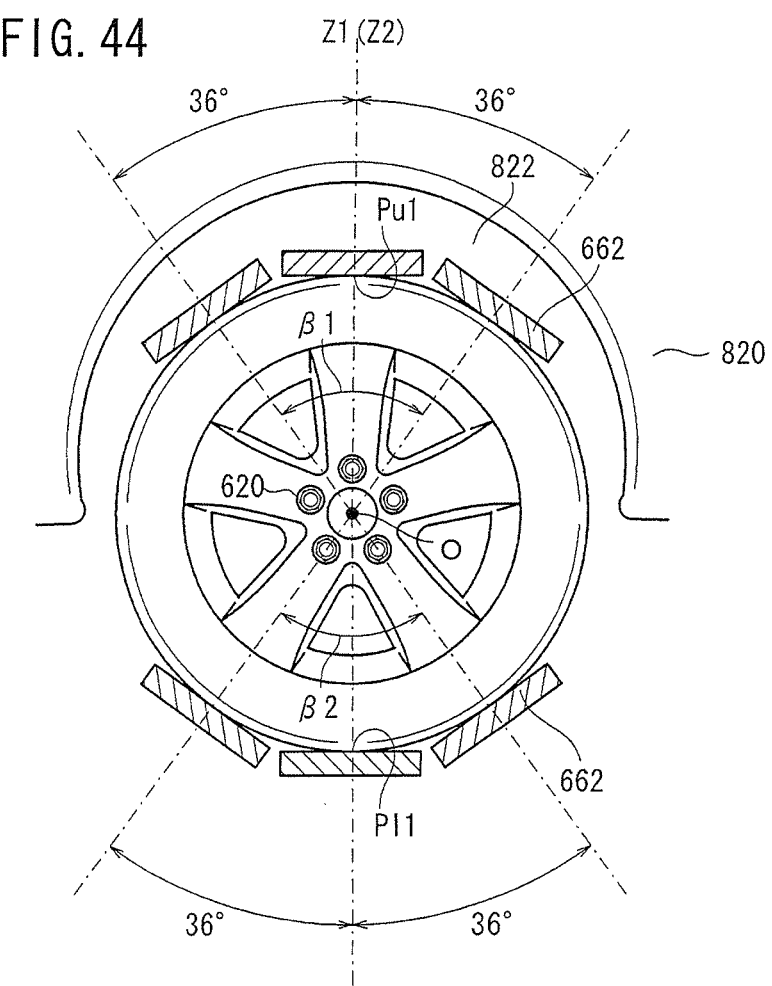

TIRE MOUNTING METHOD USING A TIRE MOUNTING DEVICE

CROSS REFERENCE TO RELATED APPLICATION(S)

This application is a Divisional of U.S. application Ser. No. 12/863,156, filed Jul. 15, 2010, which claims the benefit of priority to National Stage entry of International Application PCT/JP2009/050527, filed Jan. 16, 2009. The disclosures of the prior applications are hereby incorporated in their entirety by reference.

TECHNICAL FIELD

The present invention relates to a tire mounting apparatus (device) and a tire mounting method for automatically mounting a tire onto the hub bolts of a motor vehicle. The present invention is also concerned with a working apparatus (device) and a working method for automatically performing a predetermined working operation on a workpiece.

BACKGROUND ART

Automobile assembling lines, for example, include a working process for automatically mounting a tire, which is one type of heavy component, onto an automobile body using a robot.

A tire mounting apparatus, which is applied to a working process of the type described above, usually has a tire gripper for gripping the tire, and a plurality of nut runners for tightening hub nuts onto the hub bolts of an automobile body.

As disclosed in Japanese Laid-Open Patent Publication No. 2000-210825, a tire mounting apparatus of the type described above includes a plurality of nut runners capable of placing as many nuts as the number of hub bolts of the motor vehicle at given circumferential intervals, a tire mounting mechanism for automatically mounting a tire onto the motor vehicle, a nut supply mechanism for supplying nuts in a vertical attitude one by one, and a nut arraying mechanism for placing the nuts supplied from the nut supply mechanism in a circular pattern at intervals corresponding to the circumferential intervals at which the nut runners are disposed in a circular pattern, and transferring the nuts to the nut runners.

DISCLOSURE OF INVENTION

In the above tire mounting apparatus, the tire gripping means for gripping the tire and the nut runners for fastening the tire to the motor vehicle are installed on a single robot.

In the above tire mounting apparatus, the tire gripping means for gripping the tire and the nut runners for fastening the tire to the motor vehicle are installed on a single robot.

Recently, it has been desired to scale down and simplify various apparatus, as well as the above tire mounting apparatus, in their entirety.

Recently, in view of the design of the vehicle, etc., it also has been desired to reduce the clearance between the fenders and the tires.

The present invention has been made to meet the above demands. It is an object of the present invention to provide a tire mounting apparatus and a tire mounting method, which are capable of efficiently performing an automatic tire assembling operation with a simple and compact arrangement.

Another object of the present invention is to provide a working apparatus and a working method, which are capable of efficiently performing a predetermined working operation with a simple and compact arrangement.

Still another object of the present invention is to provide a tire mounting apparatus and a tire mounting method, which are capable of mounting a tire relatively simply on a motor vehicle having a small clearance between the tire and the fender.

Yet another object of the present invention is to provide a tire mounting apparatus and a tire mounting method, which can be reduced in overall size and cost.

The present invention is concerned with a tire mounting apparatus for automatically mounting a tire onto the hub bolts of a motor vehicle.

The tire mounting apparatus comprises a first working mechanism including tire gripping means for gripping the tire and temporary tightening means for temporarily tightening nuts on the hub bolts on which the tire has been placed, and a second working mechanism including full tightening means for fully tightening the nuts that have been temporarily tightened.

According to the present invention, the first working mechanism includes the tire gripping means and the temporary tightening means, and the second working mechanism includes the full tightening means. Consequently, the first working mechanism and the second working mechanism are effectively made smaller and simpler than if only a single working mechanism were to include a tire gripping means and tightening means (nut runners).

Since the first working mechanism includes the temporary tightening means, the actuator (e.g., a motor) thereof is much smaller and lighter than if a tightening means were to tighten the nuts both temporarily and fully, thus easily allowing the entire first working mechanism to be made smaller and lighter.

Furthermore, the first working mechanism and the second working mechanism share the tire mounting operation. Therefore, a plurality of operation sequences can be performed concurrently, and the overall tire mounting control process can be made shorter and more efficient.

In the tire mounting apparatus, the second working mechanism should preferably include a detection sensor for detecting positions of the hub bolts of the motor vehicle.

The tire mounting apparatus should preferably further comprise a bolt hole detection sensor for detecting bolt holes of the tire, which is disposed in a tire supply, and a control mechanism for processing hub bolt position information of the motor vehicle and bolt hole position information of the tire, and controlling operation of the first working mechanism.

In the tire mounting apparatus, the temporary tightening means should preferably comprise a plurality of detachable nut runners, and a single rotational drive source for rotating the nut runners in unison with each other.

In the tire mounting apparatus, the full tightening means should preferably comprise two nut runners, and an interval adjuster for adjusting an interval between the two nut runners.

The tire mounting apparatus should preferably further comprise a third working mechanism for arraying the nuts in relation to the temporary tightening means.

The present invention is also concerned with a tire mounting method for automatically mounting a tire onto the hub bolts of a motor vehicle.

The tire mounting method comprises the steps of gripping the tire and temporarily tightening nuts on the hub bolts on which the tire has been placed with a first working mechanism, and fully tightening the nuts, which have been temporarily tightened by the first working mechanism, with a second working mechanism.

In the tire mounting method, the first working mechanism and the second working mechanism should preferably operate out of interference with each other.

The tire mounting method should preferably further comprise the step of detecting positions of the hub bolts of the motor vehicle with the second working mechanism.

The tire mounting method should preferably further comprise the steps of detecting bolt holes of the tire, which is disposed in a tire supply, and controlling operation of the first working mechanism based on hub bolt position information of the motor vehicle and bolt hole position information of the tire.

In the tire mounting method, preferably, the first working mechanism and the second working mechanism are disposed in a tire mounting station, and the motor vehicle is intermittently fed such that the hub bolts for a front wheel and the hub bolts for a rear wheel are successively placed in the tire mounting station.

The present invention further is concerned with a tire mounting apparatus for automatically mounting a tire onto the hub bolts of a motor vehicle. The tire mounting apparatus comprises a first working mechanism including tire gripping means for gripping the tire, and temporary tightening means for temporarily tightening nuts on the hub bolts on which the tire has been placed, a second working mechanism disposed in association with a first mounting region on a front wheel side or on a rear wheel side of the motor vehicle and including first full tightening means for fully tightening the nuts, which have been temporarily tightened, and a third working mechanism disposed in association with a second mounting region on the rear wheel side or on the front wheel side of the motor vehicle and including second full tightening means for fully tightening the nuts, which have been temporarily tightened.

According to the present invention, the first working mechanism includes the tire gripping means and the temporary tightening means, the second working mechanism includes the first full tightening means, and the third working mechanism includes the second full tightening means. Consequently, the first working mechanism, the second working mechanism, and the third working mechanism are effectively made smaller and simpler than if only a single working mechanism were to include a tire gripping means and tightening means (nut runners).

Since the first working mechanism includes the temporary tightening means, the actuator (e.g., a motor) thereof is much smaller and lighter than if a tightening means were to tighten the nuts both temporarily and fully, thus easily allowing the entire first working mechanism to be made smaller and lighter.

Furthermore, the first working mechanism, the second working mechanism, and the third working mechanism share the tire mounting operation. Therefore, a plurality of operation sequences can be performed concurrently, and the overall tire mounting control process can be made shorter and more efficient.

The second working mechanism should preferably include a first detection sensor for detecting positions of the hub bolts in the first mounting region, and the third working mechanism should preferably include a second detection sensor for detecting positions of the hub bolts in the second mounting region.

The tire mounting apparatus should preferably further comprise a third detection sensor for detecting bolt holes of the tire, which is disposed in a tire supply, and a control mechanism for processing position information from the first through third detection sensors and controlling operation of the first working mechanism.

The temporary tightening means should preferably comprise a plurality of detachable nut runners, and a single rotational drive source for rotating the nut runners in unison with each other.

Each of the first full tightening means and the second full tightening means should preferably comprise two nut runners, and an interval adjuster for adjusting an interval between the two nut runners.

The present invention also is concerned with a tire mounting method for automatically mounting a tire onto the hub bolts of a motor vehicle.

The tire mounting method comprises the steps of gripping the tire and temporarily tightening nuts on the hub bolts on which the tire has been placed with a first working mechanism, fully tightening the nuts that have been temporarily tightened by the first working mechanism with a second working mechanism, which is disposed in association with a first mounting region on a front wheel side or on a rear wheel side of the motor vehicle, and fully tightening the nuts that have been temporarily tightened by the first working mechanism with a third working mechanism, which is disposed in association with a second mounting region on the rear wheel side or on the front wheel side of the motor vehicle.

The first working mechanism, the second working mechanism, and the third working mechanism should preferably operate out of interference with each other.

The tire mounting method should preferably further comprise the step of detecting positions of the hub bolts in the first mounting region with the second working mechanism, and detecting positions of the hub bolts in the second mounting region with the third working mechanism.

The tire mounting method should preferably further comprise the steps of detecting bolt holes of the tire, which is disposed in a tire supply, and controlling operation of the first working mechanism based on the positions of the hub bolts in the first mounting region and the second mounting region, and positions of the bolt holes of the tire.

A working apparatus according to the present invention comprises a working unit for performing a working sequence on a workpiece, a first working mechanism for bearing the weight of the working unit, the working unit being movably mounted on the first working mechanism, and a second working mechanism for automatically operating the working unit according to the working sequence, the second working mechanism being detachably coupled to the working unit or to a portion of the first working mechanism.

According to the present invention, since the first working mechanism bears the weight of the working unit, when the second working mechanism actually causes the working unit to operate, the load imposed on the second working mechanism by the working unit is effectively reduced. The second working mechanism can thus be reduced in size, thereby easily making the working apparatus smaller and simpler in its entirety.

When the second working mechanism is shut down for maintenance or the like, the second working mechanism can be released from the working unit or from the first working mechanism. The operator is thus able to operate the working unit easily while being assisted by the first working mechanism.

The first working mechanism should preferably comprise a balancer mechanism or a multijoint robot.

The working unit should preferably include a nut runner for automatically tightening nuts on hub bolts of a motor vehicle on which a tire is mounted.

A working method according to the present invention comprises the steps of mounting a working unit for performing a working sequence on a workpiece on a first working mechanism for bearing the weight of the working unit, the working unit being movably mounted on the first working mechanism, coupling a second working mechanism detachably to the working unit or to a portion of the first working mechanism, and automatically operating the working unit mounted on the first working mechanism according to the working sequence with the second working mechanism.

A tire mounting method according to the present invention is carried out by a tire mounting apparatus including a tire feed mechanism having a pair of arms for gripping a tire, and a nut tightening mechanism for tightening a plurality of nuts respectively onto a plurality of hub bolts. The tire mounting method comprises a tire gripping step of gripping the tire with the pair of arms, a tire positioning step of positioning the tire with respect to a tire mounting region of a motor vehicle with the pair of arms, and a nut tightening step of tightening the nuts respectively on the hub bolts with the nut tightening mechanism while the tire is gripped by the pair of arms, wherein the pair of arms grip the tire at positions limited to upper and lower portions of the tire in the tire positioning step and the nut tightening step.

According to the present invention, a tire can relatively easily be installed on the motor vehicle, even if the clearance between the tire and the fender is small.

More specifically, when the tire is not in contact with the ground, the tire and the tire mounting region are biased by suspensions, and are positioned lower than when the tire is in contact with the ground, because the tire is not subject to reactive forces from the ground. Therefore, the clearance between the tire mounting region (particularly an upper portion thereof) and the fender before the tire is mounted is greater than the clearance after the tire has been mounted and is held in contact with the ground. According to the present invention, during the process of positioning the tire in the tire mounting region (tire positioning process), and during the process of tightening nuts onto the hub bolts (nut tightening process), the positions where the pair of gripper arms grip the tire are limited to upper and lower portions of the tire. When the tire is in contact with the ground, even if clearances between the left, right, and upper portions of the tire and the fender are small, thus making it difficult to grip the tire with either one of the gripper arms, it is still possible to grip the tire in the clearance, and hence the tire can be mounted on the motor vehicle relatively easily.

The upper portion of the tire comprises a portion, which includes an uppermost region of the tire, and which has a symmetric axis represented by a hypothetical axis that extends through the center of the tire and the uppermost region of the tire, and which corresponds to a first central angle equal to an angle produced by dividing 360° by the number of bolt holes of the tire. Further, the lower portion of the tire comprises a portion, which includes a lowermost region of the tire, and which has a symmetric axis represented by the hypothetical axis, and which corresponds to a second central angle equal to an angle produced by dividing 360° by the number of bolt holes of the tire. The number of bolt holes of the tire is 4 or more.

It is thus possible to establish an appropriate limited range, taking into account the relationship between positions where the pair of arms grip the tire and the bolt holes of the tire.

More specifically, the bolt holes generally are positioned at equal angles along a circle represented thereby. A bolt hole, which is disposed in the uppermost position along the height of the motor vehicle, is present within a range between certain angles on the circle from the uppermost position on the circle. Since the angle between two adjacent bolt holes is calculated by dividing 360° by the number of bolt holes, the aforementioned certain angles have positive and negative values, each produced by dividing the angle between two adjacent bolt holes by 2 (i.e., an angle produced by dividing 180° by the number of bolt holes). For bringing the positions (rotational angles) of the bolt holes and the hub bolts into alignment with each other, while limiting the positions where the pair of arms grip the tire to upper and lower portions of the tire, one of the arms is capable of gripping a portion of the tire, which includes an uppermost region of the tire, which has a symmetric axis represented by a hypothetical axis interconnecting the center of the tire and the uppermost region, and which corresponds to a first central angle equal to an angle produced by dividing 360° by the number of bolt holes of the tire. Further, the other of the arms may grip a portion of the tire, which includes a lowermost region of the tire, which has a symmetric axis represented by the hypothetical axis, and which corresponds to a second central angle equal to an angle produced by dividing 360° by the number of bolt holes of the tire. Consequently, by limiting the positions where the pair of arms grip the tire to upper and lower portions of the tire, it is possible to establish an appropriate limited range, taking into account the relationship between the positions where the pair of arms grip the tire and the bolt holes of the tire.

The tire mounting method further comprises a bolt hole position information acquiring step for detecting the bolt holes of the tire and acquiring bolt hole position information, a tire positioning step for positioning the tire in front of the tire mounting region of the motor vehicle while uppermost and lowermost regions of the tire are gripped by the pair of arms, a hub bolt position information acquiring step for detecting the hub bolts and acquiring hub bolt position information, a rotational angle calculating step for calculating a rotational angle of the tire for positionally aligning the bolt holes and the hub bolts with each other, and a tire rotating step for rotating the tire through the calculated rotational angle, wherein the rotational angle of the tire is limited to within a value produced by dividing 180° by the number of hub bolts in the rotational angle calculating step.

After the tire has been positioned in front of the tire mounting region, therefore, rotation of the tire is minimized. The efficiency at which the tire is mounted can thus be increased.

A tire mounting apparatus according to the present invention comprises a tire feed mechanism having a pair of arms for gripping a tire, and a nut tightening mechanism for tightening a plurality of nuts respectively onto a plurality of hub bolts, wherein the tire is positioned with respect to a tire mounting region of a motor vehicle by the pair of arms, the nuts are tightened respectively on the hub bolts with the nut tightening mechanism while the tire is gripped by the pair of arms, and the pair of arms grip the tire at positions limited to upper and lower portions of the tire when the tire is positioned and the nuts are tightened.

According to the present invention, a tire can relatively easily be installed on the motor vehicle, even if the clearance between the tire and the fender is small.

More specifically, when the tire is not in contact with the ground, the tire and the tire mounting region are biased by suspensions, and are positioned lower than when the tire is in contact with the ground, because the tire is not subject to reactive forces from the ground. Therefore, the clearance between the tire mounting region (particularly an upper portion thereof) and the fender before the tire is mounted is greater than the clearance after the tire has been mounted and is held in contact with the ground. According to the present invention, during the process of bringing a tire into abutment against a tire mounting region (tire abutting process), and during the process of tightening nuts on hub bolts (nut tightening process), the positions where the pair of gripper arms grip the tire are limited to upper and lower portions of the tire. When the tire is in contact with the ground, even if the clearances between left, right, and upper portions of the tire and the fender are small, thereby making it difficult to grip the tire with either one of the gripper arms, it is still possible to grip the tire in the clearance, and hence the tire can be mounted on the motor vehicle relatively easily.

The upper portion of the tire comprises a portion, which includes an uppermost region of the tire and which has a symmetric axis represented by a hypothetical axis extending through the center of the tire and the uppermost region of the tire, and which corresponds to a first central angle equal to an angle produced by dividing 360° by the number of bolt holes of the tire. Further, the lower portion of the tire comprises a portion, which includes a lowermost region of the tire and which has a symmetric axis represented by the hypothetical axis, and which corresponds to a second central angle equal to an angle produced by dividing 360° by the number of bolt holes of the tire. The number of bolt holes of the tire is 4 or more.

It is thus possible to establish an appropriate limited range, while taking into account the relationship between positions where the pair of arms grip the tire and the bolt holes of the tire.

More specifically, the bolt holes generally are positioned at equal angles along a circle represented thereby. The bolt hole that is disposed in the uppermost position along the height of the motor vehicle is present in a range between certain angles on the circle from the uppermost position on the circle. Since the angle between two adjacent bolt holes is calculated by dividing 360° by the number of bolt holes, the aforementioned certain angles have positive and negative values, each produced by dividing the angle between two adjacent bolt holes by 2 (an angle produced by dividing 180° by the number of bolt holes). For bringing the positions (rotational angles) of the bolt holes and the hub bolts into alignment with each other, while also limiting the positions where the pair of arms grip the tire to upper and lower portions of the tire, one of the arms may grip a portion of the tire, which includes an uppermost region of the tire, which has a symmetric axis represented by a hypothetical axis interconnecting the center of the tire and the uppermost region, and which corresponds to a first central angle equal to an angle produced by dividing 360° by the number of bolt holes of the tire. The other of the arms may grip a portion of the tire, which includes a lowermost region of the tire, which has a symmetric axis represented by the hypothetical axis, and which corresponds to a second central angle equal to an angle produced by dividing 360° by the number of bolt holes of the tire. Consequently, by limiting the positions where the pair of arms grip the tire to upper and lower portions of the tire, it is possible to establish an appropriate limited range, while taking into account the relationship between the positions where the pair of arms grip the tire and the bolt holes of the tire.

A tire mounting apparatus according to the present invention comprises a rotational drive power generator for generating rotational drive power for tightening nuts, a first tightening unit including a plurality of nut tighteners for tightening the nuts onto hub bolts, a second tightening unit including a plurality of nut tighteners in a layout different from the first tightening unit, the second tightening unit being replaceable by the first tightening unit, and a rotational drive power transmitter for transmitting rotational drive power from the rotational drive power generator to the first tightening unit or to the second tightening unit, wherein the rotational drive power transmitter includes an offsetting mechanism for offsetting a rotational axis along which the rotational drive power is transmitted, thereby transmitting rotational drive power to the nut tighteners of the first tightening unit and the nut tighteners of the second tightening unit.

According to the present invention, the rotational axis along which rotational drive power for tightening the nuts is transmitted is offset. Therefore, it is possible to transmit rotational drive power to the nut tightening units (the first tightening unit and the second tightening unit) while the nut tighteners are positioned in different layouts. Rotational drive power that is needed to tighten the nuts with the nut tightening units can thus be supplied from a single rotational drive power generator. Stated otherwise, even though a plurality of rotational drive power generators are not provided, tires can be mounted onto a plurality of automobile bodies the hub bolts and bolt holes of which have different layouts, by replacing one of the first and second nut tightening units with the other. Accordingly, the tire mounting apparatus can be reduced in size and cost overall.

The offsetting mechanism may comprise a plurality of first shaft members coupled to the rotational drive power generator, a plurality of second shaft members coupled to the nut tighteners, and a plurality of universal joint mechanisms disposed on the first shaft members or the second shaft members and coupling the first shaft members and the second shaft members to each other.

The first shaft members or the second shaft members have one of protruding portions with tapered distal ends and tubular sockets for engagement with the protruding portions, and the universal joint mechanisms include the other of the protruding portions and the tubular sockets. When the protruding portions and the tubular sockets engage with each other, the first shaft members or the second shaft members and the universal joint mechanisms become coupled to each other for transmitting rotational drive power.

Therefore, even if axes of the first shaft member and the second shaft member are offset from each other, the protruding portions and the tubular sockets engage with each other in order to transmit rotational drive power through the universal joint.

According to the present invention, a tire mounting method is carried out by a first tightening unit including a plurality of nut tighteners for tightening nuts onto hub bolts, and a second tightening unit including a plurality of nut tighteners in a layout different from the first tightening unit, the second tightening unit being replaceable by the first tightening unit. The tire mounting method comprises a rotational drive power generating step of generating rotational drive power for tightening the nuts, and a rotational drive power transmitting step of transmitting rotational drive power from the rotational drive power generator to the nut tighteners of the first tightening unit or the second tightening unit, wherein a rotational axis along which the rotational drive power is transmitted is offset when at least one of the first tightening unit and the second tightening unit is used in the rotational drive power transmitting step.

According to the present invention, the rotational axis along which rotational drive power for tightening the nuts is transmitted is offset. Therefore, it is possible to transmit rotational drive power to the nut tightening units (the first tightening unit and the second tightening unit) while the nut tighteners are positioned in different layouts. The rotational drive power that is needed to tighten the nuts with the nut tightening units can thus be supplied from a single rotational drive power generator. Stated otherwise, even though a plurality of rotational drive power generators are not provided, tires can be mounted on a plurality of automobile bodies in which the hub bolts and bolt holes have different layouts, by replacing one of the first and second nut tightening units with the other. Accordingly, the tire mounting apparatus can be reduced in size and cost overall.

According to the present invention, a tire mounting method is carried out by a tire mounting apparatus including a first working mechanism having tire grippers and nut tighteners, and a second working mechanism for generating rotational drive power in order to tighten nuts. The tire mounting method comprises a nut holding step of holding a plurality of nuts on the nut tighteners of the first working mechanism, a tire gripping step of gripping a tire with the tire grippers of the first working mechanism, a tire positioning step of positioning the tire with respect to a tire mounting region of a motor vehicle with the first working mechanism, and a nut tightening step of transmitting rotational drive power from the second working mechanism to the nut tighteners of the first working mechanism in order to tighten the nuts respectively onto a plurality of hub bolts of the motor vehicle while the tire is gripped by the tire grippers.

According to the present invention, the first working mechanism grips a tire and tightens nuts, and the second working mechanism generates rotational drive power for tightening the nuts, and transmits rotational drive power to the first working mechanism in order to tighten the nuts. Consequently, the first working mechanism and the second working mechanism are effectively made smaller and simpler than if the tire were gripped and the nuts were tightened by only a single working mechanism. Since the tire is gripped and the nuts are tightened by a single working mechanism (first working mechanism), the tire and the nuts are less likely to change their relative positions, thus making it possible to easily identify positions where the nuts are to be tightened.

The first working mechanism places the nuts respectively in association with the hub bolts, and the nut tightening step is performed while the tire grippers are fixed in position. In the nut tightening process, therefore, it is possible to keep the first working mechanism in a constant attitude, and to control the first working mechanism with ease.

A tire mounting apparatus according to the present invention comprises a first working mechanism having tire grippers and nut tighteners, and a second working mechanism for generating rotational drive power to tighten nuts and for transmitting rotational drive power to the nut tighteners, wherein the rotational drive power is transmitted from the second working mechanism to the nut tighteners of the first working mechanism in order to tighten the nuts onto hub bolts of a motor vehicle while a tire is gripped by the tire grippers.

According to the present invention, the first working mechanism grips a tire and tightens nuts, and the second working mechanism generates rotational drive power for tightening the nuts, and transmits rotational drive power to the first working mechanism in order to tighten the nuts. Consequently, the first working mechanism and the second working mechanism are effectively made smaller and simpler than if the tire were gripped and the nuts were tightened by only a single working mechanism. Since the tire is gripped and the nuts are tightened by a single working mechanism (first working mechanism), the tire and the nuts are less likely to change their relative positions, thus making it possible to easily identify positions where the nuts are to be tightened.

The nut tighteners hold the nuts respectively on the hub bolts. When the nuts are tightened, therefore, it is possible to keep the first working mechanism in a constant attitude, and to control the first working mechanism with ease.

The second working mechanism may include a rotational drive power transmitter for transmitting rotational drive power, and the nut tighteners may comprise, respectively in association with the hub bolts, rods that are rotatable in engagement with the rotational drive power transmitter, bearings by which the rods are rotatably supported, wrenches that are rotatable with the rods and movable in an axial direction of the rods in order to tighten the nuts onto the hub bolts, and biasing means disposed between the rods and the wrenches for biasing the wrenches so as to move toward the hub bolts. Thus, it is easy to tighten the nuts with the nut tighteners, while the tire is fixed in position by the tire grippers.

BRIEF DESCRIPTION OF DRAWINGS

FIG. 36 is a front elevational view of a main portion of a lock mechanism and the nut tightening unit of the first working mechanism according to the sixth embodiment;

FIG. 42 is a flowchart of an operation sequence primarily of the second working mechanism according to the sixth embodiment;

FIG. 43 is a timing chart of a process in which the tire mounting apparatus according to the sixth embodiment mounts a tire on an automobile body; and FIG. 44 is a view showing a positional relationship between a gripping arm of the first working mechanism according to the first embodiment, a tire, and a fender.

BEST MODE FOR CARRYING OUT THE INVENTION

First Embodiment

Figure 1:
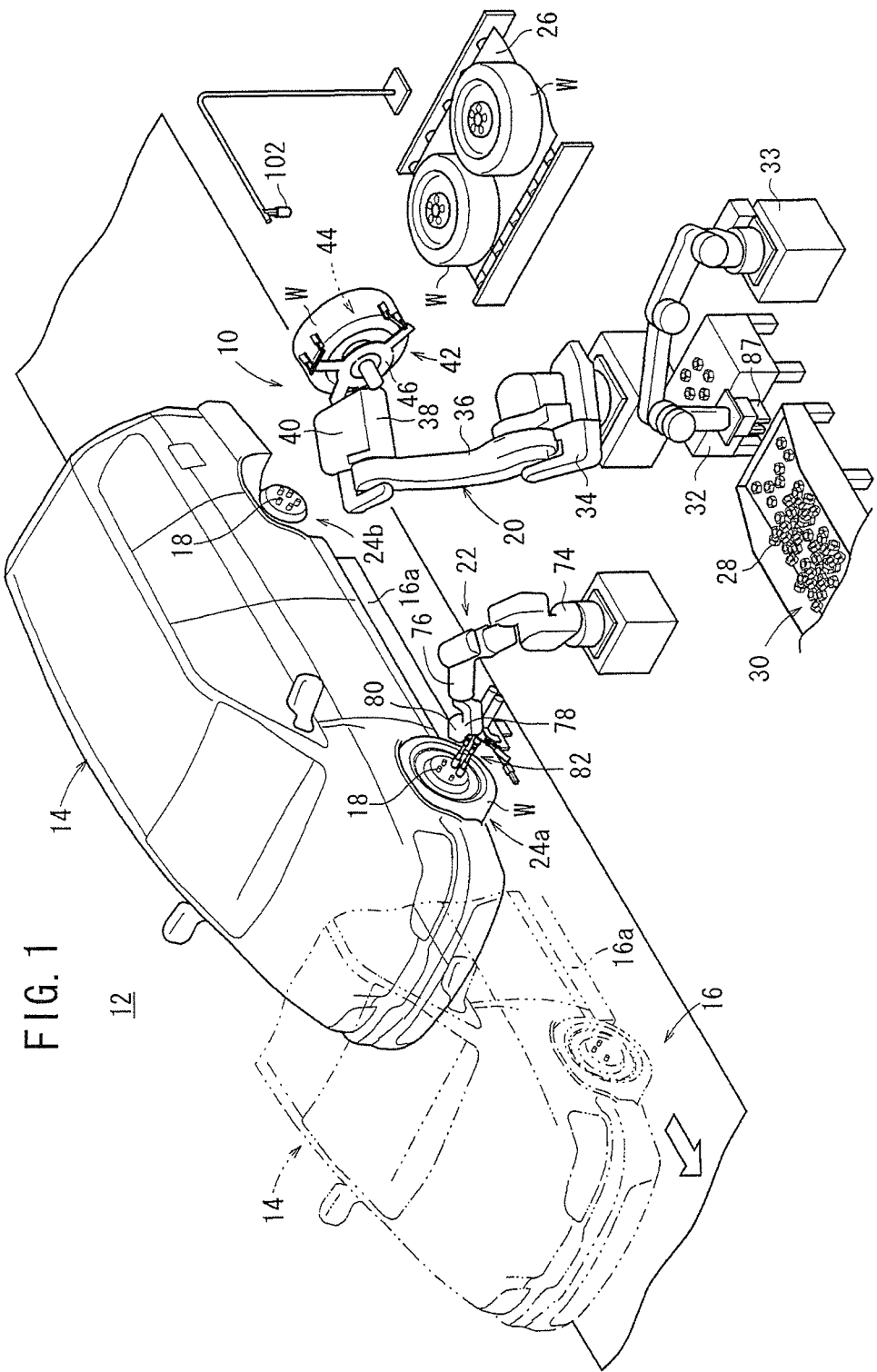
FIG. 1 is a perspective view of an assembly line incorporating a tire mounting apparatus according to a first embodiment of the present invention.

FIG. 1 is a perspective view of an assembly line 12 incorporating a tire mounting apparatus 10 according to a first embodiment of the present invention.

The assembly line 12 has a feed path 16 for pitch-feeding an automobile body (motor vehicle) 14 placed on a carriage 16a to a tire mounting position. A pair of tire mounting apparatus 10 (only one of which is shown in FIG. 1), disposed one on each side of the feed path 16, automatically mount tires W onto hub bolts 18 of the automobile body 14.

The tire mounting apparatus 10 has a first working mechanism 20 and a second working mechanism 22, which are separate from each other and constructed depending on the details of working operations, to be described later. The feed path 16 feeds the automobile body 14 intermittently so that a first mounting region 24a on a front wheel side of the automobile body 14, and a second mounting region 24b on a rear wheel side of the automobile body 14 will successively be positioned in a tire mounting station.

Proximate the first working mechanism 20, there are disposed a tire charging conveyor 26 on which tires W are placed, a nut stock 30 for accommodating nuts 28 that are tightened on the hub bolts 18, and a third working mechanism 33 for removing a certain number of (five or four) nuts 28 from the nut stock 30 and placing the nuts 28 in an array on a nut table 32.

The first working mechanism 20 includes a robot body 34 having an arm 36, which includes a hand 38 on a distal end with a rotatable index base 40 mounted thereon.

Figure 2:
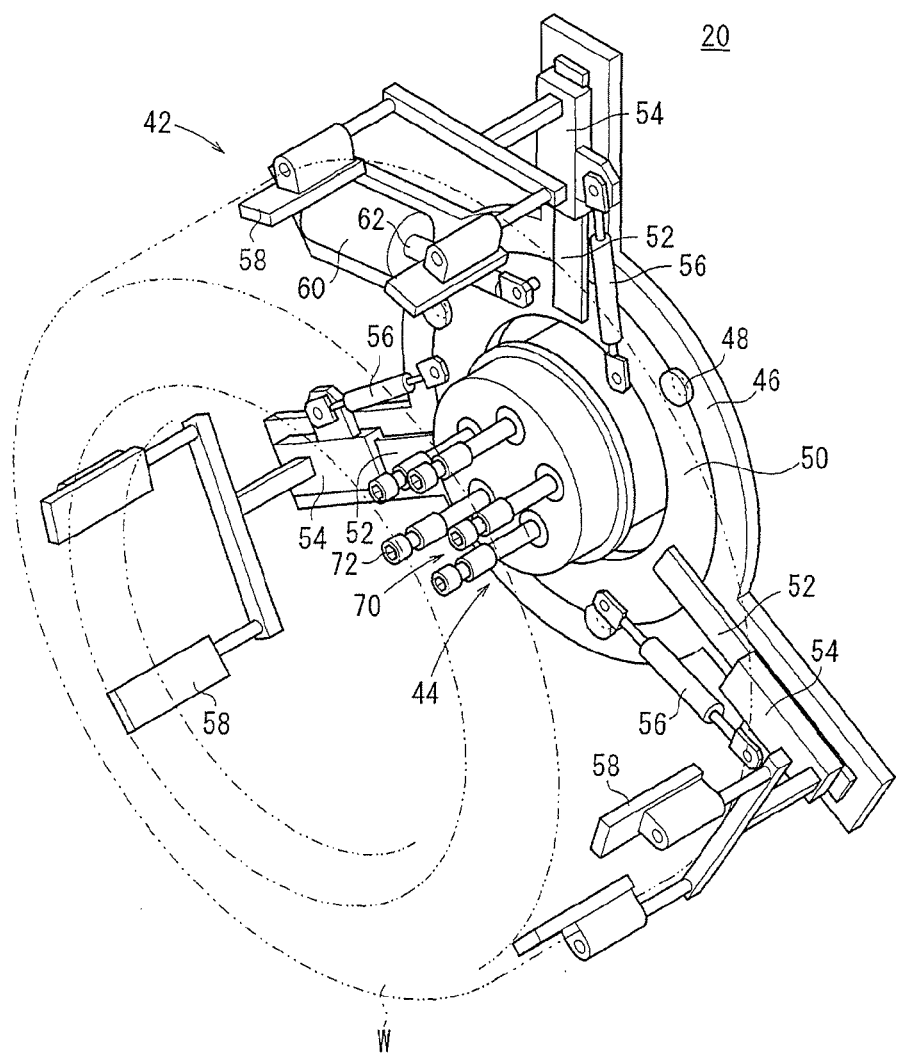
FIG. 2 is a perspective view of a main portion of a first working mechanism of the tire mounting apparatus according to the first embodiment.
Figure 3:
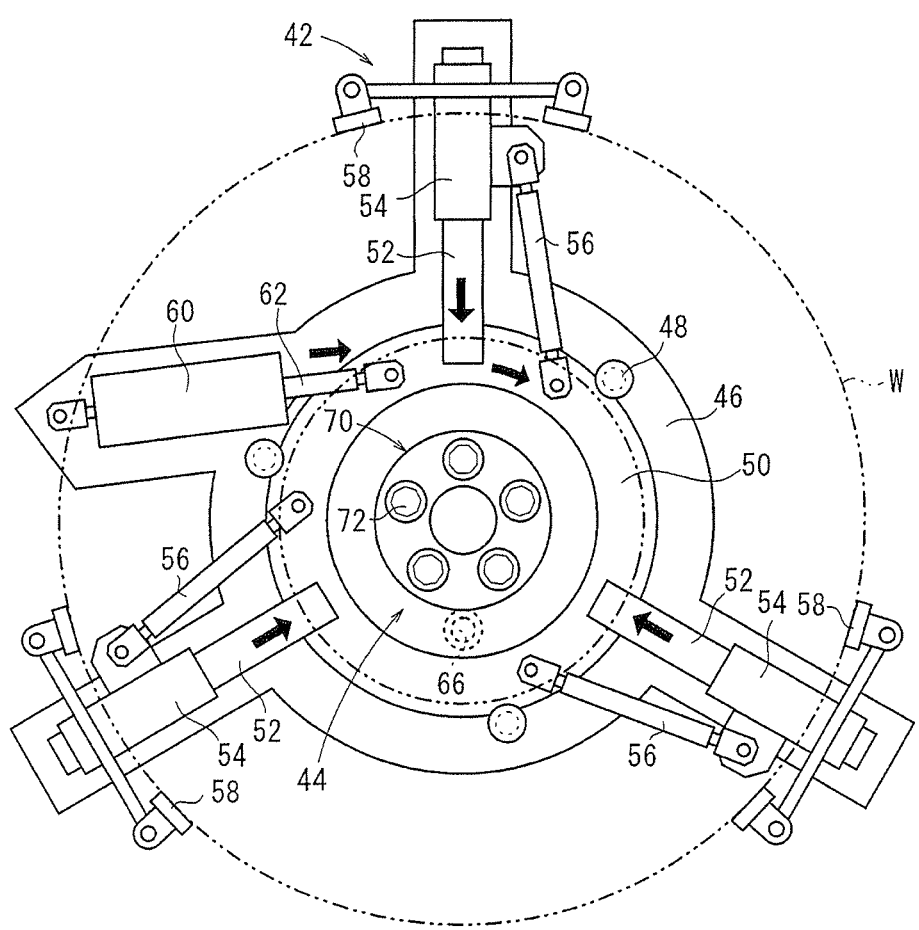
FIG. 3 is a front elevational view of the main portion of the first working mechanism according to the first embodiment.
Figure 4:
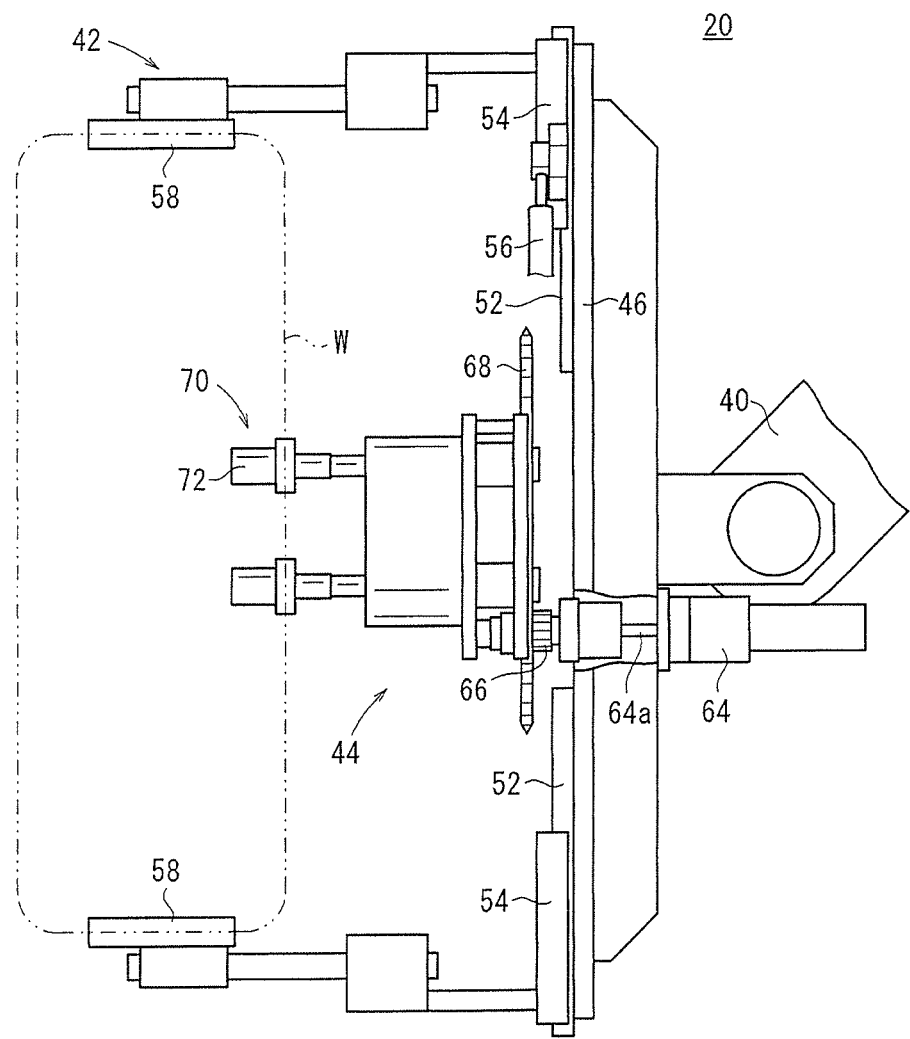
FIG. 4 is a side elevational view of the main portion of the first working mechanism according to the first embodiment.

As shown in FIGS. 2 through 4, the index base 40 supports thereon a tire gripping means 42 for gripping a tire W, and a temporary tightening means 44 for temporarily tightening nuts 28 on hub bolts 18 with the tire W placed thereon.

The tire gripping means 42 has an attachment plate 46 secured to the index base 40. As shown in FIGS. 2 and 3, a cam ring 50 is rotatably supported on the attachment plate 46 by a plurality of guide rollers 48. A plurality of (e.g., three) radially extending guide rails 52 are mounted on the attachment plate 46 at equal angular intervals.

Slide bases 54 are movably mounted on the respective guide rails 52, and are coupled to the cam ring 50 by connecting rods 56. Tire holders 58 are mounted on the slide bases 54. A cylinder 60 is swingably mounted on the attachment plate 46, and a rod 62 coupled to the cylinder 60 is fixed to the cam ring 50.

As shown in FIG. 4, the temporary tightening means 44 comprises a single motor 64 fixed to the attachment plate 46. The motor 64 has a rotational drive shaft 64a to which there is secured a drive gear 66 held in mesh with a gear train 68. A tool unit 70 is detachably mounted on the gear train 68.

The tool unit 70 includes five (or four) nut runners 72, which are rotatable in unison with each other by the motor 64 through the gear train 68 and the drive gear 66.

Figure 5:
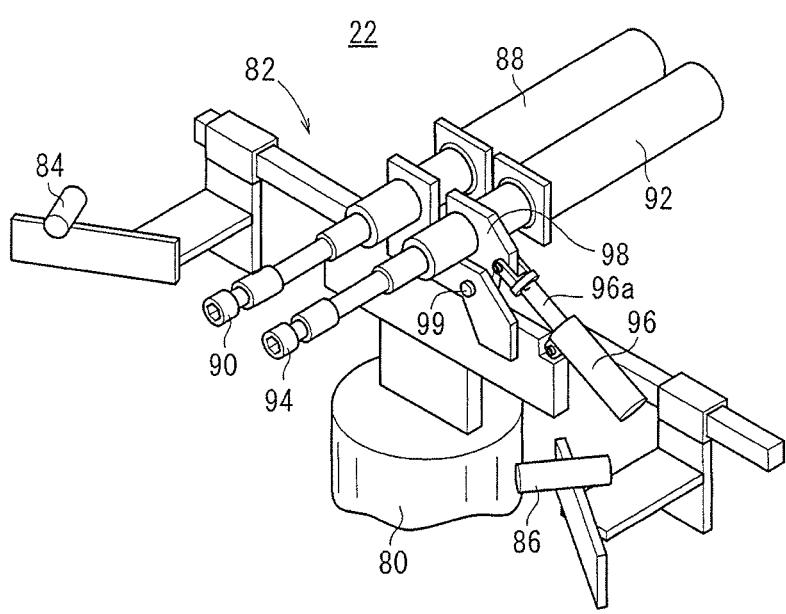
FIG. 5 is a perspective view of a main portion of a second working mechanism of the tire mounting apparatus according to the first embodiment.

As shown in FIG. 1, the second working mechanism 22 includes a robot body 74 having an arm 76, which includes a hand 78 on a distal end with an index base 80 rotatably mounted thereon. As shown in FIG. 5, on the index base 80 there are mounted a full tightening means 82 for fully tightening nuts 28 that have been tightened temporarily on hub bolts 18 in the first mounting region 24a and the second mounting region 24b, and CCD image-capturing cameras (hereinafter referred to simply as cameras) (detection sensors) 84, 86 for capturing images of the first mounting region 24a and the second mounting region 24b in order to check positions of the respective hub bolts.

The full tightening means 82 comprises a first nut runner 90 coupled to a first motor 88, and a second nut runner 94 coupled to a second motor 92. The first nut runner 90 and the second nut runner 94 are variable by an interval adjuster 98 coupled to a rod 96a that extends from a pitch changing cylinder 96. The interval adjuster 98 is angularly movable about a support shaft 99. The first nut runner 90 and the second nut runner 94 are capable of varying a pitch interval, depending on whether five or four nuts are used to fasten the tire W.

The third working mechanism 33 includes an arm that supports on a distal end thereof a nut chuck 87, which is openable and closable for removing a nut 28 accommodated in the nut stock 30 and placing the nut 28 on the nut table 32.

Figure 6:
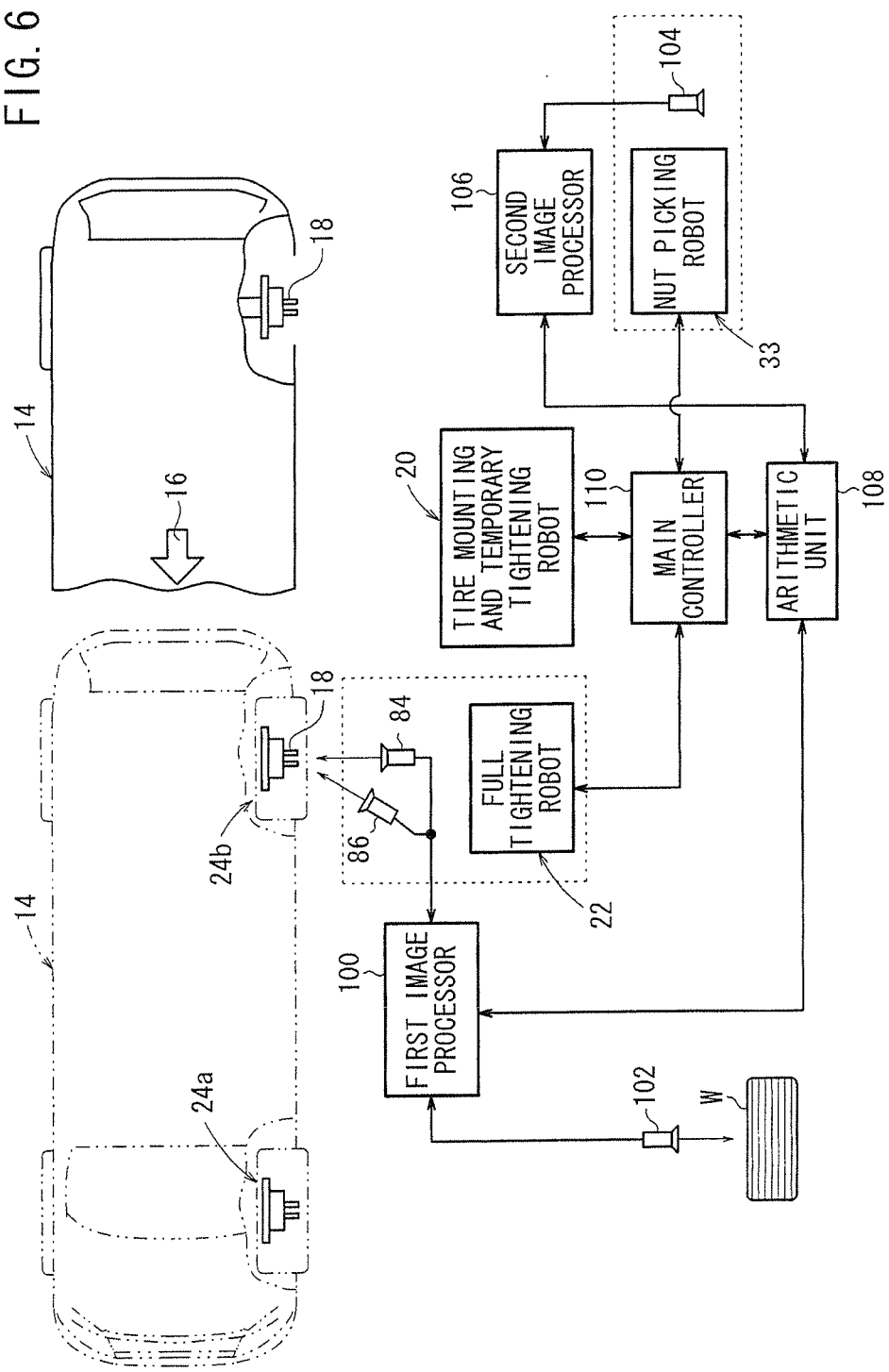
FIG. 6 is a block diagram of the tire mounting apparatus according to the first embodiment.

As shown in FIG. 6, the cameras 84, 86 of the second working mechanism 22 output image information of the first mounting region 24a and the second mounting region 24b to a first image processor 100.

The first image processor 100 also is supplied with image information of the tire W (bolt holes of the tire W) from a camera (bolt hole detection sensor) 102, which is disposed over the tire charging conveyor 26.

A camera 104 (not shown in FIG. 1) for capturing an image of nuts 28 to be fed is fixedly positioned near the third working mechanism 33. Image information of the nuts 28, which is captured by the camera 104, is input to a second image processor 106.

The first image processor 100 is connected to an arithmetic unit 108. The arithmetic unit 108 calculates the relative positions of the hub bolts in the first mounting region 24a, the hub bolts in the second mounting region 24b, and bolt holes of a tire W on the tire charging conveyor 26. Then, the arithmetic unit 108 outputs the calculated relative positions to a main controller (control mechanism) 110. The second image processor 106 is connected to the arithmetic unit 108, which processes image information of the nuts 28 captured by the camera 104, and outputs the processed image information to the main controller 110.

Based on the processed image information input thereto from the arithmetic unit 108, the main controller 110 controls operation of the first working mechanism 20, and also controls operation of the second working mechanism 22 and the third working mechanism 33.

Operation of the tire mounting apparatus 10 thus constructed will be described in relation to a mounting method according to the first embodiment, with reference to the flowcharts shown in FIGS. 7 and 8, and the timing chart shown in FIG. 9.

Figure 7:
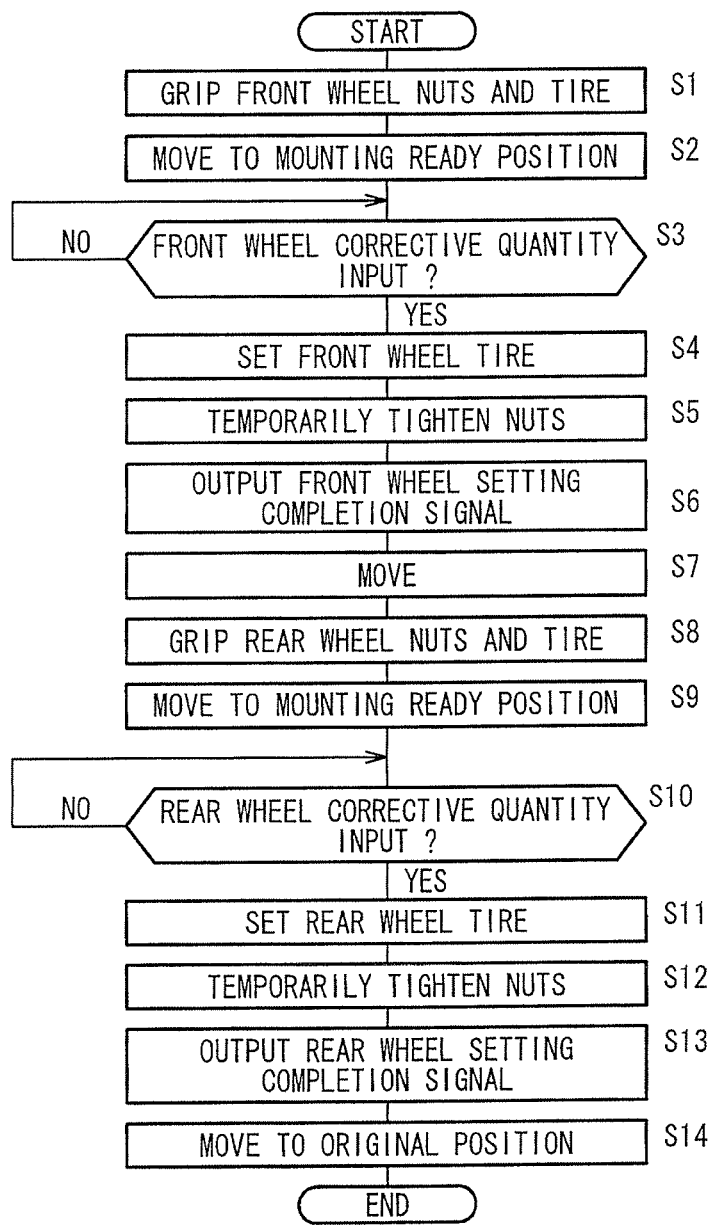
FIG. 7 is a flowchart of an operation sequence of the first working mechanism in a mounting method according to the first embodiment.
Figure 8:
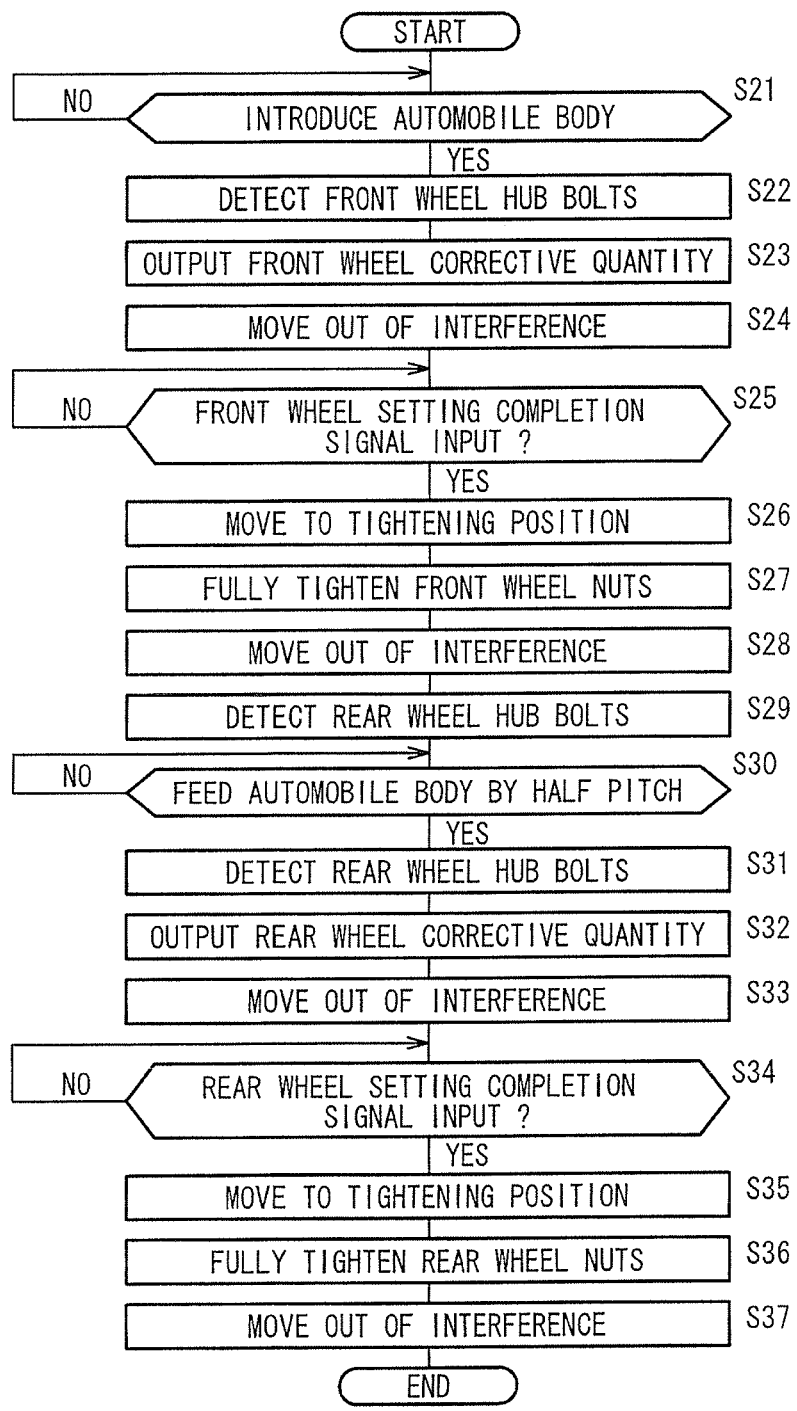
FIG. 8 is a flowchart of an operation sequence of the second working mechanism in the mounting method according to the first embodiment.

An operation sequence of the first working mechanism 20 is shown in FIG. 7, and an operation sequence of the second working mechanism 22 is shown in FIG. 8. The first working mechanism 20, the second working mechanism 22, and the third working mechanism 33 operate in relation to each other, as shown in FIG. 9.

First, an operation sequence of the first working mechanism 20 will be described below. After gripping five nuts 28 arrayed on the nut table 32 with five nut runners 72 of the temporary tightening means 44, the first working mechanism 20 grips a tire W on the tire charging conveyor 26 with the tire gripping means 42 (step S1).

More specifically, as shown in FIG. 3, when the cylinder 60 is actuated so as to project the rod 62 in the direction indicated by the arrow, the cam ring 50 fixed to the rod 62 is rotated in the direction indicated by the arrow while being guided by the guide rollers 48. The connecting rods 56, the ends of which are coupled to the cam ring 50, move the respective slide bases 54 inwardly (toward the center) along the guide rails 52. Therefore, the outer circumferential surface of the tire W is pressed and held by the tire holders 58 mounted on the slide bases 54.

Having gripped the nuts 28 and the tire W, as the robot body 34 is turned, the first working mechanism 20 moves to a mounting ready position (step S2). At this time, the first mounting region 24a on the front wheel side of the automobile body 14 is positioned in the tire mounting station.

If a front wheel corrective quantity, which is produced based on images captured by the cameras 84, 86 associated with the second working mechanism 22, is input (step S3: YES), control proceeds to step S4, in which the tire W is set in the first mounting region 24a.

Control then proceeds to step S5, in which the nuts 28 are temporarily tightened on the respective hub bolts 18. More specifically, as shown in FIG. 4, the motor 64 is energized to cause the drive gear 66 and the gear train 68 to rotate the nut runners 72 of the tool unit 70 in unison with each other, thereby temporarily tightening the nuts 28 onto the hub bolts 18.

When the tire W has been temporarily tightened as a front wheel in the first mounting region 24a, a front wheel setting completion signal is output (step S6). Control then proceeds to step S7, in which the robot body 34 moves away from the first mounting region 24a toward the nut table 32.

The nut runners 72 of the temporary tightening means 44 grip five nuts 28 arrayed on the nut table 32, after which the robot body 34 is turned toward the tire charging conveyor 26. The tire gripping means 42 grips a tire W (step S8), and then is moved to the mounting ready position as the robot body 34 is actuated (step S9).

While the tire gripping means 42 is being moved, the automobile body 14 is intermittently fed along the feed path 16 in the direction indicated by the arrow in FIG. 1, until the second mounting region 24*b* on the rear wheel side is positioned in the tire mounting station.

If a rear wheel corrective quantity, which is produced based on image signals from the cameras 84, 86 associated with the second working mechanism 22, is input (step S10: YES), as described later, control proceeds to step S11, in which a rear wheel tire W is set in the second mounting region 24*b*.

After the nuts 28 have been temporarily tightened on the hub bolts 18 in the second mounting region 24*b* by the temporary tightening means 44 (step S12), a rear wheel setting completion signal is output (step S13). Thereafter, the first working mechanism 20 moves to its original position (step S14), whereupon the process of temporarily tightening the tire on the automobile body 14 is finished.

Next, an operation sequence of the second working mechanism 22 will be described below with reference to FIG. 8.

The robot body 74 of the second working mechanism 22 is operated to position the cameras 84, 86 in the tire mounting station. When the first mounting region 24*a* on the front wheel side of the automobile body 14 is placed in the tire mounting station (step S21: YES), control proceeds to step S22, in which the cameras 84, 86 read image information of front wheel hub bolts 18 in the first mounting region 24*a*.

Images read by the cameras 84, 86 are output to the first image processor 100, which calculates a corrective quantity for the hub bolts 18 with respect to a reference position. The corrective quantity is output from the arithmetic unit 108 to the main controller 110 (step S23).

The second working mechanism 22 moves to a position out of interference with the operation sequence of the first working mechanism 20 in the first mounting region 24*a* (step S24). If a front wheel setting completion signal is input from the first working mechanism 20 (step S25: YES), then control proceeds to step S26, in which the second working mechanism 22 moves to the tightening position (the first mounting region 24*a*).

In the first mounting region 24*a*, the five nuts 28 already have been temporarily tightened on the hub bolts 18. The first nut runner 90 and the second nut runner 94 of the full tightening means 82 are rotated by the first motor 88 and the second motor 92 in order to fully tighten two of the nuts 28. Then, the first nut runner 90 and the second nut runner 94 are turned a given angle, and thereafter, the first nut runner 90 and the second nut runner 94 fully tighten another two of the temporarily tightened nuts 28. Then, after the first nut runner 90 and the second nut runner 94 are turned further, the first nut runner 90, for example, fully tightens the remaining one of the temporarily tightened nuts 28 (step S27).

After the tire W has been mounted in the first mounting region 24*a*, the second working mechanism 22 moves out of interference (step S28). Then, the second working mechanism 22 moves to a rear wheel hub bolt detecting position (step S29) and determines whether or not the automobile body 14 has been fed a half pitch along the feed path 16 (step S30).

If it is judged that the automobile body 14 has been fed a half pitch (step S30: YES), i.e., if it is judged that the second mounting region 24*b* on the rear wheel side has been placed in the tire mounting station, then control process to step S31, in which the cameras 84, 86 read image information of rear wheel hub bolts 18 in the second mounting region 24*b*. Images read by the cameras 84, 86 are output to the first image processor 100, which calculates a corrective quantity for the hub bolts 18 in the second mounting region 24*b* (step S32).

After the second working mechanism 22 has moved out of interference with the second mounting region 24*b* (step S33), control proceeds to step S34, in which it is determined whether or not setting of the rear wheel by the first working mechanism 20 has been completed. If a rear wheel setting completion signal is input (step S34: YES), then control proceeds to step S35, in which the second working mechanism 22 moves to the tightening position (the second mounting region 24*b*).

The full tightening means 82 fully tightens two nuts 28, two nuts 28, and then one nut 28 upon rotation of the first nut runner 90 and the second nut runner 94 (step S36). Thereafter, control proceeds to step S37, in which the second working mechanism 22 moves out of interference.

Using the nut chuck 87, the third working mechanism 33 repeatedly feeds front wheel nuts 28 from the nut stock 30 onto the nut table 32, and arrays the front wheel nuts 28 on the nut table 32, and also feeds rear wheel nuts 28 from the nut stock 30 onto the nut table 32 and arrays the rear wheel nuts 28 on the nut table 32.

Since the assembly line 12 includes the tire mounting apparatus 10 disposed one on each side of the automobile body 14, the same operations as described above are performed substantially simultaneously on each side.

According to the first embodiment, the tire mounting apparatus 10 includes the first working mechanism 20 and the second working mechanism 22, which are separate from each other. The first working mechanism 20 comprises the tire gripping means 42 and the temporary tightening means 44, and the second working mechanism 22 comprises the full tightening means 82.

Consequently, the first working mechanism 20 and the second working mechanism 22 are effectively smaller and simpler than if only a single working mechanism were provided having a tire gripping means and a temporary tightening means.

In addition, the first working mechanism 20 may be constituted by a single motor 64, due to the fact that the temporary tightening means 44 is included therein. The motor 64 is much smaller and lighter than if a tightening means were used to tighten the nuts both temporarily and fully, thereby easily allowing the first working mechanism 20 to be made smaller and lighter overall.

Furthermore, the first working mechanism 20 and the second working mechanism 22 share tire mounting operations. Therefore, a plurality of operation sequences can be performed concurrently, whereby the overall tire mounting control process can be made shorter and more efficient.

Figure 9:
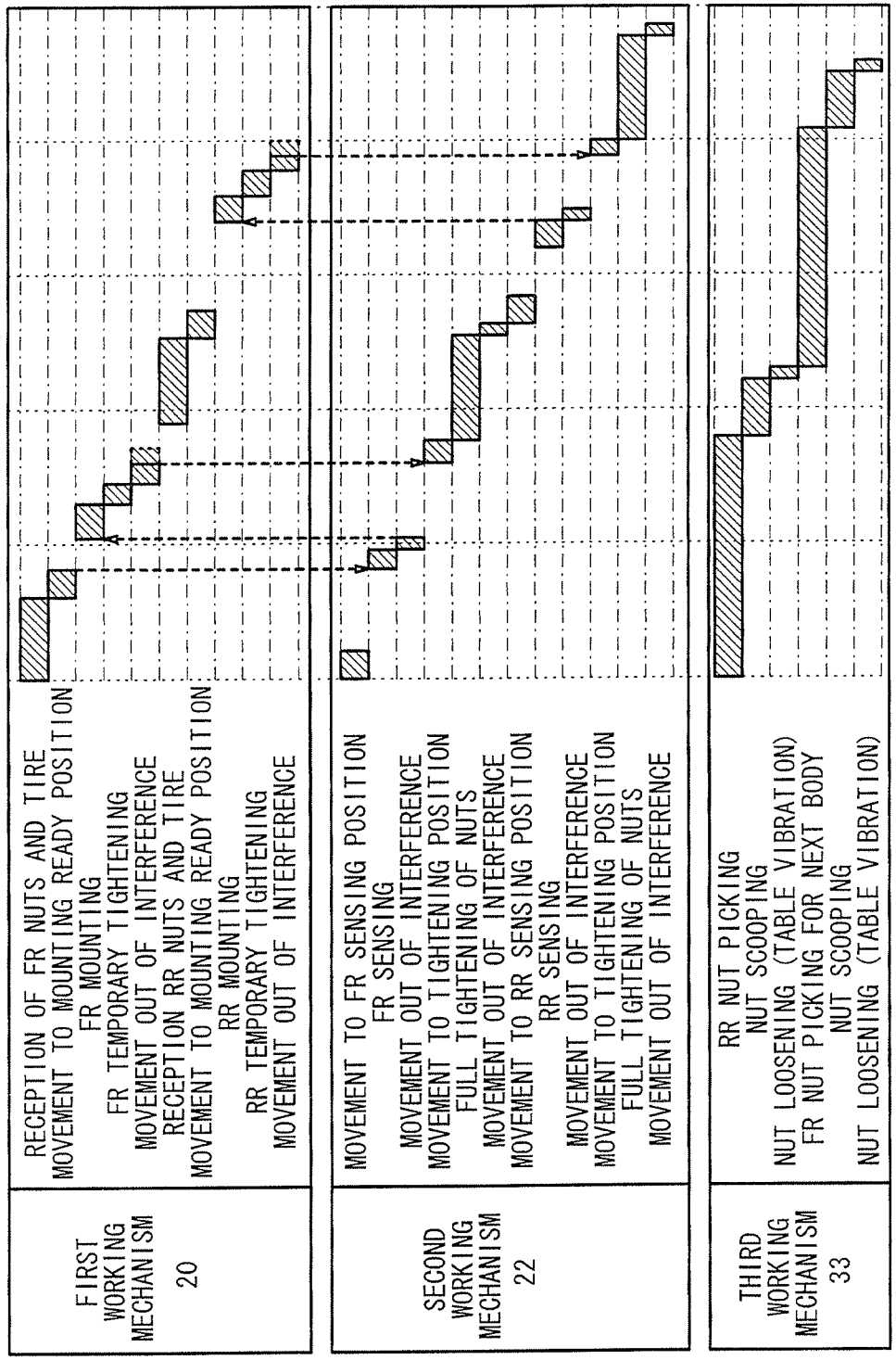
FIG. 9 is a timing chart of the mounting method according to the first embodiment.

More specifically, as shown in FIG. 9, while the first working mechanism 20 receives the nuts 28 and the tire W for the rear wheel, the second working mechanism 22 fully tightens the nuts 28 onto the hub bolts 18 in the first mounting region 24*a* on the front wheel side. Therefore, easily and reliably, the overall tire mounting process is made shorter and more efficient.

The tire mounting apparatus 10 also includes the third working mechanism 33, which removes a certain number of (five or four) nuts 28 from the nut stock 30 and places the nuts 28 in an array on a nut table 32. The first working mechanism 20 and the second working mechanism 22 do not carry out the process of arraying the nuts 28, and thus the operation sequences thereof are made simpler and more efficient.

The feed path 16 intermittently feeds the automobile body 14 such that the first mounting region 24a and the second mounting region 24b of the automobile body 14 are positioned successively in the tire mounting station. Therefore, the first working mechanism 20 and the second working mechanism 22 may be disposed one each in the tire mounting station (on one of left and right sides) for dealing with the front and rear wheels of the automobile body 14.

When the number of bolts holes for the tire W is changed due to a change in the type of the automobile body 14, the tool unit 70 of the temporary tightening means 44 of the first working mechanism 20 also is changed. More specifically, the tool unit 70 with five nut runners 72 secured thereto is replaced with a new tool unit 70 having four nut runners 72 mounted thereon.

In the second working mechanism 22, the cylinder 96 of the full tightening means 82 is actuated to turn the interval adjuster 98 about the support shaft 99 in order to adjust the interval (pitch). The interval between the first nut runner 90 and the second nut runner 94 therefore is changed in pitch, depending on the arrangement of the four hub bolts 18.

Second Embodiment

Figure 10:
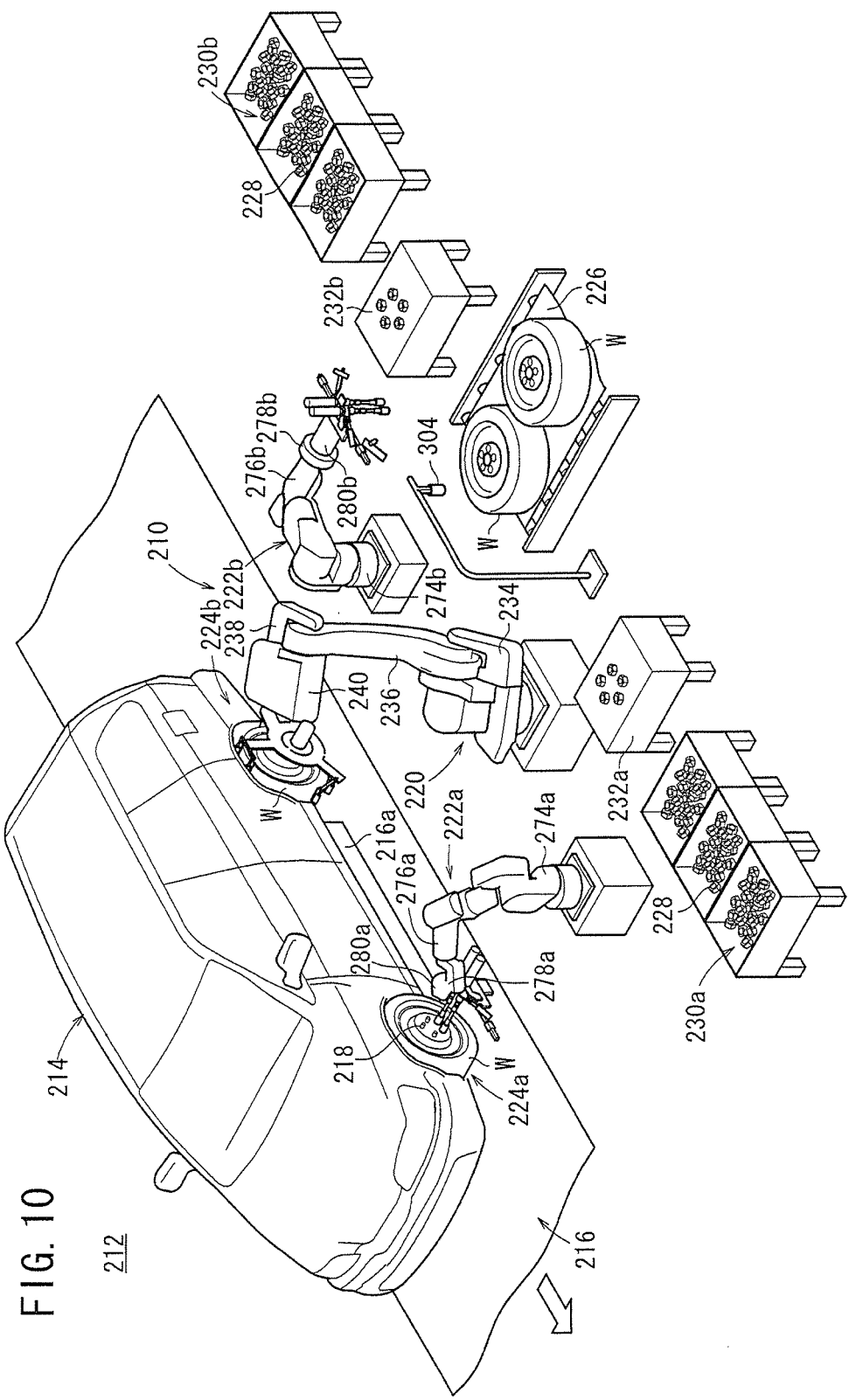
FIG. 10 is a perspective view of an assembly line incorporating a tire mounting apparatus according to a second embodiment of the present invention.

FIG. 10 is a perspective view of an assembly line 212 incorporating a tire mounting apparatus 210 according to a second embodiment of the present invention.

The assembly line 212 has a feed path 216 for pitch-feeding an automobile body (motor vehicle) 214 placed on a carriage 216a to a tire mounting position. A pair of tire mounting apparatus 210 (only one of which is shown in FIG. 1), disposed one on each side of the feed path 216, automatically mount tires W onto hub bolts 218 of the automobile body 214.

The tire mounting apparatus 210 includes a first working mechanism 220, a second working mechanism 222a, and a third working mechanism 222b, which are separate from each other and constructed depending on the details of working operations, to be described later.

The second working mechanism 222a is disposed at a first mounting region 224a on a front wheel side of the automobile body 214, and the third working mechanism 222b is disposed at a second mounting region 224b on a rear wheel side of the automobile body 214. A tire charging conveyor 226 on which tires W are placed is disposed near the first working mechanism 220.

Near the second working mechanism 222a and the third working mechanism 222b, there are disposed nut stocks 230a, 230b accommodating therein nuts 228 to be tightened on the hub bolts 118, and nut tables 232a, 232b on which a certain number of (five or four) nuts 228 removed from the nut stocks 230a are placed.

The first working mechanism 220 includes a robot body 234 having an arm 236, which includes a hand 238 on a distal end with a rotatable index base 240 mounted thereon.

Figure 11:
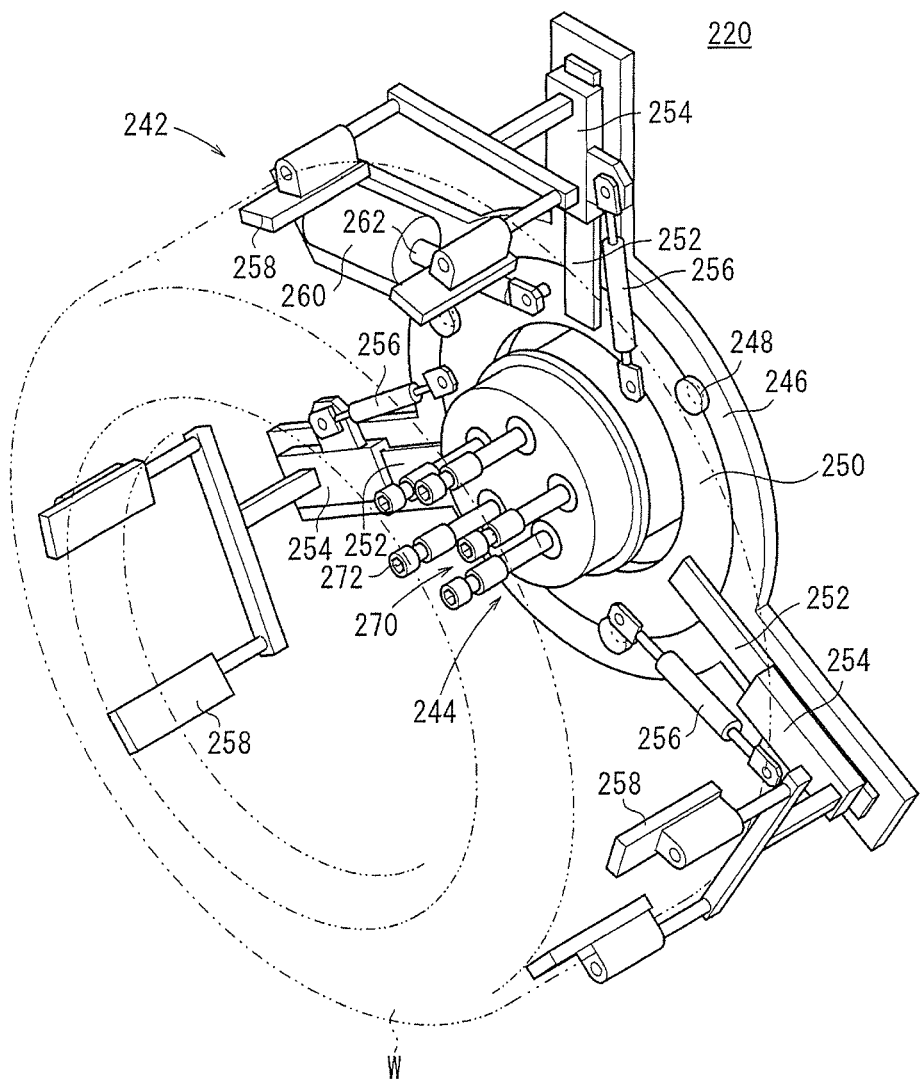
FIG. 11 is a perspective view of a main portion of a first working mechanism of the tire mounting apparatus according to the second embodiment.
Figure 12:
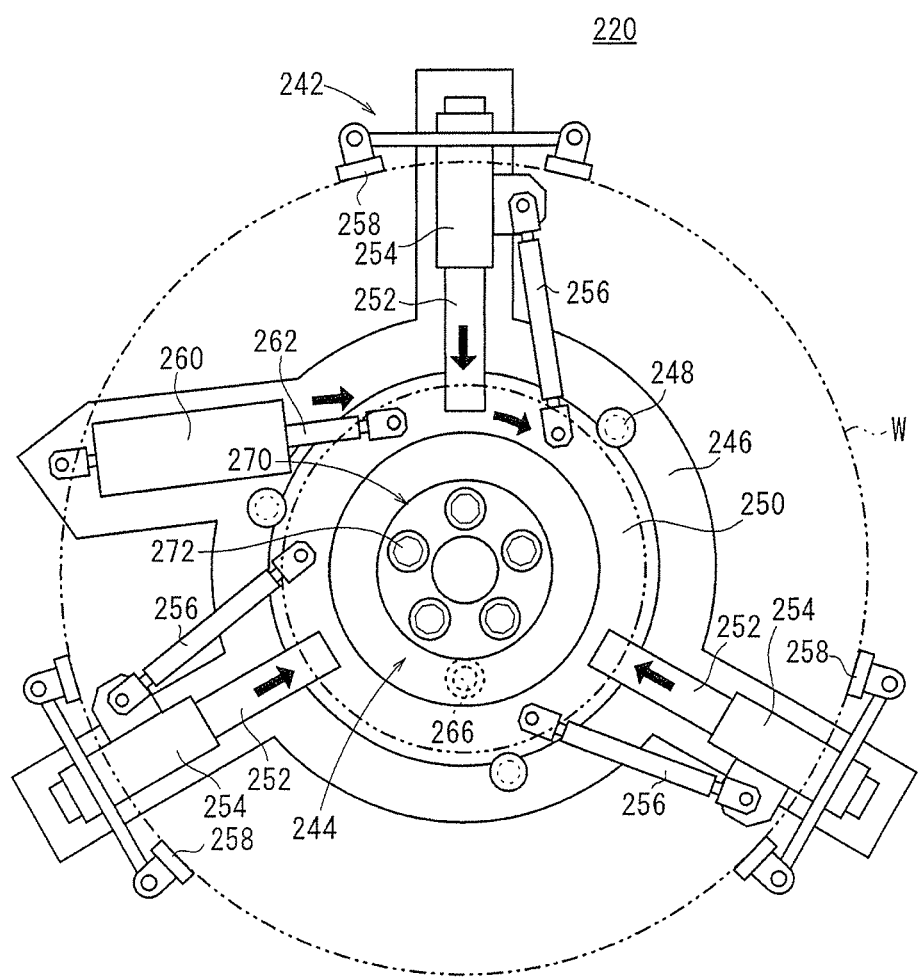
FIG. 12 is a front elevational view of the main portion of the first working mechanism according to the second embodiment.
Figure 13:
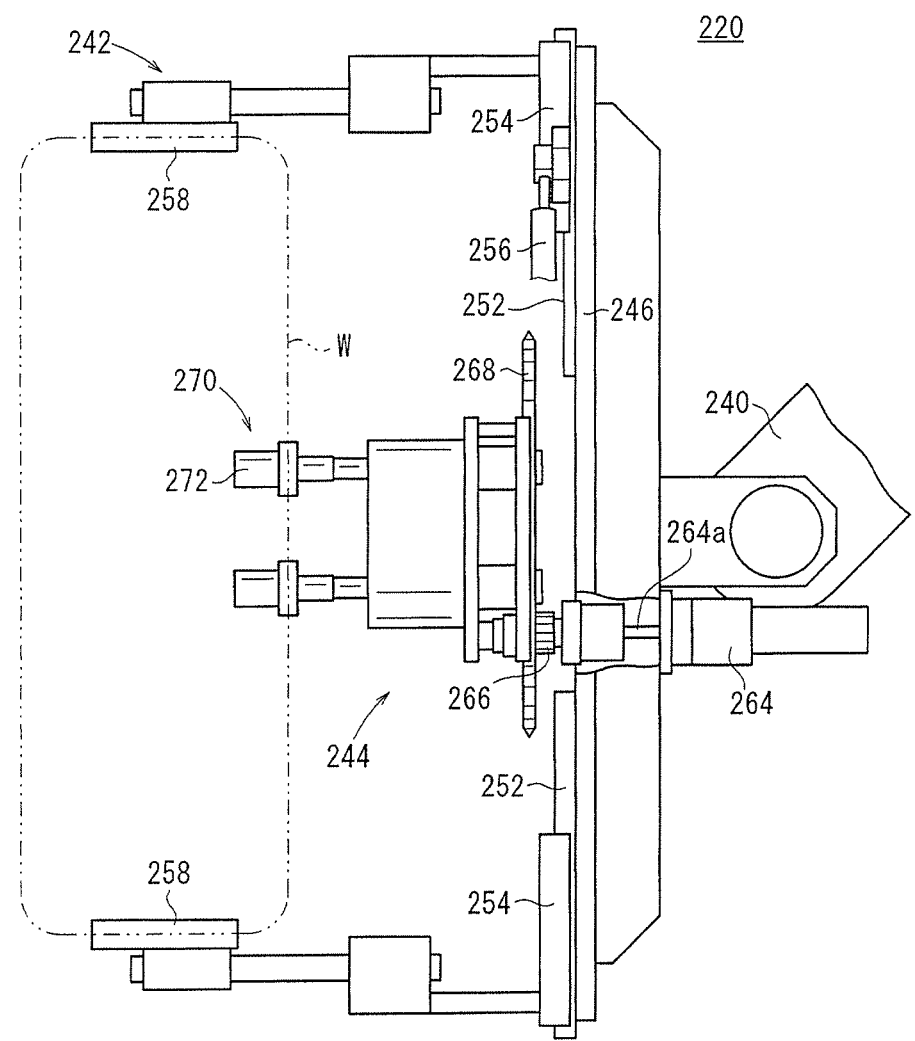
FIG. 13 is a side elevational view of the main portion of the first working mechanism according to the second embodiment.

As shown in FIGS. 11 through 13, the index base 240 supports thereon a tire gripping means 242 for gripping a tire W, and a temporary tightening means 244 for temporarily tightening nuts 228 on hub bolts 218 with the tire W placed thereon.

The tire gripping means 242 has an attachment plate 246 secured to the index base 240. As shown in FIGS. 11 and 12, a cam ring 250 is rotatably supported on the attachment plate 246 by a plurality of guide rollers 248. A plurality of (e.g., three) radially extending guide rails 252 are mounted on the attachment plate 246 at equal angular intervals.

Slide bases 254 are movably mounted on respective guide rails 252, and are coupled to the cam ring 250 by connecting rods 256. Tire holders 258 are mounted on the slide bases 254. A cylinder 260 is swingably mounted on the attachment plate 246, and a rod 262 coupled to the cylinder 260 is fixed to the cam ring 250.

As shown in FIG. 13, the temporary tightening means 244 is constituted by a single motor 264 fixed to the attachment plate 246. The motor 264 has a rotational drive shaft 264a, to which there is secured a drive gear 266 held in mesh with a gear train 268. A tool unit 270 is detachably mounted on the gear train 268.

The tool unit 270 includes five (or four) nut runners 272, which are rotatable in unison by the motor 264 through the gear train 268 and the drive gear 266.

As shown in FIG. 10, the second working mechanism 222a and the third working mechanism 222b, which are structurally identical to each other, include respective robot bodies 274a, 274b having arms 276a, 276b, each of which includes hands 278a, 278b on distal ends with index bases 280a, 280b rotatably mounted thereon.

Figure 14:
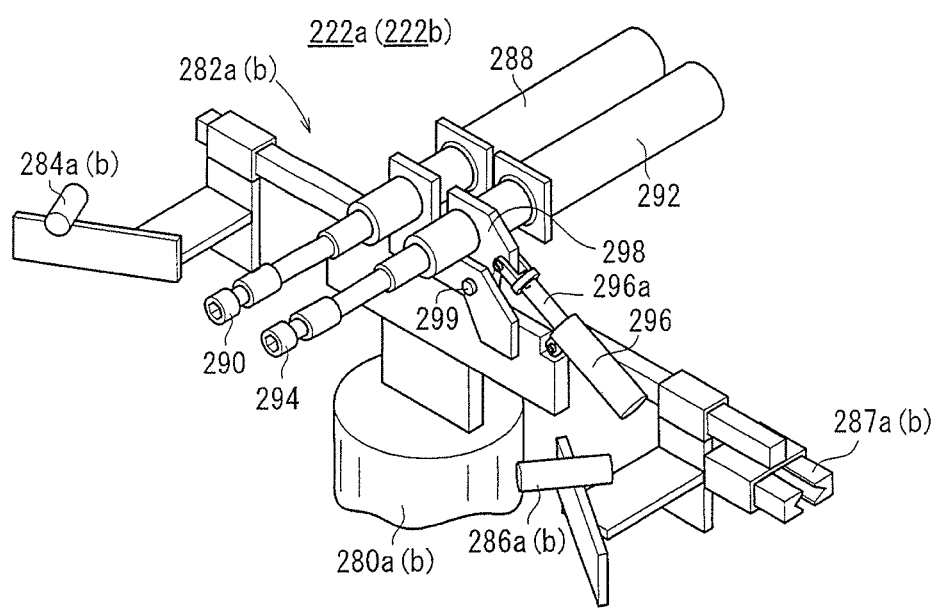
FIG. 14 is a perspective view of a main portion of a second working mechanism and a third working mechanism of the tire mounting apparatus according to the second embodiment.

As shown in FIGS. 10 and 14, on the index base 280a, there are mounted a first full tightening means 282a for fully tightening nuts 228 that have temporarily been tightened on hub bolts 218 in the first mounting region 224a, CCD image-capturing cameras (hereinafter referred to simply as cameras) (first detection sensors) 284a, 286a for capturing images of the first mounting region 224a in order to detect the positions of the respective hub bolts in the first mounting region 224a, and a nut chuck 287a for removing a nut 228 from the nut stock 230a and placing the nut 28 on the nut table 232a.

On the index base 280b, similarly, there are mounted a second full tightening means 282b for fully tightening nuts 228 that have temporarily been tightened on hub bolts 218 in the second mounting region 224b, cameras (second detection sensors) 284b, 286b for capturing images of the second mounting region 224b, and a nut chuck 287b for removing a nut 228 from the nut stock 230b and placing the nut 28 on the nut table 232b.

The first full tightening means 282a comprises a first nut runner 290 coupled to a first motor 288, and a second nut runner 294 coupled to a second motor 292. The first nut runner 290 and the second nut runner 294 are variable by an interval adjuster 298 coupled to a rod 296a that extends from a pitch changing cylinder 296. The interval adjuster 298 is angularly movable about a support shaft 299. The first nut runner 290 and the second nut runner 294 are capable of varying a pitch interval depending on whether five or four nuts are used to fasten the tire W.

The second full tightening means 282b are identical in structure to the first full tightening means 282a. Components thereof are denoted by identical reference characters, and such features will not be described in detail below.

Figure 15:
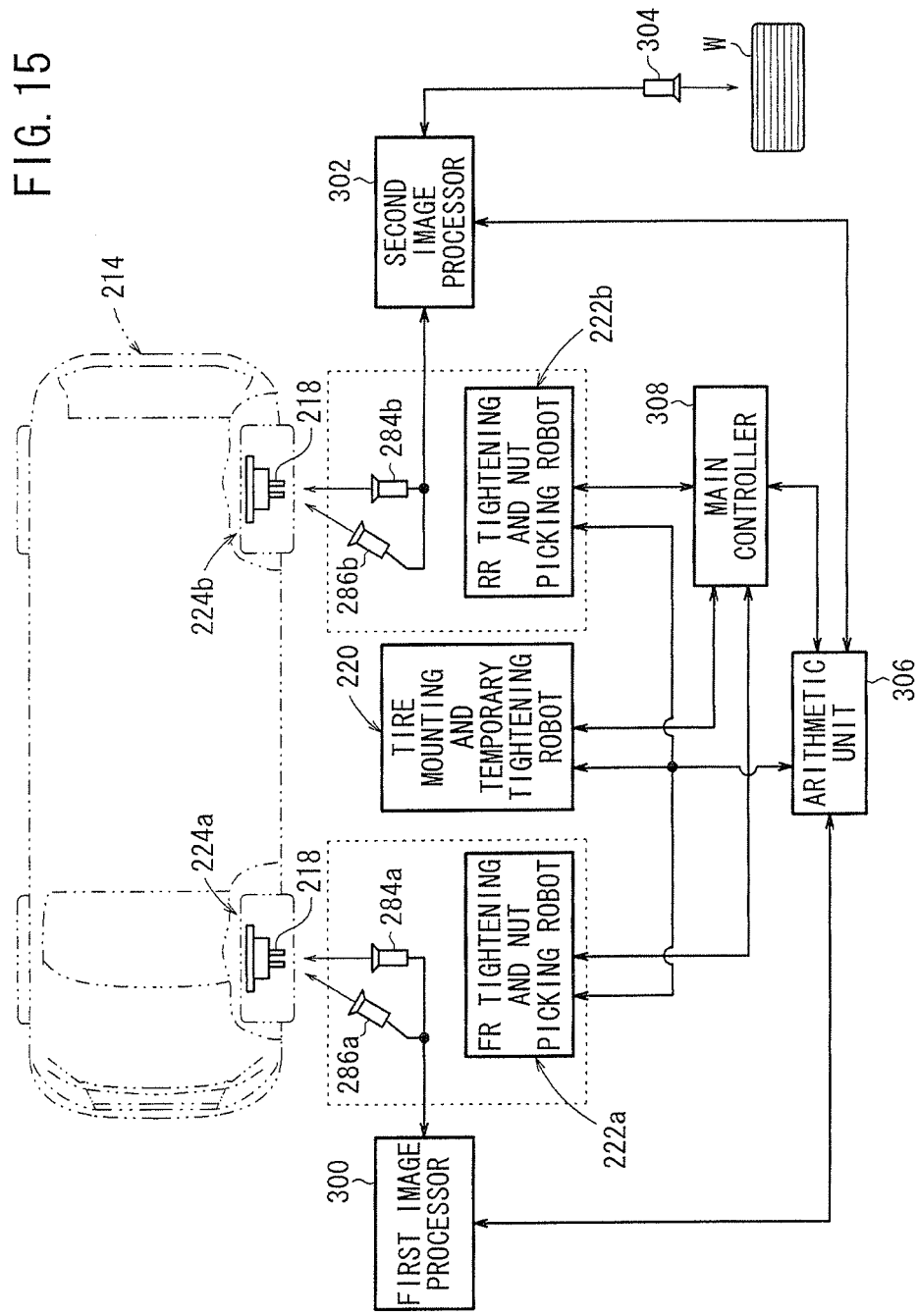
FIG. 15 is a block diagram of the tire mounting apparatus according to the second embodiment.

As shown in FIG. 15, the cameras 284a, 286a of the second working mechanism 222a output image information concerning the first mounting region 224a to a first image processor 300, which processes the image information. The cameras 284b, 286b of the third working mechanism 222b output image information concerning the second mounting region 224b to a second image processor 302, which processes the image information.

Image information of a tire W placed on the tire charging conveyor 226 is input from a camera (third detection sensor) 304 to the second image processor 302, which processes the image information.

The first image processor 300 and the second image processor 302 are connected to an arithmetic unit 306. The arithmetic unit 306 calculates relative positions of the hub bolts in the first mounting region 224a, the hub bolts in the second mounting region 224b, and bolt holes of a tire W on the tire charging conveyor 226, and outputs the calculated relative positions to a main controller (control mechanism) 308. Based on the processed image information input from the arithmetic unit 306, the main controller 308 controls operations of the first working mechanism 220, and also controls operations of the second working mechanism 222a and the third working mechanism 222b.

Operation of the tire mounting apparatus 210 thus constructed will be described in relation to a mounting method according to the second embodiment, with reference to the flowcharts shown in FIGS. 16 through 18 and the timing chart shown in FIG. 19.

Figure 16:
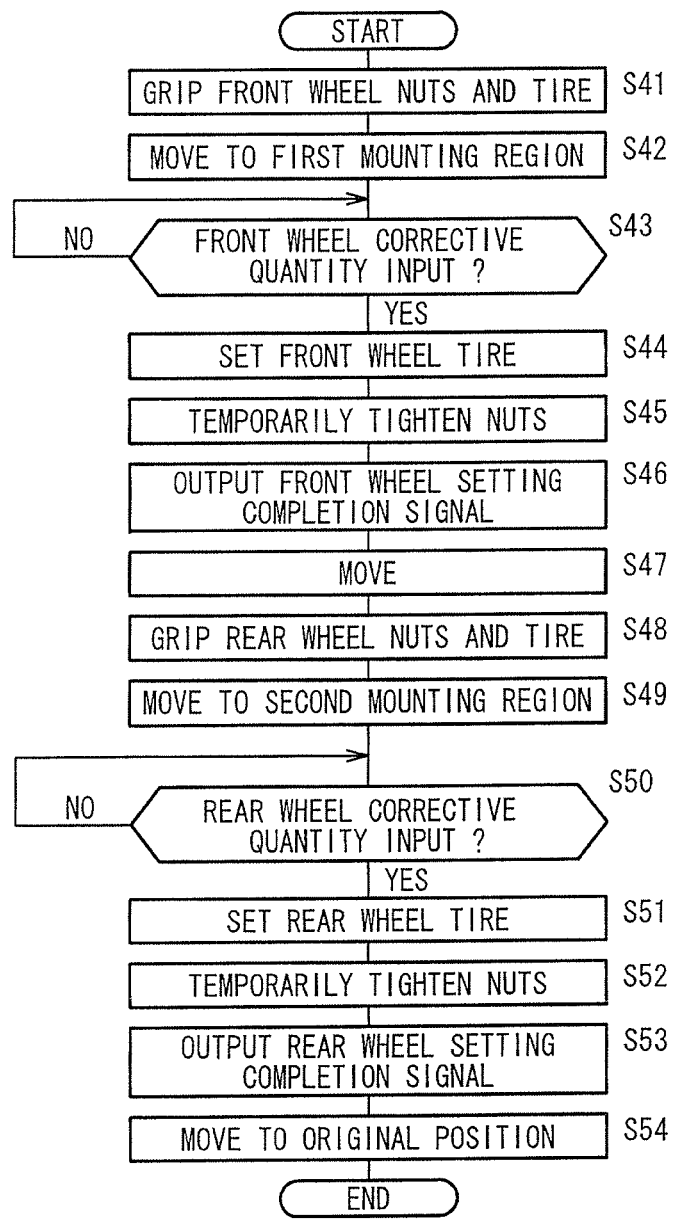
FIG. 16 is a flowchart of an operation sequence of the first working mechanism in a mounting method according to the second embodiment.
Figure 17:
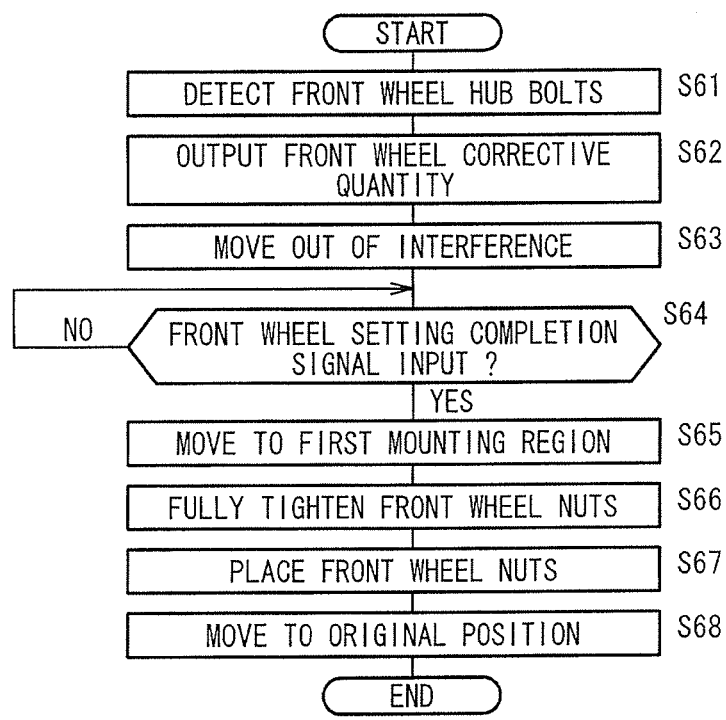
FIG. 17 is a flowchart of an operation sequence of the second working mechanism in the mounting method according to the second embodiment.
Figure 18:
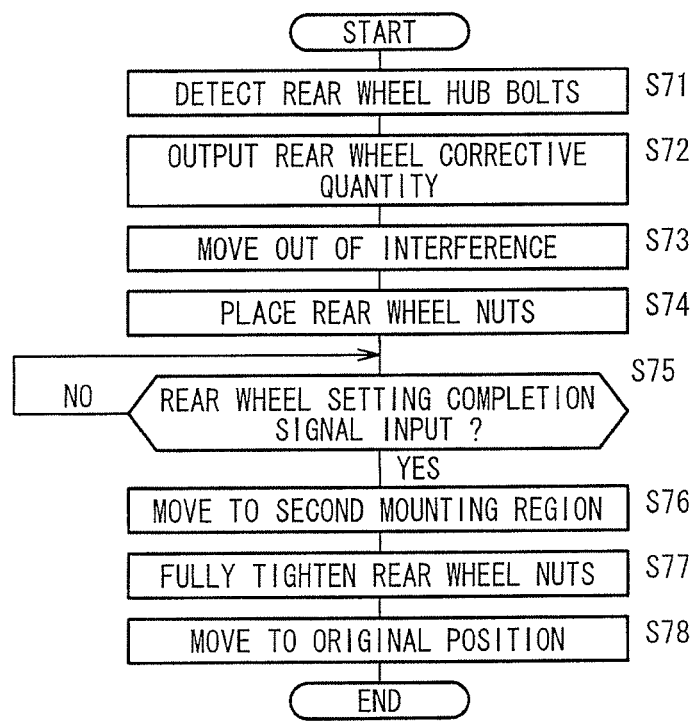
FIG. 18 is a flowchart of an operation sequence of the third working mechanism in the mounting method according to the second embodiment.

An operation sequence of the first working mechanism 220 is shown in FIG. 16, an operation sequence of the second working mechanism 222a is shown in FIG. 17, and an operation sequence of the third working mechanism 222b is shown in FIG. 18. The first working mechanism 220, the second working mechanism 222a, and the third working mechanism 222b operate in relation to each other, as shown in FIG. 19.

First, the operation sequence of the first working mechanism 220 will be described below. After gripping five nuts 228 arrayed on the nut table 232a with five nut runners 272 of the temporary tightening means 244, the first working mechanism 220 grips a tire W on the tire charging conveyor 226 with the tire gripping means 242 (step S41).

More specifically, as shown in FIG. 12, when the cylinder 260 is actuated to project the rod 262 in the direction indicated by the arrow, the cam ring 250 fixed to the rod 262 is rotated in the direction indicated by the arrow while being guided by the guide rollers 248. The connecting rods 256, the ends of which are coupled to the cam ring 250, move the respective slide bases 254 inwardly (toward the center) along the guide rails 252. Therefore, an outer circumferential surface of the tire W is pressed and held by the tire holders 258 mounted on the slide bases 254.

Having gripped the nuts 228 and the tire W, the first working mechanism 220 moves toward the first mounting region 224a under operation of the robot body 234 (step S42). If a front wheel corrective quantity, which is produced based on images captured by the cameras 284a, 286a associated with the second working mechanism 222a, is input (step S43: YES), control proceeds to step S44, in which the tire W is set in the first mounting region 224a.

Control then proceeds to step S45, in which the nuts 228 are temporarily tightened onto the respective hub bolts 218. More specifically, as shown in FIG. 13, the motor 264 is energized to cause the drive gear 266 and the gear train 268 to rotate the nut runners 272 of the tool unit 270, thereby temporarily tightening the nuts 228 on the hub bolts 218.

When the tire W has been temporarily tightened as a front wheel in the first mounting region 224a, a front wheel setting completion signal is output (step S46). Control then proceeds to step S47, in which the robot body 234 moves away from the first mounting region 224a toward the nut table 232b (step S47).

The nut runners 272 of the temporary tightening means 244 grip five nuts 228 arrayed on the nut table 232b, after which the robot body 234 is turned toward the tire charging conveyor 226. The tire gripping means 242 grips a tire W (step S48), and then the tire gripping means 242 is moved toward the second mounting region 224b under actuation of the robot body 234 (step S49).

If a rear wheel corrective quantity, which is produced based on image signals from the cameras 284b, 286b associated with the third working mechanism 222b, is input (step S50: YES), as described later, control proceeds to step S51, in which a rear wheel tire W is set in the second mounting region 224b.

After the nuts 228 have been temporarily tightened on the hub bolts 118 in the second mounting region 224b by the temporary tightening means 244 (step S52), a rear wheel setting completion signal is output (step S53). Thereafter, the first working mechanism 220 moves to the original position thereof (step S54), whereupon the process of temporarily tightening the tire on the automobile body 214 is finished.

Next, an operation sequence of the second working mechanism 222a will be described below with reference to FIG. 17.

After the robot body 274a of the second working mechanism 222a has been operated in order to position the cameras 284a, 286a near the first mounting region 224a, the cameras 284a, 286a read image information of the front wheel hub bolts 218 in the first mounting region 224a (step S61).

Images read by the cameras 284a, 286a are output to the first image processor 300, which calculates a corrective quantity for the hub bolts 218 with respect to a reference position. The corrective quantity is output from the arithmetic unit 306 to the main controller 308 (step S62).

The second working mechanism 222a moves to a position out of interference with the operation sequence of the first working mechanism 220 in the first mounting region 224a (step S63). If a front wheel setting completion signal is input from the first working mechanism 220 (step S64: YES), then control proceeds to step S65, in which the second working mechanism 222a moves to the first mounting region 224a.

In the first mounting region 224a, the five nuts 228 have already been temporarily tightened onto the hub bolts 218. The first nut runner 290 and the second nut runner 294 of the first full tightening means 282a are rotated by the first motor 288 and the second motor 292 in order to fully tighten two of the nuts 228. Then, the first nut runner 290 and the second nut runner 294 are turned a given angle. Thereafter, the first nut runner 290 and the second nut runner 294 fully tighten another two of the temporarily tightened nuts 228. After the first nut runner 290 and the second nut runner 294 are turned further, the first nut runner 290, for example, fully tightens the remaining one of the temporarily tightened nuts 228 (step S66).

After the tire W has been mounted in the first mounting region 224a, the second working mechanism 222a moves toward the nut stock 230a. The nut chuck 287a of the second working mechanism 222a removes five nuts 228 from the nut stock 230a, and places the five nuts 228 onto the nut table 232a (step S67). Control proceeds to step S68, in which the second working mechanism 22 moves to its original position, and performs the same process as described above on a next automobile body 214.

An operation sequence of the third working mechanism 222b will be described below with reference to FIG. 18.

The robot body 274b of the third working mechanism 222b operates to position the cameras 284b, 286b near the second mounting region 224b, where the cameras 284b, 286b capture images of hub bolts 218 in the second mounting region 224b (step S71). Images read by the cameras 284b, 286b are output to the second image processor 302, which outputs a corrective quantity for the hub bolts 218 in the second mounting region 224b to the main controller 308 via the arithmetic unit 306 (step S72).

The third working mechanism 222b moves to a position out of interference with the second mounting region 224b (step S73). Control the proceeds to step S74, in which the nut chuck 287b operates to remove five rear wheel nuts 228 from the nut stock 230b and place the rear wheel nuts 228 onto the nut table 232a.

Thereafter, if a rear wheel setting completion signal is input from the first working mechanism 220 (step S75: YES), then control proceeds to step S76, in which the second full tightening means 282b of the third working mechanism 222b moves to the second mounting region 224b. Upon rotation of the first nut runner 290 and the second nut runner 294, the second full tightening means 282b fully tightens two nuts 228, two nuts 228, and then one nut 228 (step S77). Thereafter, control proceeds to step S78, in which the third working mechanism 222b moves to its original position.

Since the assembly line 212 has the tire mounting apparatus 210 disposed one on each side of the automobile body 214, the same operations as described above are performed substantially simultaneously on each side.

According to the second embodiment, the tire mounting apparatus 210 includes the first working mechanism 220, the second working mechanism 222a, and the third working mechanism 222b, which are separate from each other. The first working mechanism 220 comprises the tire gripping means 242 and the temporary tightening means 244, the second working mechanism 222a comprises the first full tightening means 282a, and the third working mechanism 222b comprises the second full tightening means 282b.

Consequently, the first working mechanism 220, the second working mechanism 222a, and the third working mechanism 222b are effectively made smaller and simpler than if only a single working mechanism were provided having a tire gripping means and a temporary tightening means.

In addition, the first working mechanism 220 may be constituted by the single motor 264, since the temporary tightening means 244 is included therein. The motor 264 therefore is much smaller and lighter than if a tightening means were provided to tighten the nuts both temporarily and fully, thus easily allowing the first working mechanism 220 to be made smaller and lighter.

Furthermore, the first working mechanism 220, the second working mechanism 222a, and the third working mechanism 222b share the tire mounting operation. Therefore, a plurality of operation sequences can be performed concurrently, whereby the overall tire mounting control process is made shorter and more efficient.

Figure 19:
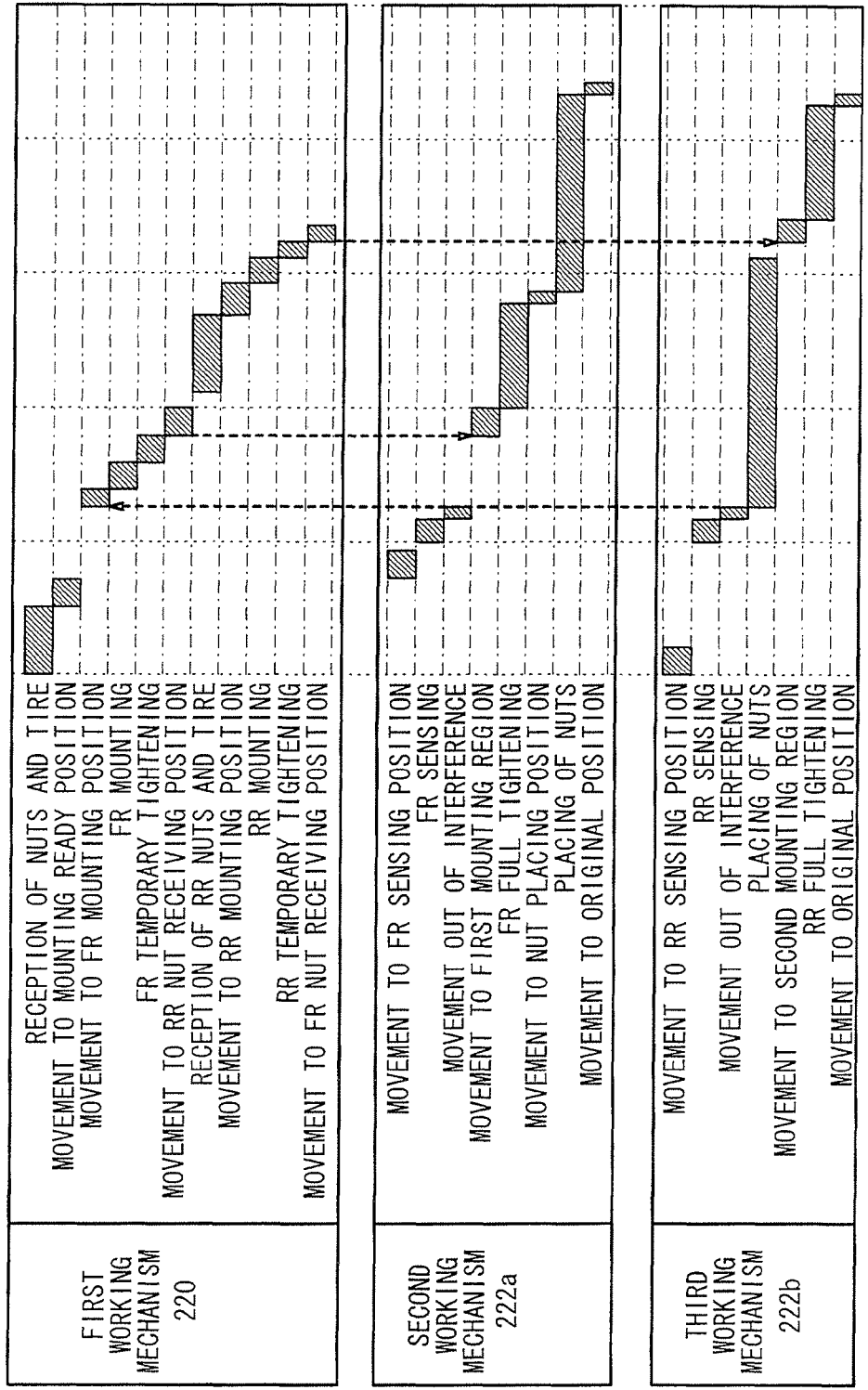
FIG. 19 is a timing chart of the mounting method according to the second embodiment.

More specifically, as shown in FIG. 19, while the first working mechanism 220 receives the nuts 228 and the tire W for the front wheel, the third working mechanism 222b moves the sensing cameras 284b, 286b to the second mounting region 224b.

Operation of the second working mechanism 222a to sense the first mounting region 224a, and operation of the third working mechanism 222b to sense the second mounting region 224b are performed simultaneously. The first working mechanism 220 does not need to perform the above sensing operation, and thus is able to temporarily tighten the tires W in the first mounting region 224a and the second mounting region 224b more efficiently.

While the first working mechanism 220 mounts the nuts 228 and a tire W in the second mounting region 224b, the second working mechanism 222a fully tightens the nuts 228 in the first mounting region 224a, while the third working mechanism 222b arrays nuts 228 on the nut table 232a. Therefore, easily and reliably, the tire mounting process can be made shorter and more efficient overall.

When the number of bolt holes for the tire W is changed due to a change in the type of automobile body 214, the tool unit 270 of the temporary tightening means 244 of the first working mechanism 220 is changed. More specifically, the tool unit 270 having five nut runners 272 secured thereto is replaced with a new tool unit 270 having four nut runners 272 mounted thereon.

In the second working mechanism 222a and the third working mechanism 222b, the cylinders 296 of the first full tightening means 282a and the second full tightening means 282b are actuated in order to turn the interval adjusters 298 about the support shafts 299 so as to adjust the interval (pitch) therebetween. The interval between the first nut runner 290 and the second nut runner 294 thus is changed in pitch, depending on the arrangement of the four hub bolts 218.

Third Embodiment

Figure 20:
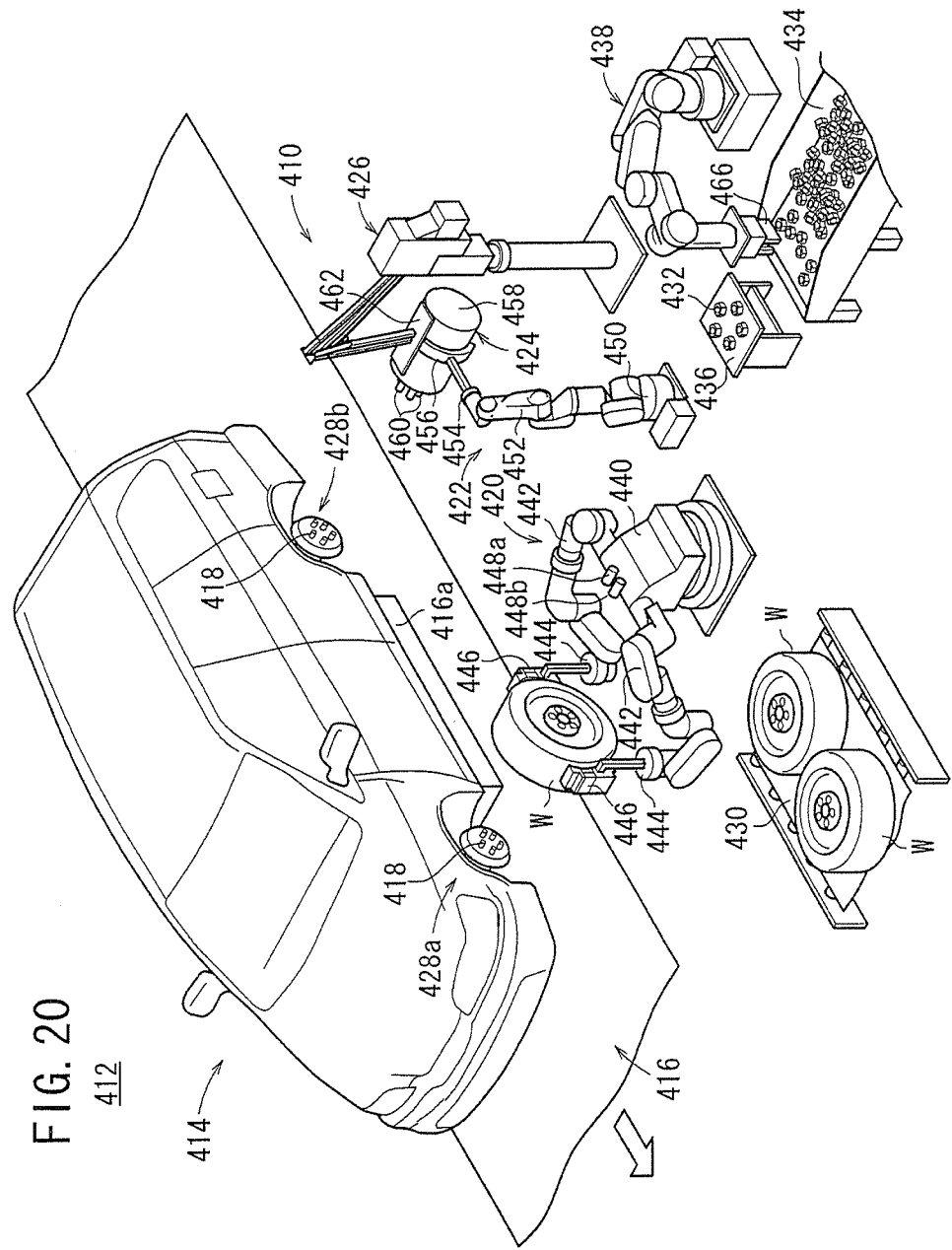
FIG. 20 is a perspective view of an assembly line incorporating a tire mounting apparatus according to a third embodiment of the present invention.

FIG. 20 is a perspective view of an assembly line 412 incorporating a tire mounting apparatus 410 according to a third embodiment of the present invention.

The assembly line 412 has a feed path 416 for pitch-feeding an automobile body (motor vehicle) 414 placed on a carriage 416a to a tire mounting position. A pair of tire mounting apparatus 410 (only one is shown in FIG. 20), disposed one on each side of the feed path 416, automatically mount tires W onto hub bolts 418 of the automobile body 414.

The tire mounting apparatus 410 has a tire setting robot 420, a nut tightening robot (second working mechanism) 422, and a balancer mechanism (first working mechanism) 426 with a nut runner unit (working unit) 424 mounted thereon.

The feed path 416 feeds the automobile body 414 intermittently so that a first mounting region 428a on a front wheel side of the automobile body 414, and a second mounting region 428b on a rear wheel side of the automobile body 414 will be positioned successively in a tire mounting station.

Near the tire setting robot 420, there is disposed a tire charging conveyor 430 on which tires W are placed. Near the nut tightening robot 422, there are disposed a nut stock 434 for accommodating nuts 432 to be tightened on the hub bolts 418, and a nut arraying robot 438 for removing a certain number of (five or four) nuts 432 from the nut stock 434, and placing the nuts 432 in an array on a nut table 436.

The tire setting robot 420 includes a swingable robot body 440 having a pair of arms 442, which include respective hands 444 on distal ends thereof, with tire grippers 446 mounted thereon. CCD image-capturing cameras (hereinafter simply referred to as cameras) 448a, 448b are mounted on the robot body 440, for capturing images of the first mounting region 428a and the second mounting region 428b in order to detect positions of the respective hub bolts.

The nut tightening robot 422 includes a robot body 450 having an arm 452, which includes a hand 454 on a distal end thereof. A gripper 456 detachably coupled to the nut runner unit 424 is mounted on the hand 454.

Figure 21:
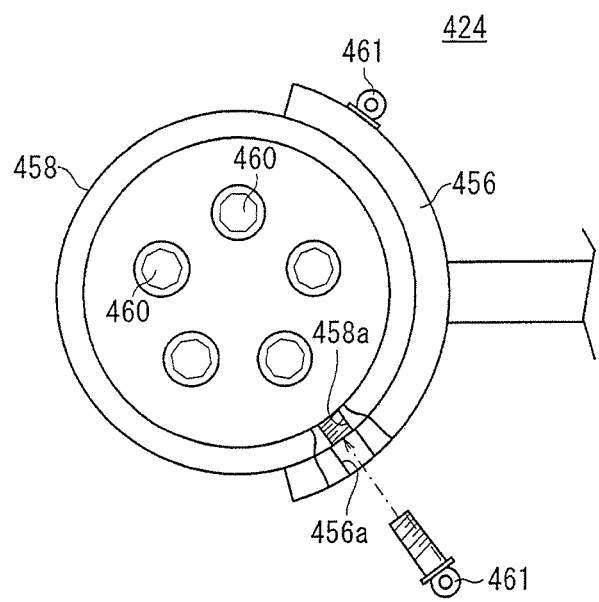
FIG. 21 is a front elevational view of a nut runner unit of the tire mounting apparatus according to the third embodiment.

As shown in FIGS. 20 and 21, the nut runner unit 424 has a hollow cylindrical casing 458 housing five (or four) motors therein, not shown. Nut runners 460, which are coupled respectively to the motors, are exposed from an end of the hollow cylindrical casing 458. The nut runners 460 are disposed in a circular pattern in alignment with respective hub bolts 418 in the first mounting region 428a and the second mounting region 428b.

As shown in FIG. 21, the hollow cylindrical casing 458 has two threaded holes 458a defined therein. The gripper 456 has holes 456a defined therein in alignment with the threaded holes 458a. Screws 461 inserted through the holes 456a are threaded into the threaded holes 458a, thereby fastening the hollow cylindrical casing 458 to the gripper 456.

The balancer mechanism 426 comprises an air-operated floor-mounted balancer. The balancer mechanism 426 includes an attachment 462 on which the nut runner unit 424 is mounted. The balancer mechanism 426 bears the weight of the nut runner unit 424, which is a heavy object, and also is able to hold the nut runner unit 424, which is movably mounted thereon. Alternatively, the balancer mechanism 426 may comprise a ceiling-supported balancer.

The nut arraying robot 438 has an arm supporting on a distal end thereof a nut chuck 466, which is openable and closable for removing a nut 432 accommodated in a nut stock 434, and placing the nut 432 on a nut table 436.

Figure 22:
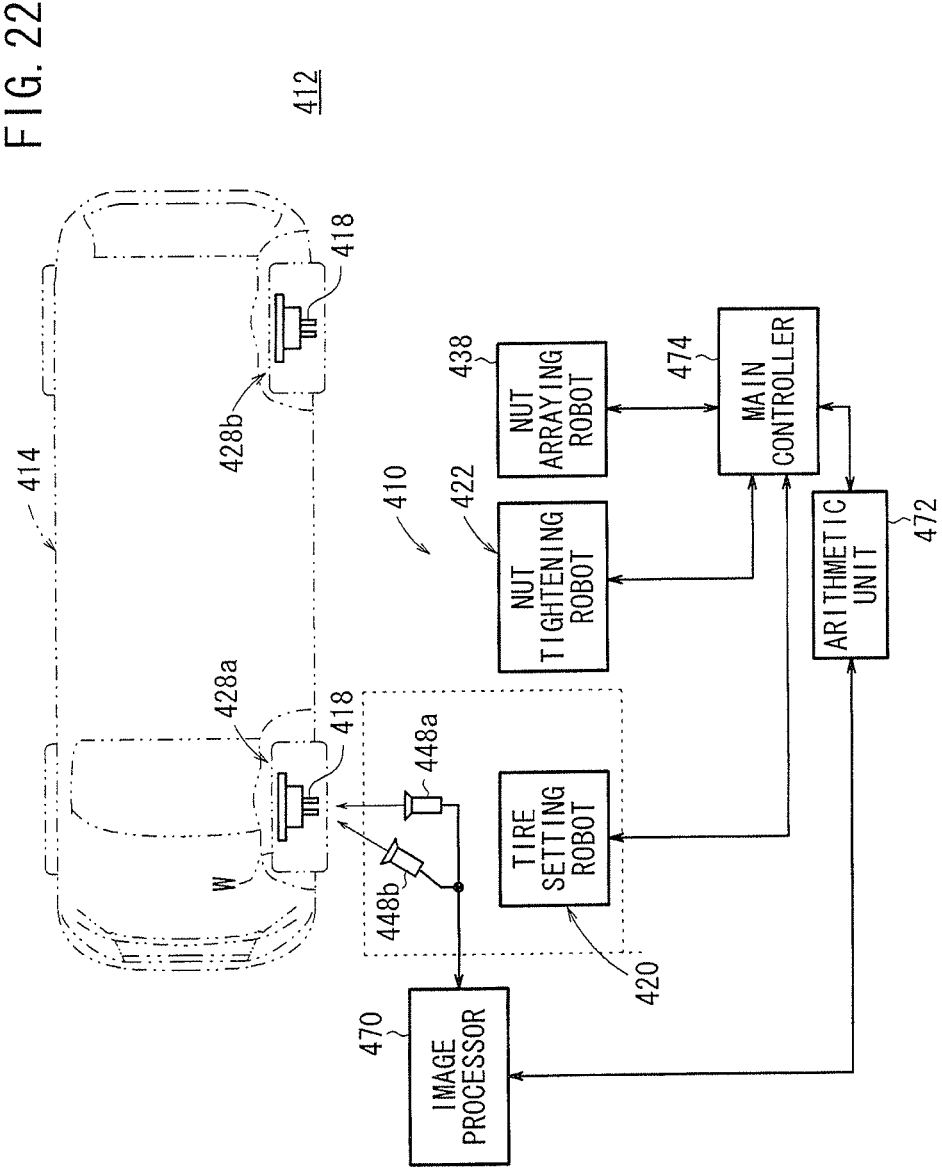
FIG. 22 is a block diagram of the tire mounting apparatus according to the third embodiment.

As shown in FIG. 22, cameras 448a, 448b associated with the tire setting robot 420 output image information concerning the first mounting region 428a and the second mounting region 428b to an image processor 470. The image processor 470 is connected to an arithmetic unit 472. The arithmetic unit 472 calculates positions of the hub bolts in the first mounting region 428a as well as positions of the hub bolts in the second mounting region 428b, and outputs the calculated positions to a main controller 474.

Based on the calculated information input from the arithmetic unit 472, the main controller 474 controls operations of the nut tightening robot 422, and also controls operations of the tire setting robot 420 and the nut arraying robot 438.

Operation of the tire mounting apparatus 410 thus constructed will be described in relation to a mounting method according to the third embodiment, with reference to the flowcharts shown in FIGS. 23 and 24 and the timing chart shown in FIG. 25.

Figure 23:
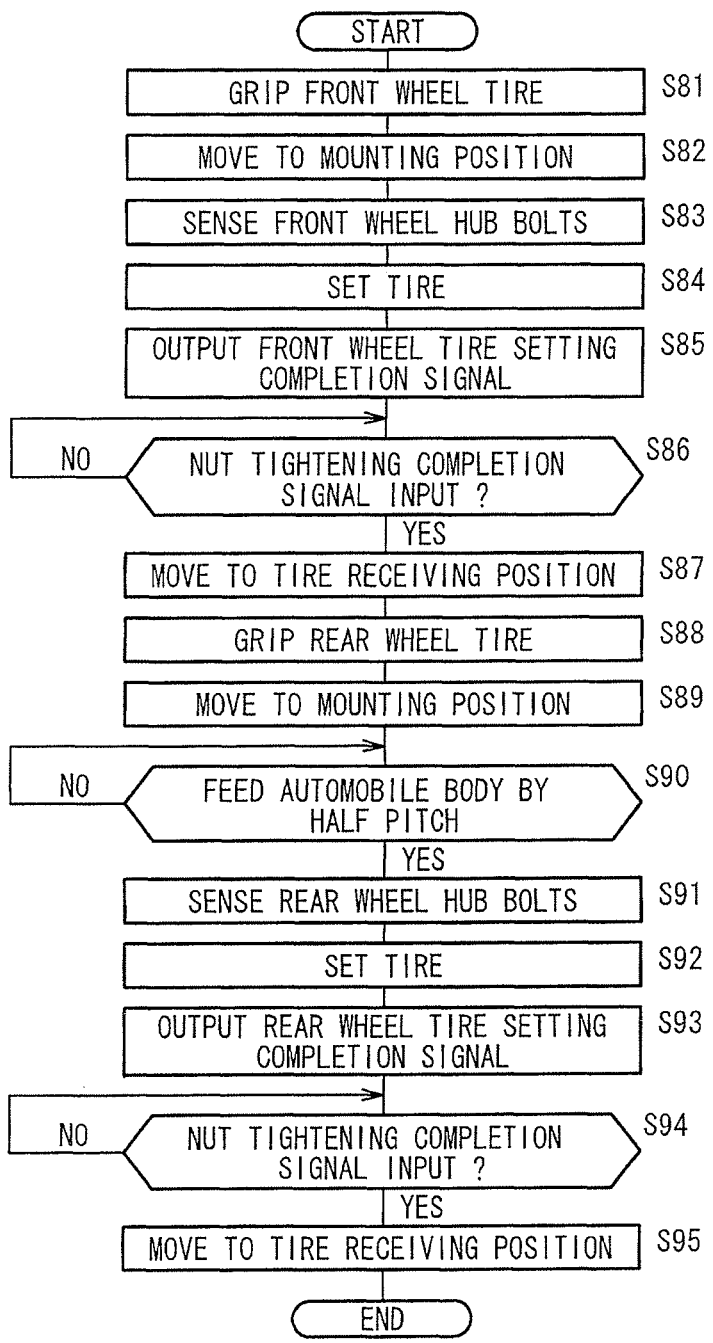
FIG. 23 is a flowchart of an operation sequence of a tire setting robot in a mounting method according to the third embodiment.
Figure 24:
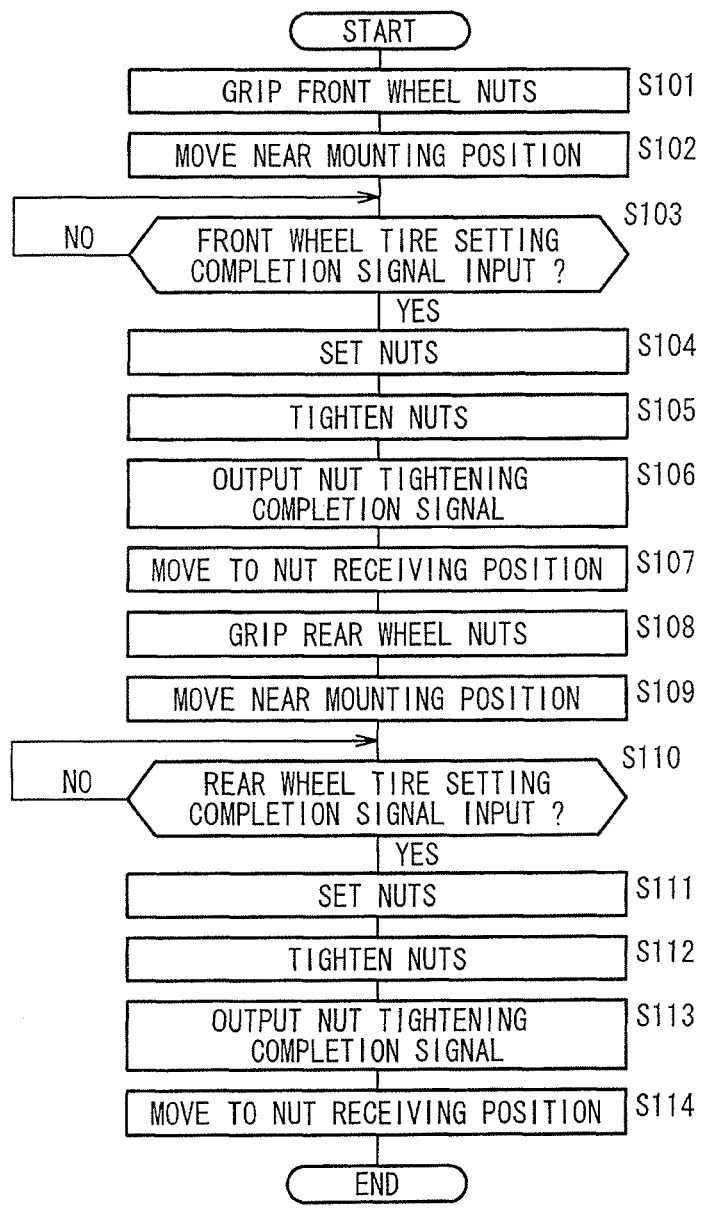
FIG. 24 is a flowchart of an operation sequence of a nut tightening robot in the mounting method according to the third embodiment.
Figure 25:
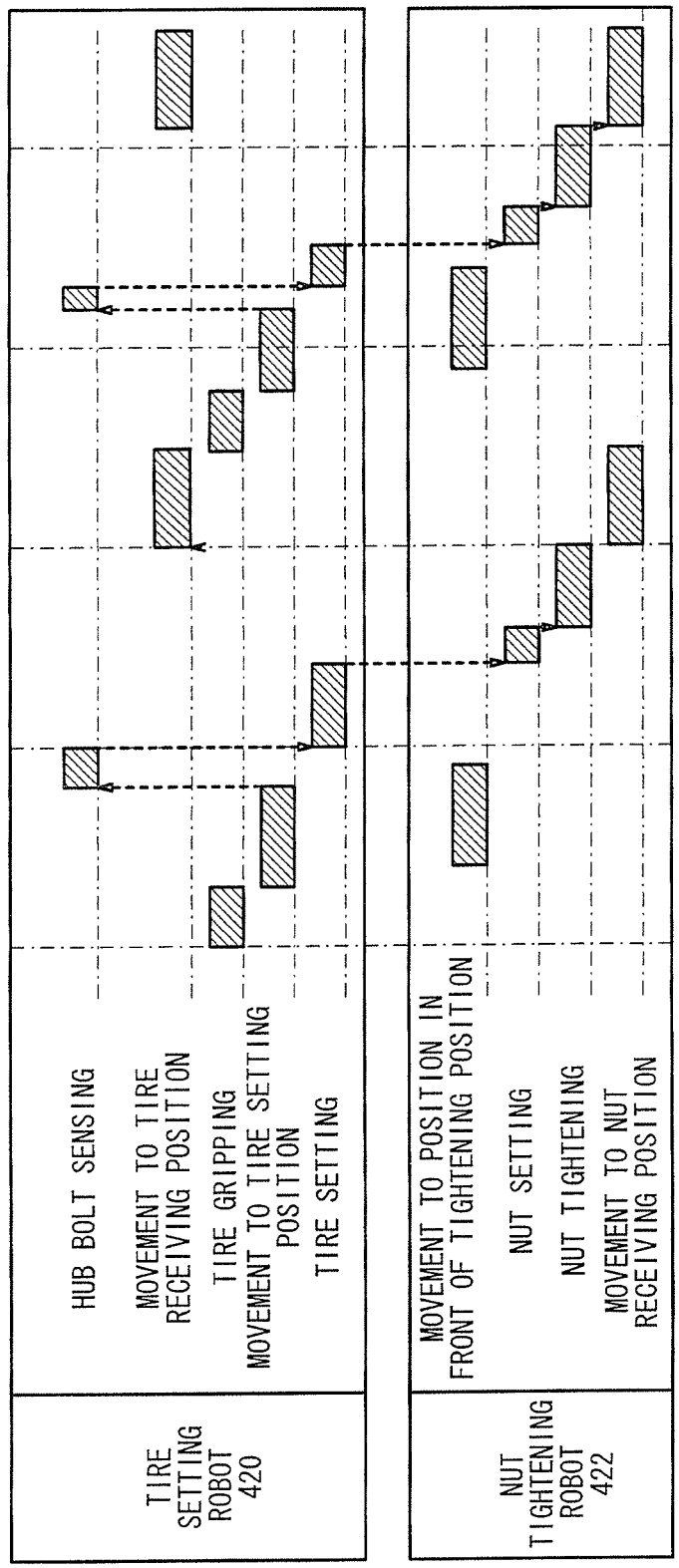
FIG. 25 is a timing chart of the mounting method according to the third embodiment.

An operation sequence of the tire setting robot 420 is shown in FIG. 23, while an operation sequence of the nut tightening robot 422 is shown in FIG. 24. The tire setting robot 420 and the nut tightening robot 422 operate in relation to each other, as shown in FIG. 25.

First, the operation sequence of the tire setting robot 420 will be described below. The tire setting robot 420 grips a tire W disposed on the tire charging conveyor 430 with the pair of tire grippers 446 (step S81).

As the robot body 440 swings, the tire setting robot 420, which grips the tire W, moves the tire W gripped by the tire grippers 446 to a mounting position (step S82). At this time, a first mounting region 428a on the front wheel side of the automobile body 414 is disposed in the tire mounting station (mounting position).

In the tire setting robot 420, the cameras 448a, 448b capture images of the first mounting region 428a. The captured images are processed in order to sense the hub bolts 418 (step S83).

Then, control proceeds to step S84, in which the tire setting robot 420 sets a tire W in the first mounting region 428a. A front wheel setting completion signal is output (step S85), and then it is determined whether or not the nut tightening robot 422 has completed tightening of the front wheel nuts 432 (step S86).

If a tightening completion signal for the nuts 432 is input (step S86: YES), then control proceeds to step S87, in which the tire setting robot 420 moves toward a tire receiving position at the tire charging conveyor 430. One of the rear wheel tires W that is placed on the tire charging conveyor 430 is gripped by the tire grippers 446 of the tire setting robot 420 (step S88).

The tire setting robot 420 moves toward the tire mounting position (step S89). If the automobile body 414 is detected as having been fed a half pitch (step S90: YES), i.e., if the second mounting region 428b on the rear wheel side is positioned in the tire mounting station, then control proceeds to step S91, in which hub bolts 418 in the second mounting region 428b are sensed. The hub bolts 418 are sensed in the same manner that the front wheel hub bolts 418 were sensed in step S83.

Then, control proceeds to step S92, in which the tire W is set in the second mounting region 428b. Then, a rear wheel tire setting completion signal is output (step S93). In the second mounting region 428b where the tire W has been set, nuts 432 are tightened onto the hub bolts 418. Once tightening of the nuts 432 is completed (step S94: YES), control proceeds to step S95, in which the tire setting robot 420 moves to the tire receiving position.

An operation sequence of the nut tightening robot 422 will be described below with reference to FIG. 24.

The nut tightening robot 422 is actuated to move the nut runner unit 424 coupled to the gripper 456 toward the nut table 436. The nut runners 460 of the nut runner unit 424 grip five front wheel nuts 432, which are arrayed on the nut table 436 (step S101).

Then, the nut tightening robot 422 is actuated in order to move the nut runner unit 424 to a position near the first mounting region 428a at the mounting position (step S102). If the front wheel tire W is detected as being set by the tire setting robot 420 (step S103: YES), then control proceeds to step S104, in which the nut runners 460 of the nut runner unit 424 are positioned in the first mounting region 428a at the respective hub bolts 418.

The nut runners 460 then are rotated by respective motors, not shown, so as to tighten the nuts 432 on the respective hub bolts 418 (step S105). When tightening of the nuts 432 is completed, a nut tightening completion signal is output (step S106).

The nut tightening robot 422 is actuated in order to move the nut runner unit 424 toward a nut receiving position at the nut table 436 (step S107), whereupon the nut runners 460 grip the rear wheel nuts 432 (step S108).

After the automobile body 414 has been fed a half pitch, control proceeds to step S109, in which the nut runner unit 424 is moved to a position near the second mounting region 428b at the mounting position. When it is judged that a rear wheel tire W has been set in the second mounting region 428b (step S110: YES), control then proceeds to step S111, in which the nut runner unit 424 is positioned in the second mounting region 428b. The nut runners 460 are rotated in order to tighten the nuts 432 on the hub bolts 418 in the second mounting region 428b (step S112).

At this time, tightening of the nuts 432 in the second mounting region 428b is completed (step S113). Control then proceeds to step S114, in which the nut runner unit 424 moves to the nut receiving position.

Since the assembly line 412 includes the tire mounting apparatus 410 disposed one on each side of the automobile body 414, the same operations as those described above are performed substantially simultaneously on each side.

According to the third embodiment, the nut runner unit 424, which is considerably heavy, is mounted on the balancer mechanism 426. Therefore, the weight of the nut runner unit 424 is borne by the balancer mechanism 426, and the nut runner unit 424 is capable of moving in various directions.

The nut tightening robot 422 is detachably coupled to the nut runner unit 424, and is automatically operated according to a nut tightening process, with the nut runner unit 424 being mounted on the balancer mechanism 426.

Inasmuch as the balancer mechanism 426 bears the weight of the nut runner unit 424, when the nut tightening robot 422 actually causes the nut runner unit 424 to operate, the load imposed on the nut tightening robot 422 by the nut runner unit 424 is effectively reduced. The nut tightening robot 422 can be reduced in size, thus easily making the tire mounting apparatus 410 smaller and simpler in its entirety.

When the nut tightening robot 422 is shut down for maintenance or the like, the nut tightening robot 422 can be released from the nut runner unit 424. The operator therefore is able to operate the nut runner unit 424 easily while being assisted by the balancer mechanism 426.

Fourth Embodiment

Figure 26:
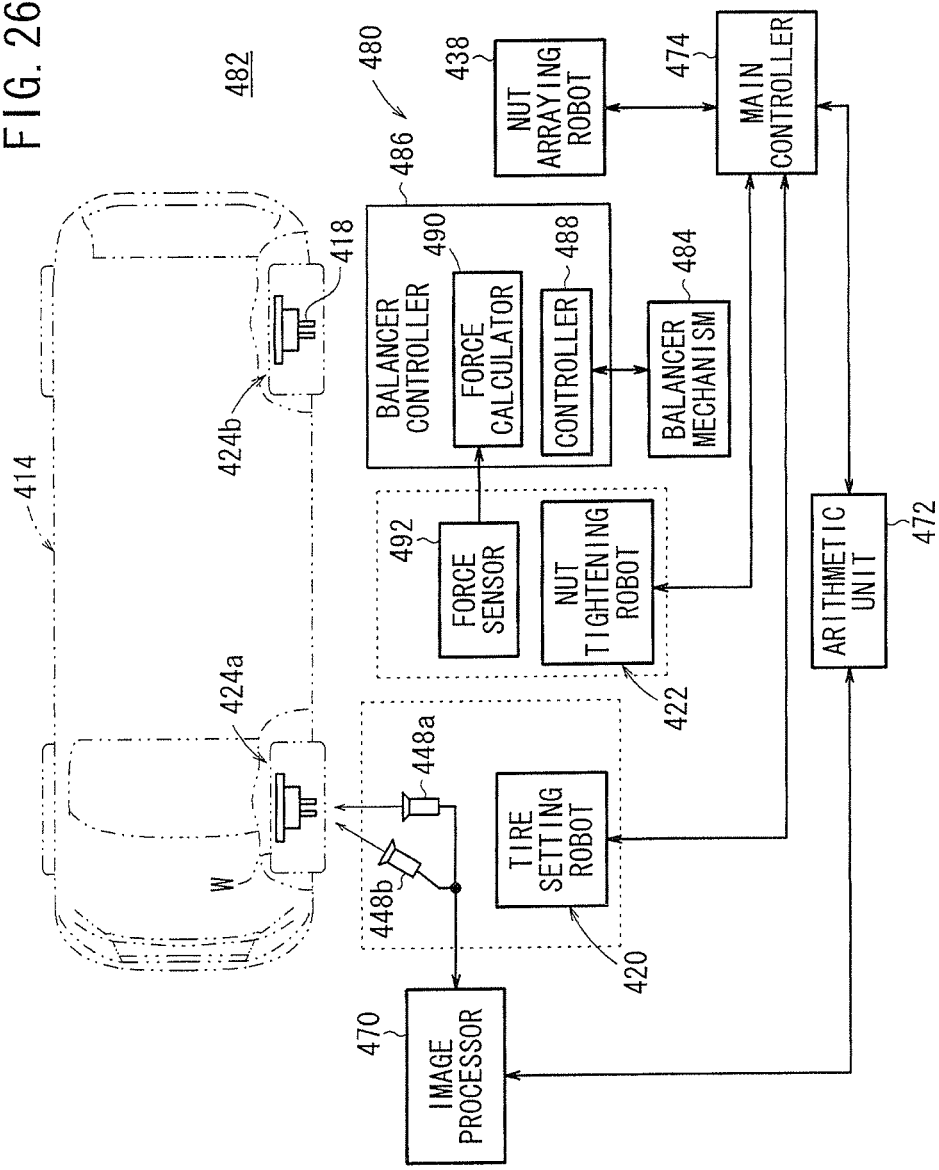
FIG. 26 is a block diagram of an assembly line incorporating a tire mounting apparatus according to a fourth embodiment of the present invention.

FIG. 26 is a block diagram of an assembly line 482 incorporating a tire mounting apparatus 480 according to a fourth embodiment of the present invention. Those components of the assembly line 482 that are identical to those of the assembly line 412 according to the third embodiment are denoted by identical reference characters, and such features will not be described in detail below.

The tire mounting apparatus 480 comprises a tire setting robot 420, a nut tightening robot 422, and a balancer mechanism 484 having a nut runner unit 424 mounted thereon. The balancer mechanism 484 comprises an electrically operated balancer, which is controlled by a controller 488 of a balancer controller 486.

The balancer controller 486 includes a force calculator 490 connected to a force sensor 492 mounted on the hand of the nut tightening robot 422. The force sensor 492 inputs a load, which is imposed on the hand of the nut tightening robot 422, to the force calculator 490.

According to the fourth embodiment, the nut runner unit 424 is operated according to a nut tightening process performed by the nut tightening robot 422. When a relatively large reactive force is applied to the hand of the nut tightening robot 422, the controller 488 controls an actuator (not shown) of the balancer mechanism 484 in order to reduce the reactive force to zero, or to a sufficiently small value, based on a signal that is input from the force sensor 492 to the force calculator 490.

Therefore, the force required for the nut tightening robot 422 to feed the nut runner unit 424 is significantly reduced, and hence the nut tightening robot 422 can reliably be made smaller in size.

Fifth Embodiment

Figure 27:
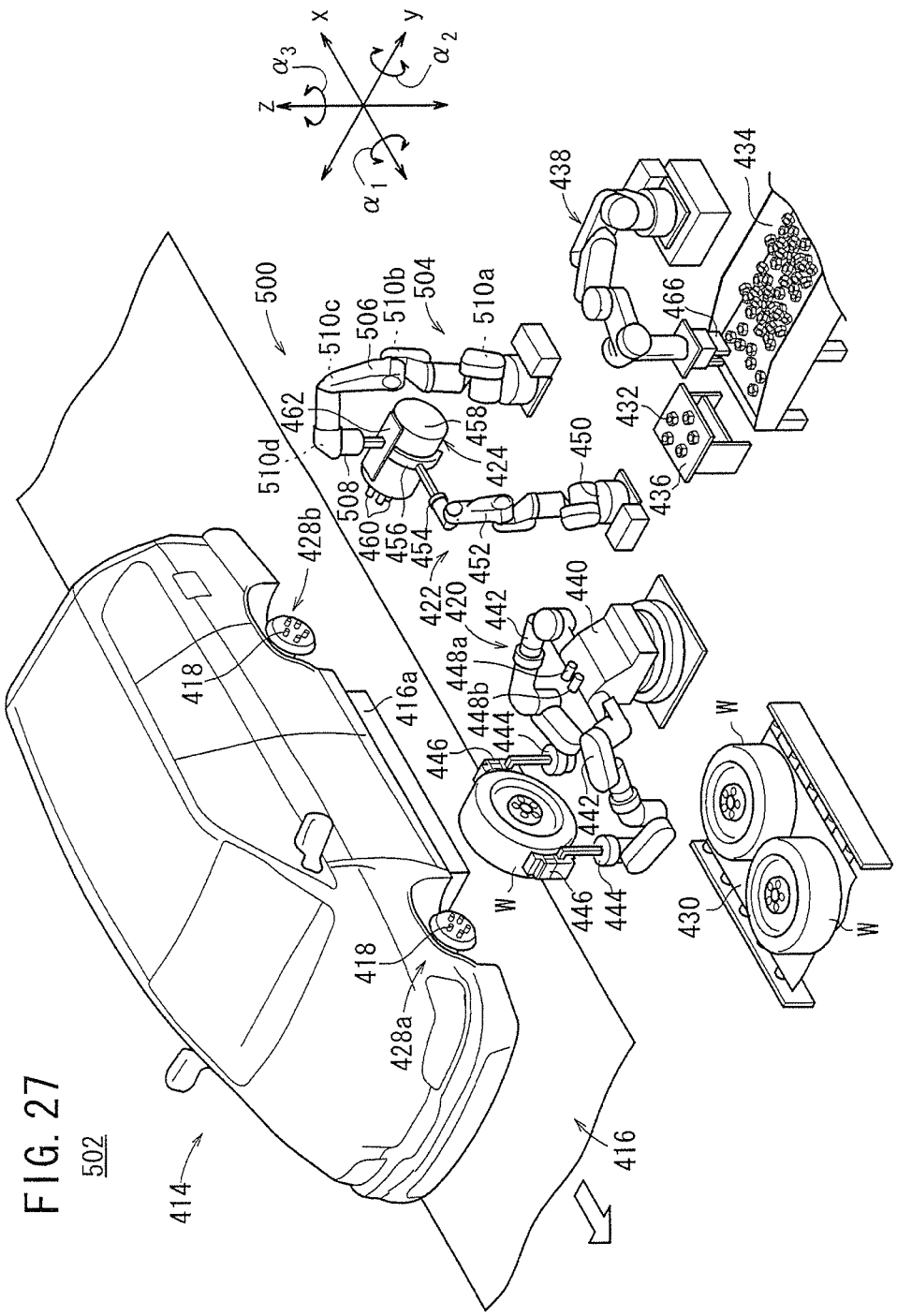
FIG. 27 is a perspective view of an assembly line incorporating a tire mounting apparatus according to a fifth embodiment of the present invention.

FIG. 27 is a perspective view of an assembly line 502 incorporating a tire mounting apparatus 500 according to a fifth embodiment of the present invention. Those components of the assembly line 502 that are identical to those of the assembly line 412 according to the third embodiment are denoted by identical reference characters, and such features will not be described in detail below.

The tire mounting apparatus 500 comprises a tire setting robot 420, a nut tightening robot (second working mechanism) 422, and a multijoint robot (first working mechanism) 504 having a nut runner unit (working unit) 424 mounted thereon.

The multijoint robot 504 comprises a multijoint general-purpose robot, which is of the same structure as the nut tightening robot 422, for example. The multijoint robot 504 has an arm 506 with a force sensor 508 mounted on a distal end thereof. The force sensor 508 detects reactive forces in directions of six axes, including an X-axis, a Y-axis, a Z-axis, an α1 axis, an α2 axis, and an α3 axis of a coordinate system, based on the force sensor 508. The multijoint robot 504 includes actuators 510a through 510d for actuating the joints thereof.

With the fifth embodiment thus constructed, when the nut tightening robot 422 operates the nut runner unit 424 according to a nut tightening process, the force sensor 508 detects reactive forces along the directions of the six axes.

The actuators 510a through 510d are controlled so as to reduce to zero, or to a sufficiently small value, the detected reactive forces. Therefore, the force required for the nut tightening robot 422 to feed the nut runner unit 424 is significantly reduced, and hence the nut tightening robot 422 can reliably be made smaller in size.

In the third through fifth embodiments, the tire mounting apparatus 410, 480, 500 have been described as constituting the working apparatus. However, the present invention is not limited to a tire mounting apparatus, but may also applied to various other types of working apparatus.

Sixth Embodiment

Figure 28:
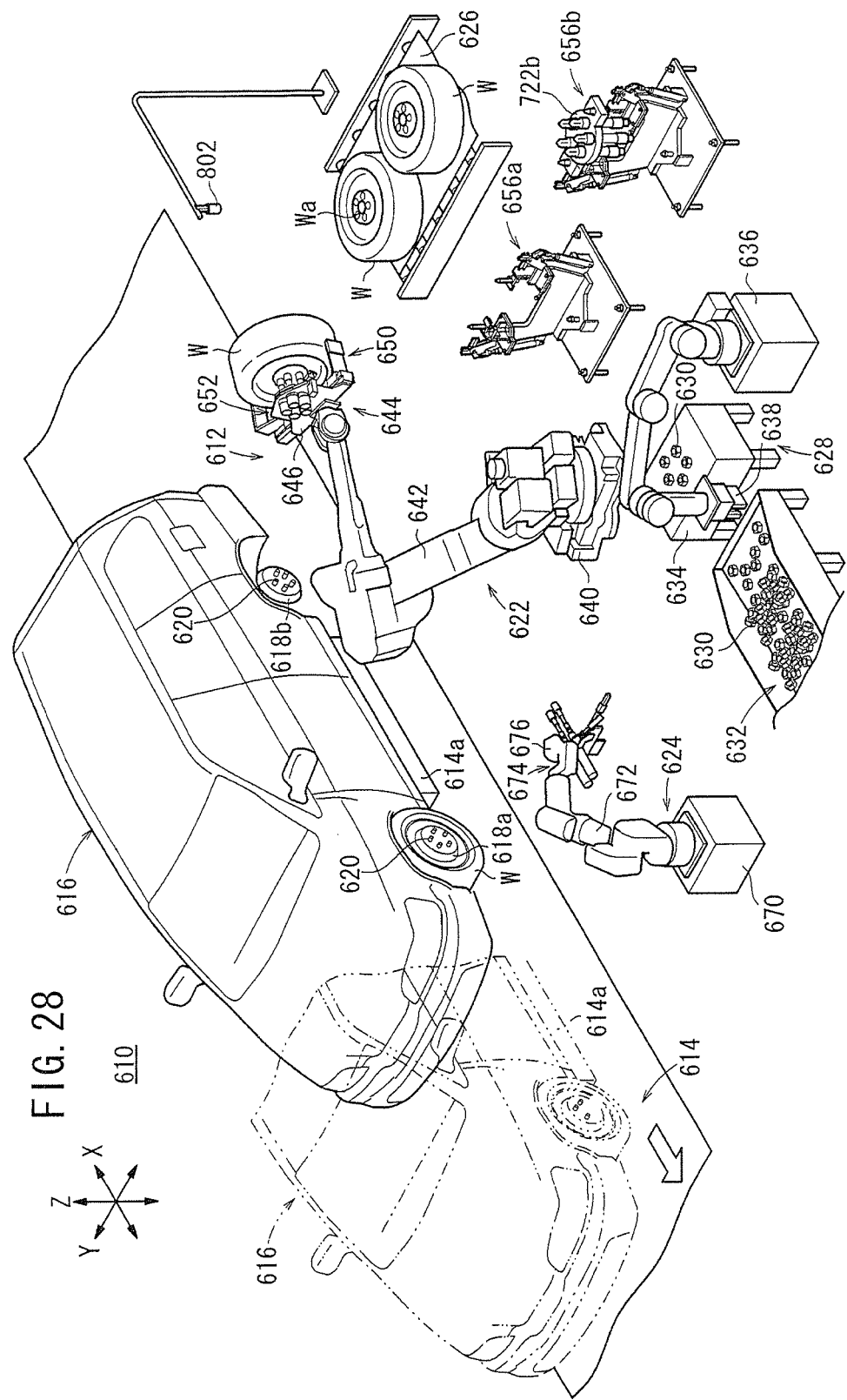
FIG. 28 is a perspective view of an assembly line incorporating a tire mounting apparatus according to a sixth embodiment of the present invention.

FIG. 28 is a perspective view of an assembly line 610 incorporating a pair of tire mounting apparatus 612 according to a sixth embodiment of the present invention.

The assembly line 610 comprises a tire mounting apparatus 612 and a feed path 614. The feed path 614 pitch-feeds an automobile body (motor vehicle) 616, which is placed on a carriage 614a, to a tire mounting position. More specifically, the feed path 614 feeds the automobile body 616 intermittently so that a first mounting region 618a on a front wheel side of the automobile body 616, and a second mounting region 618b on a rear wheel side of the automobile body 616 will be positioned successively in the tire mounting station.

The tire mounting apparatus 612 (only one of which is shown in FIG. 28), disposed one on each side of the feed path 614, automatically mount tires W onto hub bolts 620 of the automobile body 616. The tire mounting apparatus 612 includes a first working mechanism 622, and a second working mechanism 624.

The first working mechanism 622 feeds a tire W carried by a tire charging conveyor 626 to the first mounting region 618a or the second mounting region 618b, and positions the tire W therein. The first working mechanism 622 is supplied with a plurality of nuts 630 from a nut supply mechanism 628, and tightens the nuts 630 on the hub bolts 620 with rotational drive power transmitted from the second working mechanism 624.

The nut supply mechanism 628 comprises a nut stock 632 accommodating nuts 630 therein, and a nut picking robot 636 for removing a certain number of (five or four) nuts 630 from the nut stock 632 and placing the nuts 630 in an array on a nut table 634. The nut picking robot 636 has an arm that supports on a distal end a nut chuck 638, which is openable and closable for removing a nut 630 accommodated in the nut stock 632, and placing the nut 630 on the nut table 634.

Figure 30:
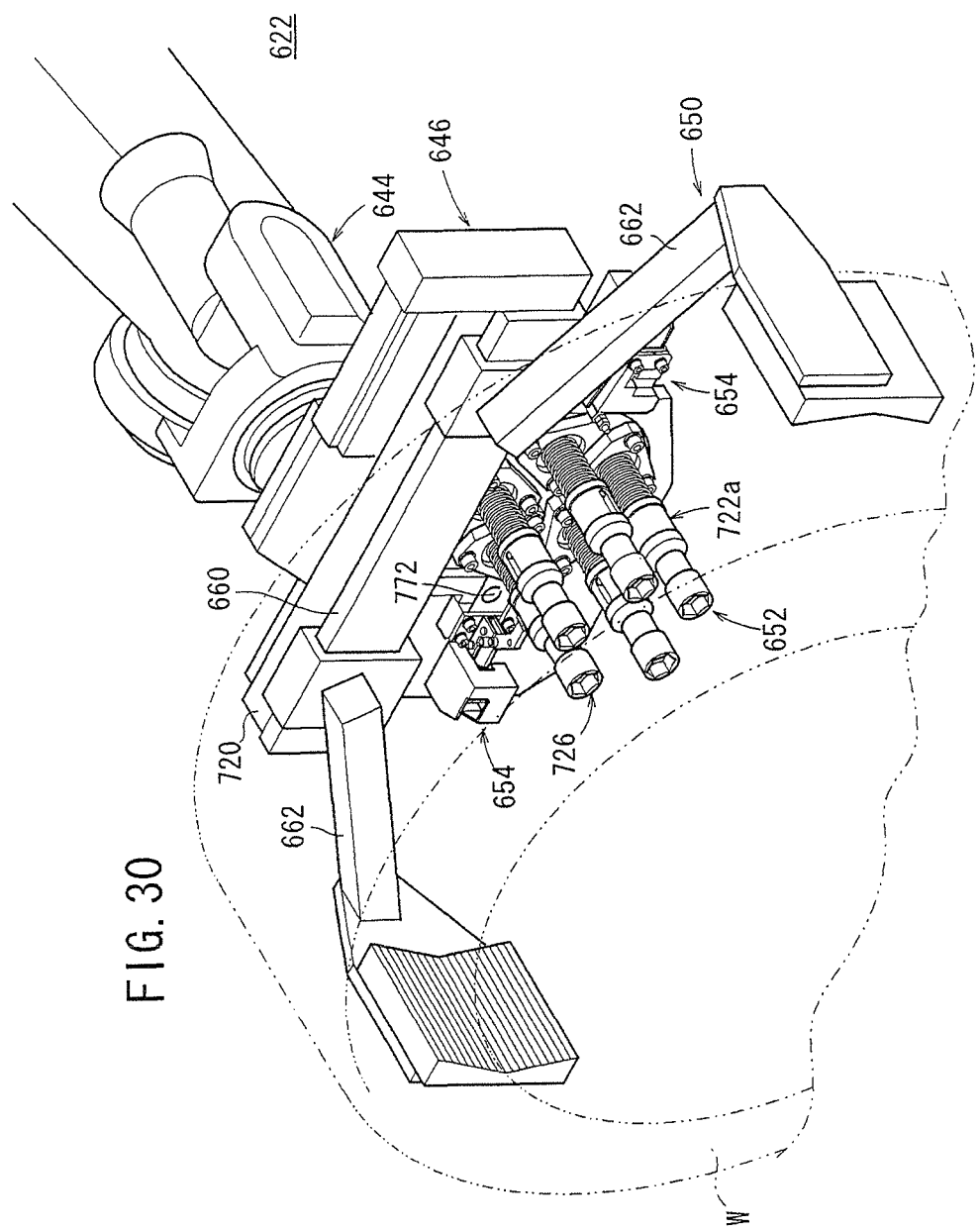
FIG. 30 is a perspective view of a main portion of a first working mechanism of the tire mounting apparatus according to the sixth embodiment.
Figure 31:
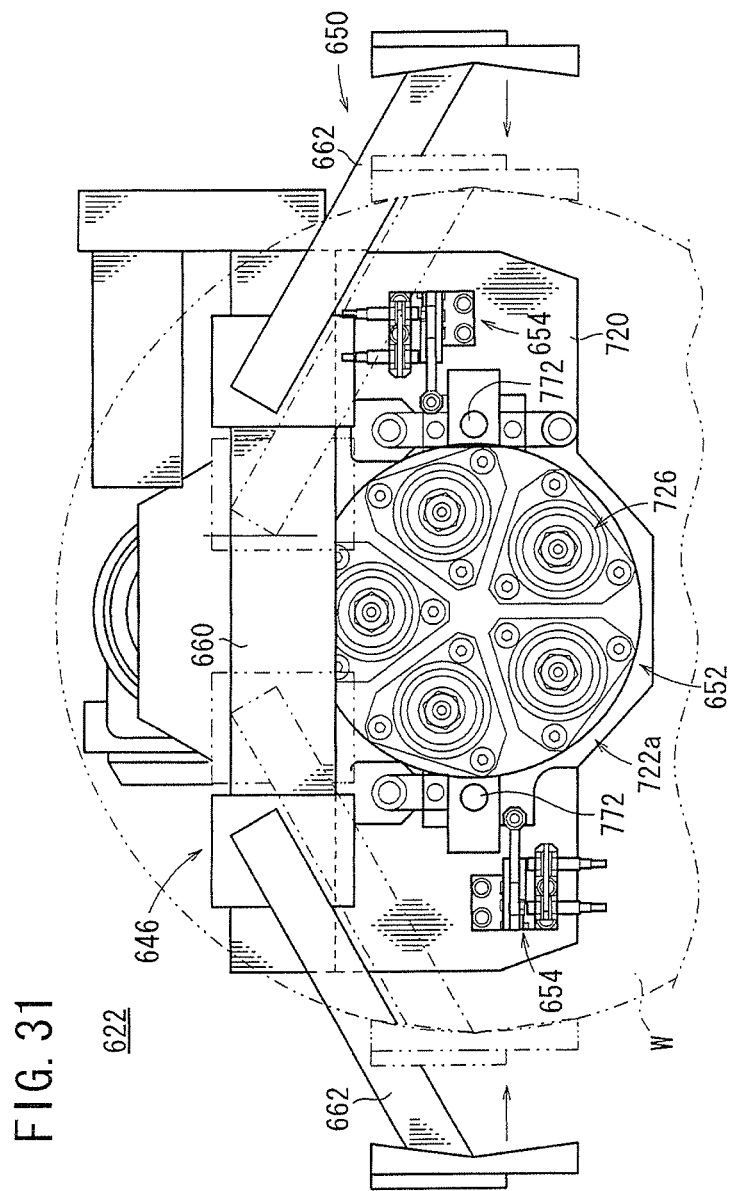
FIG. 31 is a front elevational view of the first working mechanism according to the sixth embodiment.

As shown in FIG. 28, the first working mechanism 622 includes a robot body 640, having an arm 642 that includes a hand 644 on a distal end with a rotatable index base 646 mounted thereon. As shown in FIGS. 30 and 31, the index base 646 includes a tire gripping mechanism 650 for gripping a tire W, a nut tightening mechanism 652 for tightening nuts 630 onto the hub bolts 620 with the tire W disposed thereon, and lock mechanisms 654 (see FIG. 36) for attaching and detaching a nut tightening unit 722a or a nut tightening unit 722b, to be described later, of the nut tightening mechanism 652.

As shown in FIG. 28, two nut tightening unit stands 656a, 656b (hereinafter referred to as stands 656a, 656b) are disposed near the first working mechanism 622. Among the two stands 656a, 656b, the stand 656b supports thereon a nut tightening unit 722b, which differs from the nut tightening unit 722a that is mounted on the index base 646. The nut tightening unit 722b differs from the nut tightening unit 722a as to the layout of the nut tighteners 726.

As shown in FIGS. 30 and 31, the tire gripping mechanism 650 includes a linear guide 660, which is actuatable by a motor, not shown. The linear guide 660 houses a non-illustrated drive shaft therein. When the drive shaft is rotated by the motor, two gripper arms 662 are displaced along the linear guide 660. The drive shaft includes threads thereon, which are helically turned in opposite directions from the center of the drive shaft. Upon rotation of the drive shaft, the two gripper arms 662 are moved in opposite directions while remaining in alignment with each other. When the two gripper arms 662 are moved toward or away from each other, the gripper arms 662 can grip or release a tire W therebetween.

Before describing the nut tightening mechanism 652 and the lock mechanisms 654 of the first working mechanism 622, the second working mechanism 624 will first be described below.

Figure 32:
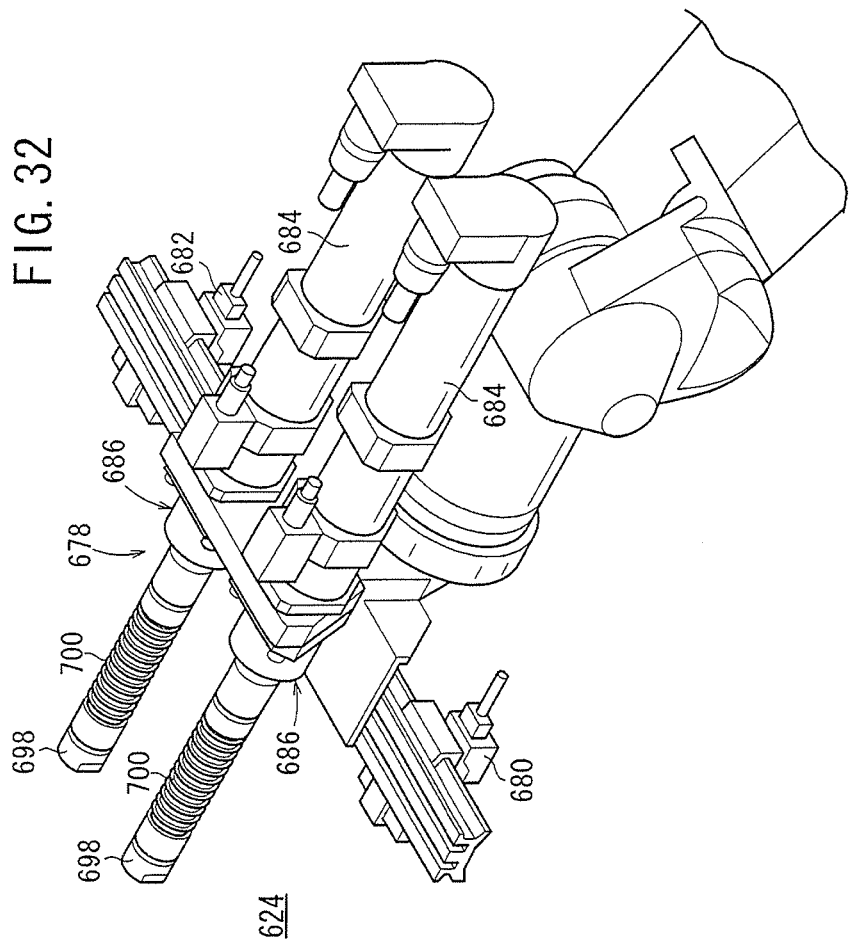
FIG. 32 is a perspective view of a main portion of a second working mechanism of the tire mounting apparatus according to the sixth embodiment.

As shown in FIG. 28, the second working mechanism 624 includes a robot body 670, having an arm 672 that includes a hand 674 on a distal end with a rotatable index base 676 mounted thereon. As shown in FIG. 32, on the index base 676, there are mounted a rotational drive power generator 678 for generating rotational drive power in order to tighten nuts 630 onto the hub bolts 620 in the first mounting region 618a and in the second mounting region 618b, and CCD cameras 680, 682 (hereinafter also referred to as "cameras 680, 682") for capturing images of the first mounting region 618a and the second mounting region 618b in order to detect positions of the hub bolts 620. The CCD cameras will hereinafter be referred to simply as cameras.

The rotational drive power generator 678 comprises two motors 684 and two rotational drive power transmitters 686, which are coupled to the motors 684 for transmitting rotational drive power generated by the motors 684.

Figure 33:
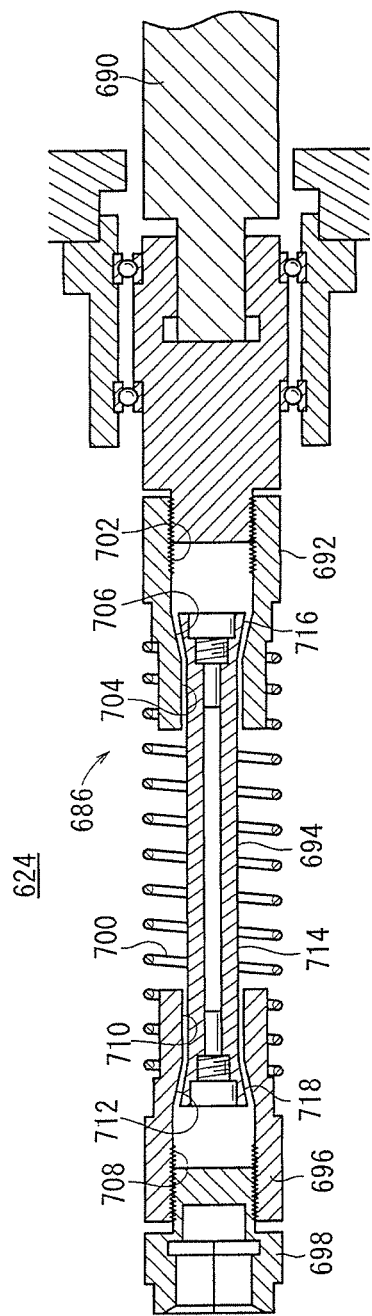
FIG. 33 is a cross-sectional view of a main portion of a rotational drive power transmitter of the second working mechanism according to the sixth embodiment.

As shown in FIG. 33, each of the rotational drive power transmitters 686 has a first rod 690, a first joint 692, a second rod 694, a second joint 696, a tubular socket 698, and a helical spring 700.

The first rod 690 has one end coupled to the output shaft (not shown) of the motor 684, and another end coupled to the first joint 692. The first joint 692 is hollow in shape, and has a first hollow cylindrical portion 702, a second hollow cylindrical portion 704 smaller in diameter than the first hollow cylindrical portion 702, and a first tapered portion 706 interposed between the first hollow cylindrical portion 702 and the second hollow cylindrical portion 704. The first hollow cylindrical portion 702 has an internally threaded surface, which is held in threaded engagement with an externally threaded end portion of the first rod 690. The second joint 696 is identical in structure to the first joint 692, and has a third hollow cylindrical portion 708, a fourth hollow cylindrical portion 710 smaller in diameter than the third hollow cylindrical portion 708, and a second tapered portion 712 interposed between the third hollow cylindrical portion 708 and the fourth hollow cylindrical portion 710. The third hollow cylindrical portion 708 has an internally threaded surface, which is held in threaded engagement with an externally threaded end portion of the tubular socket 698.

The second rod 694 has a cylindrical portion 714, together with a third tapered portion 716 and a fourth tapered portion 718, which are disposed on opposite ends of the cylindrical portion 714 and become progressively greater in diameter toward the ends thereof. The cylindrical portion 714 of the second rod 694 has a diameter, which is slightly smaller than the diameter of the first hollow cylindrical portion 702 of the first joint 692 and the fourth hollow cylindrical portion 710 of the second joint 696. The third tapered portion 716 of the second rod 694 is housed in the first joint 692 (first tapered portion 706), and is greater in diameter than the second hollow cylindrical portion 704. The fourth tapered portion 718 of the second rod 694 is housed in the second joint 696 (second tapered portion 712), and is greater in diameter than the fourth hollow cylindrical portion 710. The helical spring 700 covers the second rod 694 and is interposed between the first joint 692 and the second joint 696.

Figure 34:
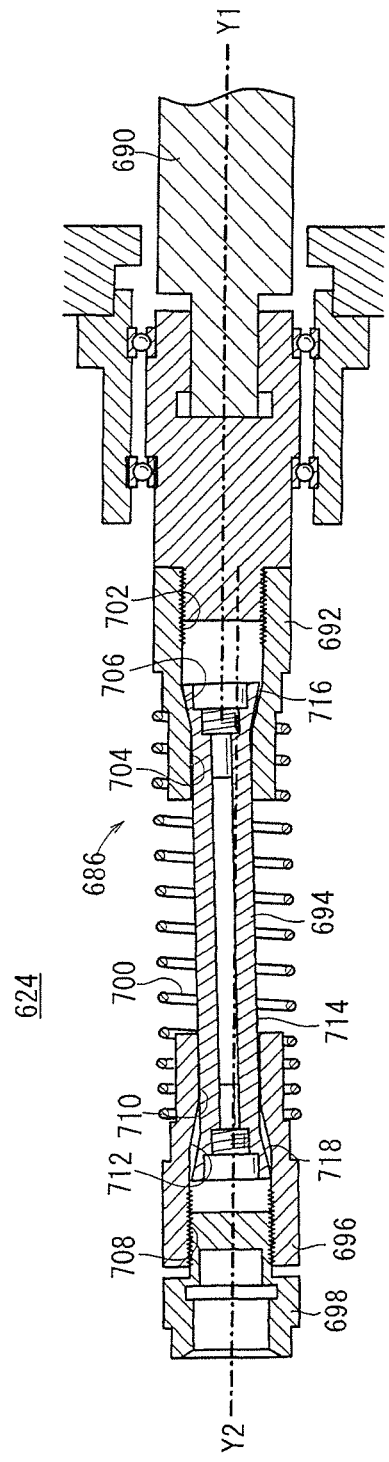
FIG. 34 is a cross-sectional view showing, by way of example, a manner in which the rotational drive power transmitter according to the sixth embodiment operates.

Since the rotational drive power transmitters 686 are constructed as described above, their rotational axes can be offset as shown in FIG. 34. More specifically, when the rotational axis Y1 of the first joint 692 and the rotational axis Y2 of the second joint 696 are offset from each other, rotational drive power can be transmitted from the first joint 692 to the second joint 696. The first joint 692, the second rod 694, and the second joint 696 make up a universal joint mechanism. Accordingly, even when the nut tighteners 726 of the first working mechanism 622 is changed in position, it is possible to transmit rotational drive power from the second working mechanism 624 to the first working mechanism 622.

The first working mechanism 622 will further be described below. As shown in FIGS. 30 and 31, the nut tightening mechanism 652 comprises an attachment plate 720 fixed to the index base 646, and a nut tightening unit 722a detachably mounted on the attachment plate 720. The two lock mechanisms 654 referred to above are provided to secure the nut tightening unit 722a to the attachment plate 720. According to the sixth embodiment, the nut tightening unit 722a can be replaced depending on the layout of the hub bolts 620 and the bolt holes Wa (i.e., the type of tire W). A nut tightening unit 722b for replacement is disposed on the stand 656b.

Figure 29:
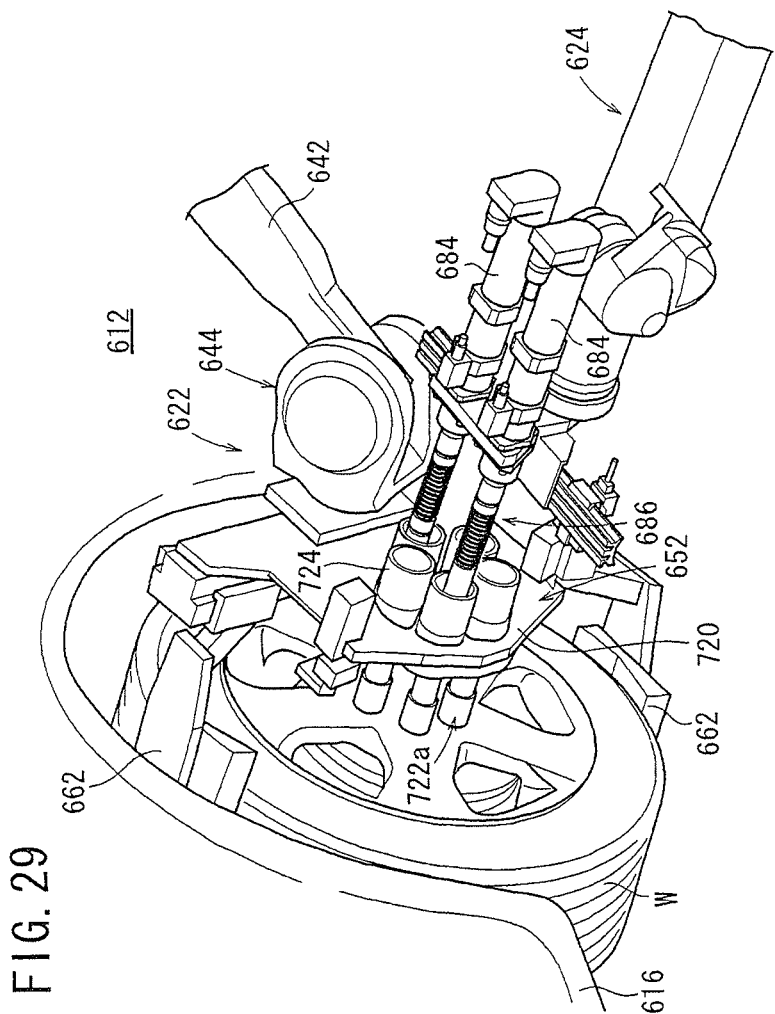
FIG. 29 is a perspective view showing the manner in which a tire is mounted by the tire mounting apparatus according to the sixth embodiment.

As shown in FIG. 29, the attachment plate 720 has a plurality of opening guides 724 to which the rotational drive power transmitters 686 of the second working mechanism 624 are coupled.

As shown in FIGS. 30 and 31, the nut tightening unit 722a comprises five nut tighteners 726. The number of nut tighteners 726 is the same as the number of hub bolts 620 and the number of bolt holes Wa.

Figure 35:
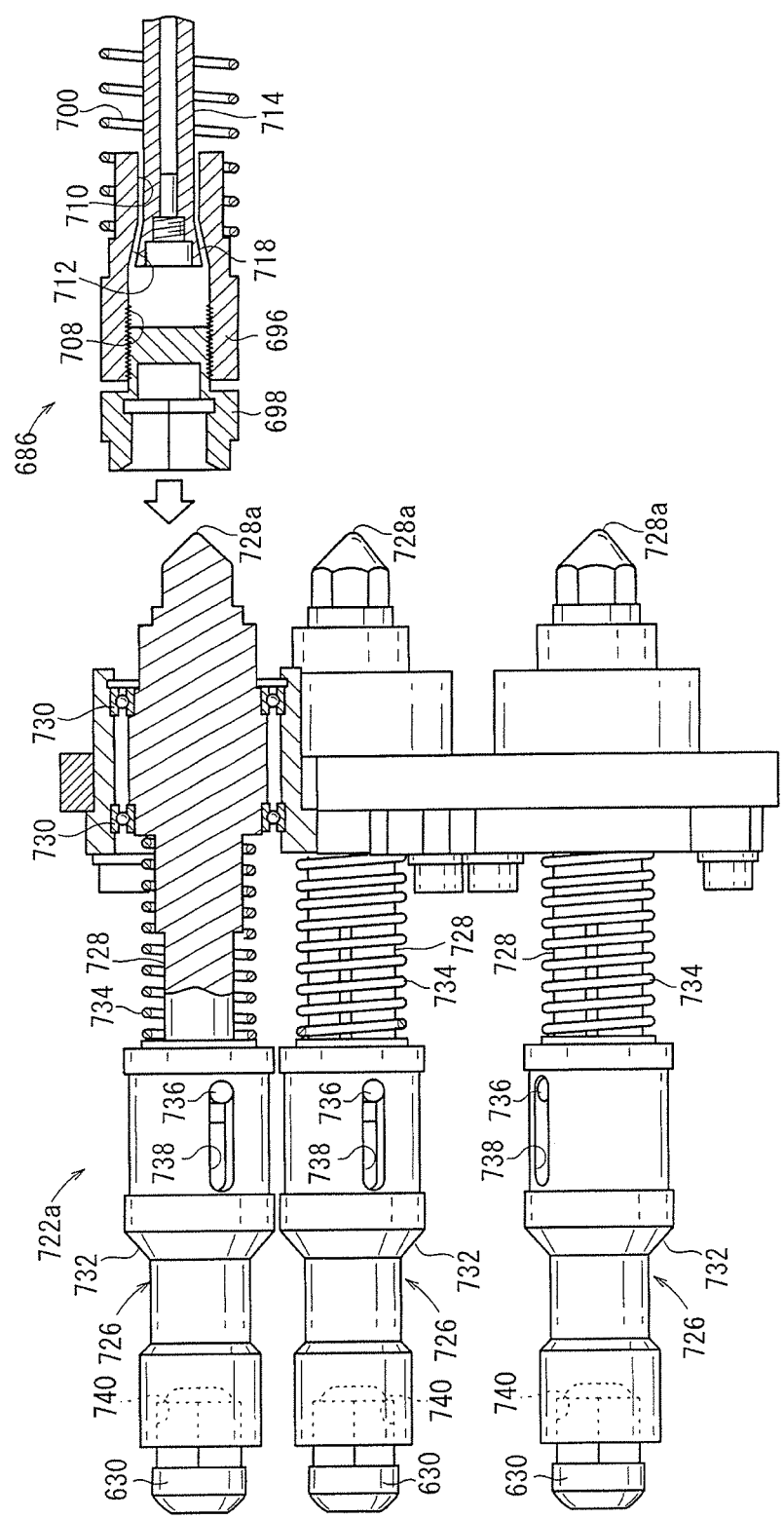
FIG. 35 is a view, partially in cross section, of a nut tightening unit of the first working mechanism and the rotational drive power transmitter according to the sixth embodiment.

As shown in FIG. 35, each of the nut tighteners 726 comprises a third rod 728, bearings 730, a wrench 732, and a helical spring 734.

The third rod 728 has an end 728a disposed in one of the opening guides 724 of the attachment plate 720 (see FIG. 36). The end 728a is tapered. When the end 728a is coupled to the tubular socket 698 of one of the rotational drive power transmitters 686 of the second working mechanism 624, rotational drive power can be transmitted from the second working mechanism 624 to the third rod 728. As a result, the third rod 728 is rotated while being supported by the bearings 730. The third rod 728 has two cylindrical protrusions 736 through which rotational drive power is transmitted from the third rod 728 to the wrench 732.

The wrench 732 has holes 738 defined therein. The respective protrusions 736 are received in the holes 738. The holes 738 extend in the longitudinal direction (axial direction) of the nut tightening unit 722a, and have a width that is slightly larger than the diameter of the protrusions 736. Therefore, the protrusions 736 can be displaced within the holes 738 along the axial direction of the nut tightening unit 722a. The wrench 732 has a recess 740 defined therein for receiving a nut 630. The recess 740 is substantially equal in cross-sectional shape to the nut 630. Therefore, when the recess 740 is rotated, the nut 630 that is received therein also is rotated.

The helical spring 734 is interposed between the third rod 728 and the wrench 732. The third rod 728 is limited against displacement along the axial direction of the nut tightening unit 722a. However, the wrench 732 can be displaced along the axial direction within a given range, in which the protrusions 736 are displaceable within the holes 738. Therefore, the helical spring 734 normally urges the wrench 732 to move away from the third rod 728. Upon rotation of the wrench 732, as the nut 630 is tightened onto the hub bolt 620, the wrench 732 is displaced away from the third rod 728. The nut 630 can therefore be tightened at a desired position on the hub bolt 620.

The lock mechanisms 654 and the stands 656a, 656b of the first working mechanism 622 will be described below with reference to FIGS. 36 through 39. As described above, the lock mechanisms 654 serve to secure the nut tightening unit 722a to the attachment plate 720. When the nut tightening unit 722a is unlocked from the attachment plate 720 through operation of the lock mechanisms 654, the nut tightening unit 722a can be detached from the attachment plate 720.

Figures 37A, 37B:
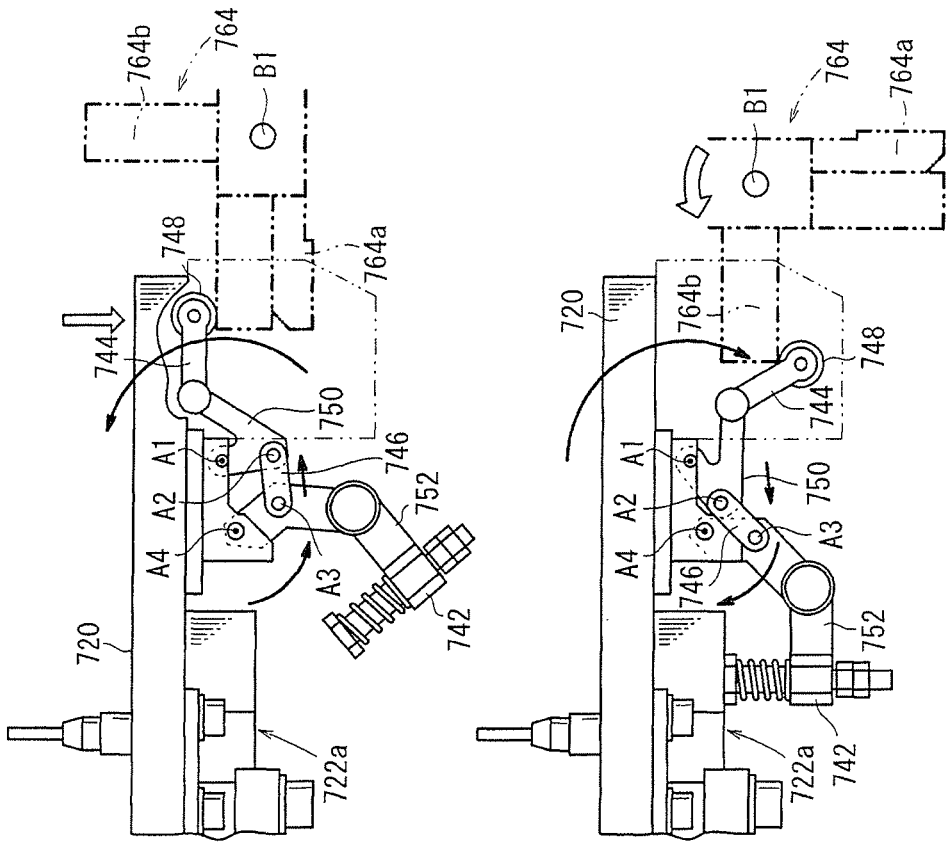
FIG. 37A is a front elevational view of the lock mechanism according to the sixth embodiment when the lock mechanism is not fixing the nut tightening unit.
FIG. 37B is a front elevational view of the lock mechanism according to the sixth embodiment when the lock mechanism fixes the nut tightening unit.

The lock mechanism 654 includes a stopper 742, a switching lever 744, and a link member 746 (only one lock mechanism 654 is shown in FIGS. 37A and 37B). The stopper 742 can selectively press the nut tightening unit 722a. When the stopper 742 presses the nut tightening unit 722a, the nut tightening unit 722a is secured to the attachment plate 720. If the stopper 742 does not press the nut tightening unit 722a, the nut tightening unit 722a can be detached from the attachment plate 720. The switching lever 744 changes the pressed state of the stopper 742 depending on the position thereof. The link member 746 cooperates with the switching lever 744 in order to keep the nut tightening unit 722a pressed by the stopper 742, or to keep the nut tightening unit 722a released from the stopper 742.

More specifically, the switching lever 744 includes a roller 748 disposed on one end, and a cam 750 disposed on the other end thereof. The switching lever 744 is bent at a substantially central region. The switching lever 744 is swingably supported by a first support shaft A1. The link member 746 has an end swingably supported on a second support shaft A2 via the cam 750. A bent member 752, which supports the stopper 742, is swingably supported on a third support shaft A3 on the other end of the link member 746. The bent member 752 also is swingably supported on a fourth support shaft A4.

Figure 38:
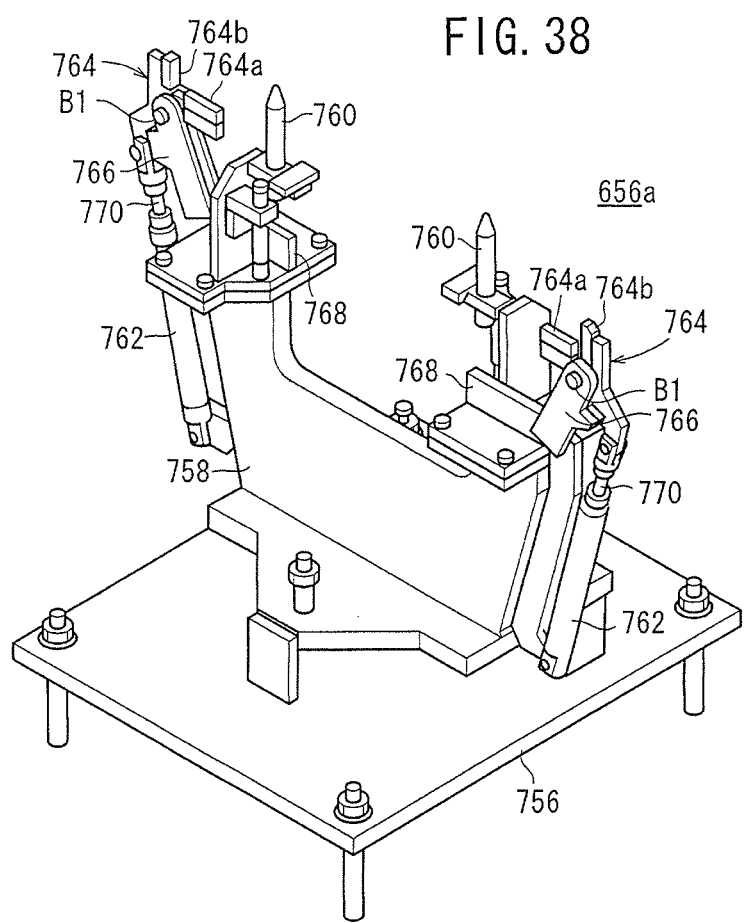
FIG. 38 is a perspective view of a stand for the nut tightening unit of the tire mounting apparatus according to the sixth embodiment.

FIG. 38 shows in perspective the stand 656a. The nut tightening unit 722a or 722b is not held on the stand 656a. As shown in FIG. 38, the stand 656a comprises a base 756, a substantially U-shaped holder plate 758, two positioning pins 760, two cylinders 762, substantially L-shaped engagement members 764 mounted respectively on distal ends of the cylinders 762 and having horizontal portions 764a and vertical portions 764b, and first support members 766 affixed to second support members 768, the engagement members 764 being swingably supported on the first support members 766 for swinging movement about support shafts B1. When pressers 770 of the cylinders 762 are elevated, the horizontal portions 764a and the vertical portions 764b are caused to swing about the support shafts B1.

Figure 39:
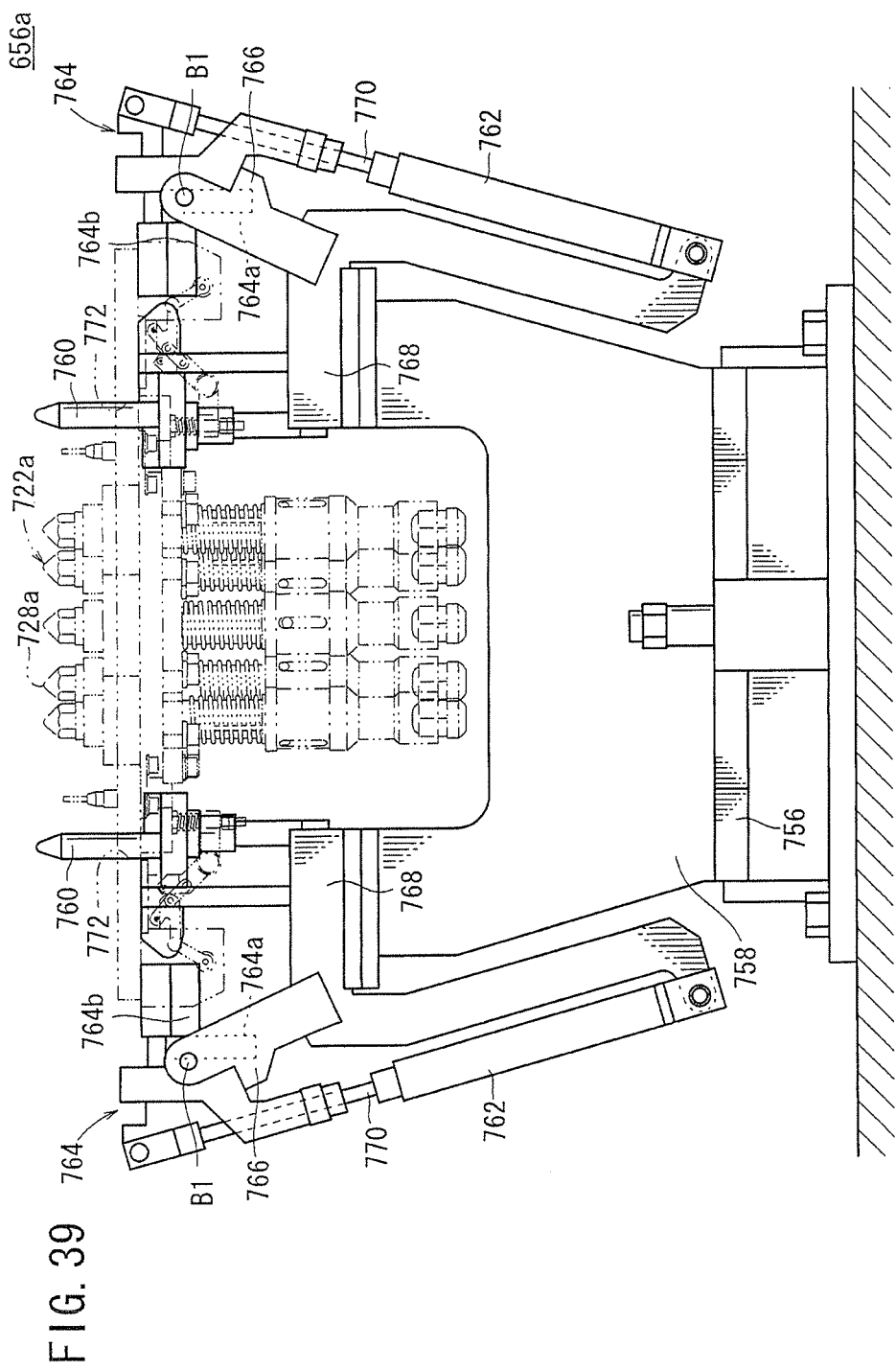
FIG. 39 is a front elevational view showing the manner in which the nut tightening unit is replaced using the stand for the nut tightening unit according to the sixth embodiment.

A process of replacing the nut tightening units 722a, 722b (a process of placing the nut tightening unit 722a on the stand 656a) will be described below with reference to FIG. 39. The nut tightening units 722a, 722b are replaced when the type of the motor vehicle on which the tires W are to be mounted is changed, and hence, the layout of the hub bolts 620 and the bolt holes Wa (FIG. 28) also is changed.

For replacing the nut tightening unit 722a with the nut tightening unit 722b, the nut tightening unit 722a, which presently is mounted on the first working mechanism 622, is detached from the attachment plate 720 and is placed on the stand 656a. More specifically, the arm 642 of the first working mechanism 622 is displaced so as to position the nut tightening unit 722a directly above the stand 656a. Then, the nut tightening unit 722a is vertically lowered until the positioning pins 760 engage within positioning holes 772 defined in the nut tightening unit 722a. Consequently, the nut tightening unit 722a is stabilized in position.

When the rollers 748 of the lock mechanisms 654 abut against the horizontal portions 764a of the engagement members 764 of the stand 656, the rollers 748 become displaced upwardly under the weight of the nut tightening mechanism 652 (see FIG. 37A). The stoppers 742 change from the pressing state to a releasing state, thereby allowing the nut tightening unit 722a to become detached from the attachment plate 720.

When the arm 642 of the first working mechanism 622 is moved upwardly, the nut tightening unit 722a remains placed on the stand 656a, but the nut tightening unit 722a is not mounted on the attachment plate 720.

Then, the arm 642 is moved to the stand 656b on which the other nut tightening unit 722b is placed, until the positioning pins 760 engage with the attachment plate 720. When the attachment plate 720 abuts against the nut tightening unit 722b, the cylinders 762 are actuated to turn the horizontal portions 764a and vertical portions 764b of the engagement members 764 about the support shafts B1. The vertical portions 764b displace the rollers 748 downwardly, thereby causing the stoppers 742 to secure the nut tightening unit 722b to the attachment plate 720. A tire W then is installed using the new nut tightening unit 722b. As described above, the nut tightening unit 722a and the nut tightening unit 722b differ from each other as to the layout of the nut tighteners 726 thereof. More specifically, the circles formed by the nut tighteners 726 have different diameters. Alternatively, the nut tightening unit 722a and the nut tightening unit 722b may differ from each other as to the size of the nuts 630 that are held by the nut tighteners 726, or the number of nut tighteners 726.

Figure 40:
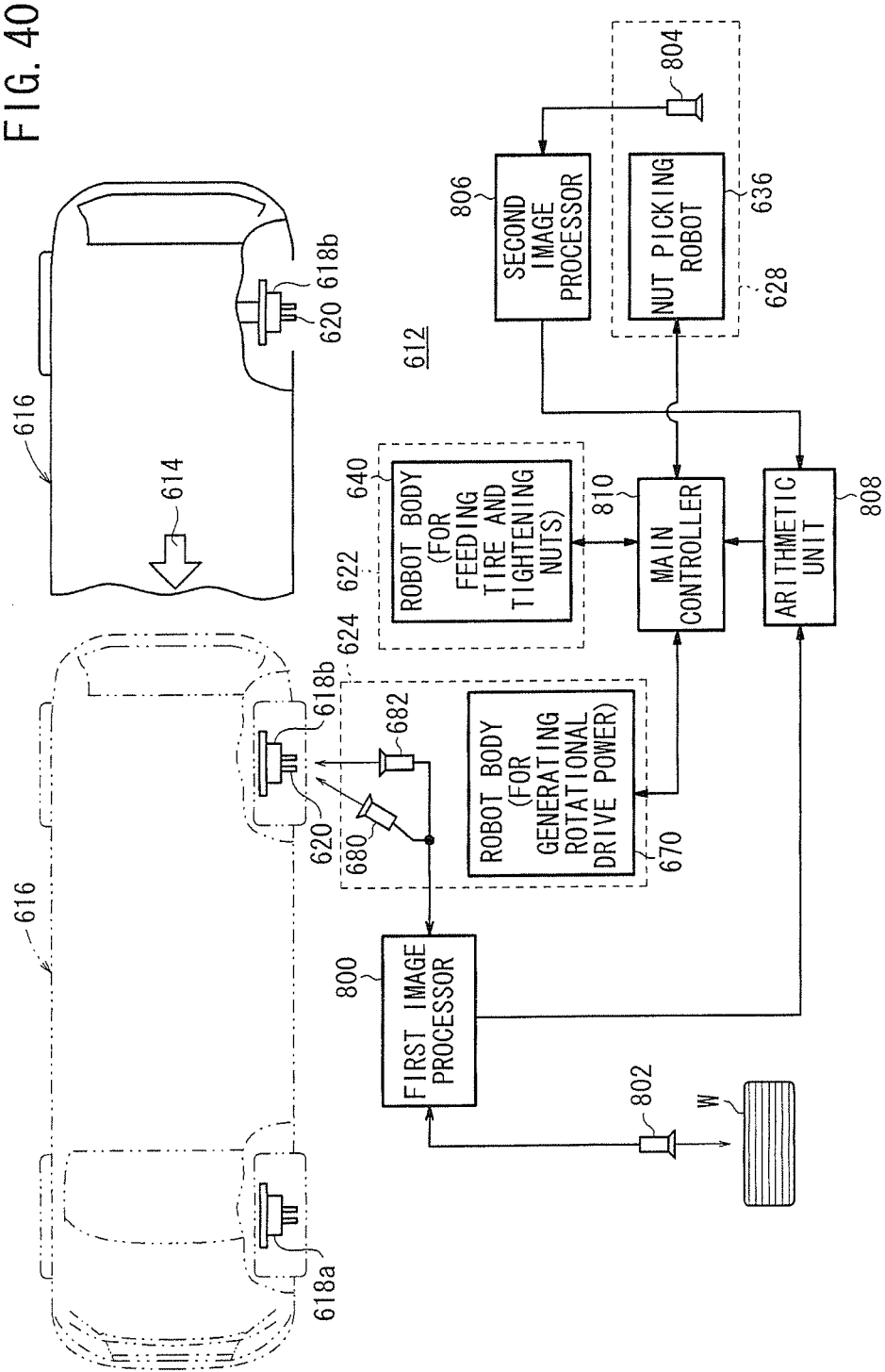
FIG. 40 is a block diagram of a control system of the tire mounting apparatus according to the sixth embodiment.

FIG. 40 shows a control system of the tire mounting apparatus 612. As shown in FIG. 40, cameras 680, 682 of the second working mechanism 624 output image information of the first mounting region 618a and the second mounting region 618b to a first image processor 800.

The first image processor 800 also is supplied with image information of a tire W (bolt holes Wa of the tire W) from a camera 802 (bolt hole detection sensor), which captures an image of the tire W placed on the tire charging conveyor 626.

A camera 804 for capturing an image of the nuts 630 arrayed on the nut table 634 is fixedly positioned near the nut picking robot 636 of the nut supply mechanism 628. Image information of the nuts 630, which is captured by the camera 804, is input to a second image processor 806.

The first image processor 800 is connected to an arithmetic unit 808. The arithmetic unit 808 calculates relative positions of the hub bolts 620 in the first mounting region 618a, the hub bolts 620 in the second mounting region 618b, and bolt holes Wa of a tire W on the tire charging conveyor 626. The arithmetic unit 808 then outputs the calculated relative positions to a main controller (control mechanism) 810. The second image processor 806 is connected to the arithmetic unit 808 and processes the image information of the nuts 630, which is captured by the camera 804, and outputs the processed image information to the main controller 810.

Based on the processed image information that is input from the arithmetic unit 808, the position information of the first working mechanism 622 (position information of the arm 672, position information of the gripper arms 662, etc.), and the position information of the second working mechanism 624 (position information of the arm 672, position information of the rotational drive power transmitters 686, etc.), the main controller 810 controls operation of the first working mechanism 622, and also controls operation of the second working mechanism 624 and the nut supply mechanism 628.

Figure 41:
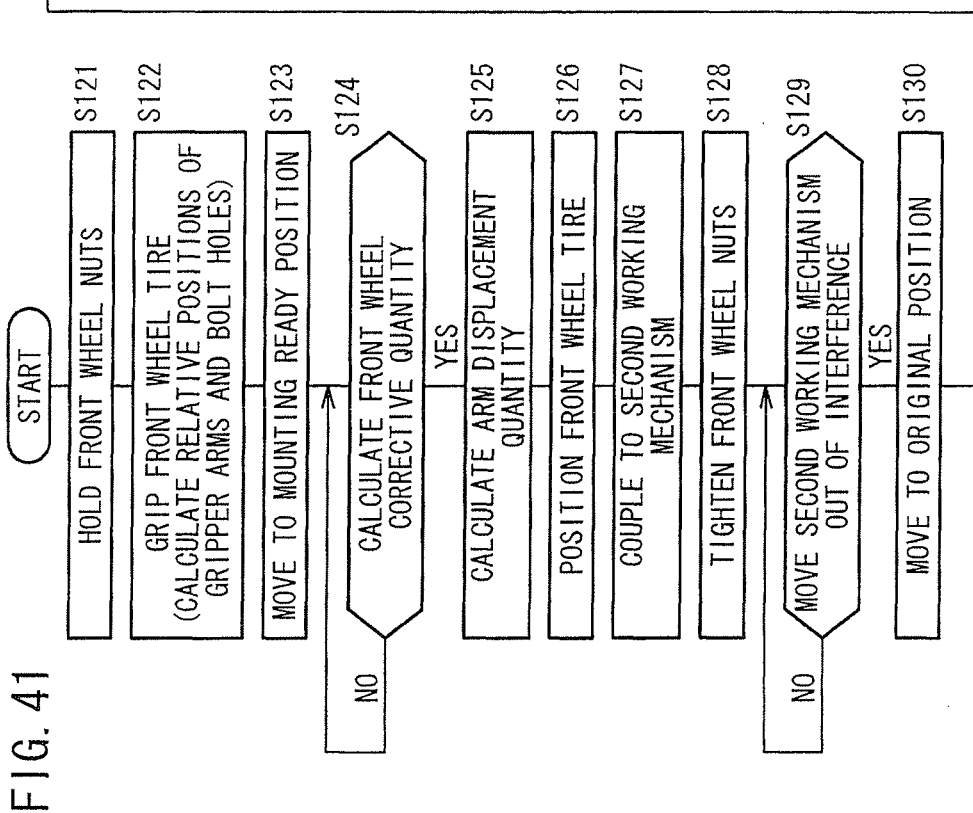
FIG. 41 is a flowchart of an operation sequence primarily of the first working mechanism according to the sixth embodiment.

The tire mounting apparatus 612 according to the sixth embodiment is constructed as described above. Operation of the tire mounting apparatus 612 will be described with reference to the flowcharts shown in FIGS. 41 and 42, and the timing chart shown in FIG. 43. FIG. 41 shows an operation sequence primarily of the first working mechanism 622, and FIG. 42 shows an operation sequence primarily of the second working mechanism 624. FIG. 43 shows the relationship between operation sequences of the first working mechanism 622, the second working mechanism 624, and the nut supply mechanism 628.

First, the operation sequence primarily of the first working mechanism 622 will be described below. In step S121 shown in FIG. 41, the first working mechanism 622 causes the five wrenches 732 to hold five nuts 630 arrayed on the nut table 634.

Then, in step S122, the tire gripping mechanism 650 grips a tire W on the tire charging conveyor 626. More specifically, while the tire W is positioned between the two gripper arms 662 of the tire gripping mechanism 650, the linear guide 660 is actuated by the motor, not shown. The two gripper arms 662 are moved toward each other in order to grip an outer circumferential surface (ground contact surface) of the tire W.

When gripping the tire W, the two gripper arms 662 are positioned to hold positions (rotational phases) of the bolt holes Wa of the tire W in alignment with positions (rotational phases) of the nut tighteners 726 of the nut tightening mechanism 652. As a result, the nuts 630 are positioned in alignment with respective bolt holes Wa of the tire W.

For example, the above positioning process is performed as follows: The main controller 810 detects positions of the bolt holes Wa of the tire W as well as positions of the nut tighteners 726. The main controller 810 detects the positions of the bolt holes Wa based on image information supplied from the camera 802. The main controller 810 detects the positions of the nut tighteners 726 based on the position of the two gripper arms 662 or the position of the index base 646, which supports the gripper arms 662, because the two gripper arms 662 and the nut tighteners 726 occupy fixed relative positions. Then, the index base 646 is moved into a position where the positions of the bolt holes Wa and the positions of the nut tighteners 726 are in alignment with each other, thereby positioning the gripper arms 662. Since the gripping positions of the gripper arms 662 and the bolt holes Wa of the tire W are associated with each other, the positions of the bolt holes Wa can be known by recognizing the positions of the gripper arms 662 and the position of the index base 646.

In step S123, the first working mechanism 622, which has gripped the nuts 630 and the tire W, moves to a mounting ready position as the robot body 640 is turned. At this time, the automobile body 616 has a first mounting region 618a on the front wheel side thereof positioned in the tire mounting station. In the tire mounting station, the two gripper arms 662 are vertically juxtaposed.

More specifically, based on the position information of the arm 642, and the position information of the gripper arms 662, etc., the main controller 810 positions one of the gripper arms 662 such that the gripper arm 662 grips the tire W on an uppermost region of the tire W (a position corresponding to a position Pu1 in FIG. 44), and positions the other gripper arm 662 such that the gripper arm 662 grips the tire W on a lowermost region of the tire W (a position corresponding to a position Pl1 in FIG. 44).

With the first working mechanism 622 in the mounting ready position, the cameras 680, 682 of the second working mechanism 624 acquire image information concerning the first mounting region 618a (hereinafter also referred to as "front wheel image information"). Based on the front wheel image information, the first image processor 800 calculates a corrective quantity for the hub bolts 620 with respect to a reference position (step S124: YES). In step S125, the main controller 810 calculates a quantity by which the gripper arms 662 that grip the tire W are to be displaced (hereinafter referred to as an "arm displacement quantity"). The arm displacement quantity includes displacement quantities of the gripper arms 662 in an X-axis direction, a Y-axis direction, and a Z-axis direction (see FIG. 28), as well as a rotational angle of the tire W. The rotational angle of the tire W represents an angle through which the tire W is rotated by the gripper arms 662 in order to bring positions (rotational phases) of the hub bolts 620 into alignment with positions (rotational phases) of the bolt holes Wa when the center O of the tire W agrees with the center of the circle represented by the hub bolts 620 along the Y direction in FIG. 28. The rotational angle is calculated as an angle through which the tire W is rotated about the center O thereof.

According to the sixth embodiment, the main controller 810 limits the rotational angle of the tire W to ±36° (see FIG. 44) for the following reasons: The bolt holes Wa are positioned at equal angles along the circle represented thereby. The bolt hole Wa, which is disposed in the uppermost position along the height of the motor vehicle (along the Z direction in FIG. 28), resides in a range between certain positive and negative angles on the circle from the uppermost position on the circle. Since the angle between two adjacent bolt holes Wa is calculated by dividing 360° by the number of bolt holes Wa, the positive and negative angles referred to above are of positive and negative values, each of which is produced by dividing the angle between adjacent two bolt holes Wa by 2 (an angle produced by dividing 180° by the number of bolt holes Wa). Since the number of bolt holes Wa is five in the sixth embodiment, the certain positive and negative angles referred to above are ±36°. Therefore, even if the rotational angle of the tire W is limited to ±36° at maximum, it is still possible to bring the positions (rotational phases) of the hub bolts 620 and the bolt holes Wa into alignment with each other.

In order to bring the positions (rotational phases) of the hub bolts 620 and the bolt holes Wa into alignment with each other while also limiting the rotational angle of the tire W to ±36°, the following process is performed: Positions (rotational phases) of the hub bolts 620 are determined from the image information produced by the cameras 680, 682 of the second working mechanism 624. For example, a hypothetical axis Z1 is established, which extends from the center of the circle represented by the hub bolts 620 along the height direction (the Z direction shown in FIG. 28). Then, one of the five hub bolts 620, which is highest in position, is detected, and the position (rotational phase) thereof is determined based on which side of the hypothetical axis Z1 the hub bolt 620 is positioned, and the distance of the hub bolt 620 from the hypothetical axis Z1.

Positions (rotational phases) of the bolt holes Wa can be determined from the relative positions of the gripper arms 662 and the bolt holes Wa, as calculated in step S122.

In step S126, the main controller 810 displaces the gripper arms 662 based on the arm displacement quantity calculated in step S125, thereby positioning the tire W in the first mounting region 618a. Consequently, tire W is disposed in a position where the tire W waits for the nuts 630 to be tightened.

According to the sixth embodiment, as described above, the gripper arms 662 grip the uppermost and lowermost portions of the tire W, and the rotational angle of the tire W is limited to ±36° in the mounting ready position. As shown in FIG. 44, one of the gripper arms 662, which grips an upper portion of the tire W, grips a portion of the ground contact surface of the tire W that has a symmetric axis represented by a hypothetical axis Z2 (which is aligned with the hypothetical axis Z1) extending through the center O of the tire W and the uppermost region Pu1, and which corresponds to a first central angle β1 of 72°. Similarly, one of the gripper arms 662, which grips a lower portion of the tire W, grips a portion of the ground contact surface of the tire W that has a symmetric axis represented by the hypothetical axis Z2, and which corresponds to a second central angle β2 of 72°. Stated otherwise, in the sixth embodiment, the ranges of the ground contact surfaces that can be gripped by the gripper arms 662 represent the upper and lower portions of the tire W, whereas the rotational angle of the tire W is limited to ±36°.

The gripper arm 662, which grips the upper portion of the tire W, is displaced in a clearance 822 between a fender 820 of the automobile body 616 and the tire W.

In order to limit the positions where the gripper arms 662 grip the tire W to within the above range, the gripper arms 662 may not grip the uppermost and lowermost portions of the tire W in the mounting ready position. When the tire W is positioned with respect to the automobile body 616, the tire W may be rotated in order to limit positions where the gripper arms 662 grip the tire W so as to lie within the above range.

The above limitation on the gripping positions is not effective if the number of bolt holes Wa or hub bolts 620 is small (specifically, 3 or smaller). The above limitation should preferably be imposed only if the number of bolt holes Wa or hub bolts 620 is 4 or greater.

When positioning of the tire W has been completed, in step S127, the main controller 830 couples the second working mechanism 624 to the first working mechanism 622. More specifically, the main controller 830 brings the tubular sockets 698 of the rotational drive power generator 678 of the second working mechanism 624 into engagement with third rods 728 of the nut tightening mechanism 652 of the first working mechanism 622. In step S128, the second working mechanism 624 transmits rotational drive power to the first working mechanism 622 in order to tighten the nuts 630 onto the hub bolts 620. More specifically, the rotational drive power generator 678 transmits rotational drive power to the nut tightening mechanism 652. The wrenches 732 of the first working mechanism 622 are rotated in order to tighten the nuts 630 held by the wrenches 732 on the hub bolts 620. While the nuts 630 are tightened, the gripper arms 662 are fixed in position and kept within the above limited range.

After the tire W has been mounted as a front wheel in the first mounting region 618a, the second working mechanism 624 is moved out of interference (step S129: YES). In step S130, the robot body 640 of the first working mechanism 622 is moved away from the first mounting region 618a toward its original position near the nut table 634.

The above process performed in the first mounting region 618a also is performed in the second mounting region 618b. In other words, steps S131 through S140, which are similar to steps S121 through S130, are performed for the second mounting region 618b. In steps S130 through S134, as shown in FIG. 28, the automobile body 616 is intermittently fed along the feed path 614 in the X direction. The second mounting region 618b on the rear wheel side of the automobile body 616 is now positioned in the tire mounting station.

After mounting of the tire W in the second mounting region 618b has been completed, the same process described above will be performed on another automobile body 616.

The operation sequence primarily of the second working mechanism 624 will be described below with reference to FIG. 42.

The robot body 670 of the second working mechanism 624 is operated in order to position the cameras 680, 682 in the tire mounting station. When the first mounting region 618a on the front wheel side of the automobile body 616 is placed in the tire mounting station (step S151: YES), in step S152, the cameras 680, 682 read image information of front wheel hub bolts 620 in the first mounting region 618a.

In step S153, image information read by the cameras 680, 682 is output to the first image processor 800, which calculates a corrective quantity for the hub bolts 620 with respect to a reference position. For example, a hypothetical axis Z1 extending from the center of the circle represented by five hub bolts 620 along the height of the automobile body 616 may be assumed, and one of the five hub bolts 620, which is the highest in position on the hypothetical axis Z1, may be regarded as a reference position. The corrective quantity is output from the arithmetic unit 808 to the main controller 810.

In step S154, the second working mechanism 624 moves to a position out of interference with the operation sequence of the first working mechanism 622 in the first mounting region 618a. If positioning of the tire W by the first working mechanism 622 has been completed (step S155: YES), then in step S156, the second working mechanism 624 is coupled to the first working mechanism 622. More specifically, the rotational drive power transmitters 686 of the second working mechanism 624 are coupled to nut tighteners 726 of the first working mechanism 622.

In step S157, the motor 684 of the second working mechanism 624 generates rotational drive power, which is transmitted via the rotational drive power transmitters 686 to the nut tighteners 726. The nuts 630 are tightened onto the hub bolts 620, thereby mounting the tire W in the first mounting region 618a. While the number of rotational drive power transmitters 686 is 2, the number of nut tighteners 726 is 5. Therefore, the rotational drive power transmitters 686 are coupled to the nut tighteners 726 a plurality of times (i.e., two nuts 630, two nuts 630, and one nut 630 are successively tightened onto the hub bolts 620).

After the tire W has been mounted in the first mounting region 618a, in step S158, the second working mechanism 624 moves out of interference. In step S159, the second working mechanism 624 moves to a rear wheel hub bolt detecting position. In step S160, the second working mechanism 624 detects whether or not the automobile body 616 has been fed a half pitch along the feed path 614.

If it is judged that the automobile body 616 has been fed a half pitch (step S160: YES), i.e., if it is judged that the second mounting region 618b on the rear wheel side has been placed in the tire mounting station, then steps S161 through S167, which are the same as steps S152 through S158, are executed for the second mounting region 618b. In step S168, the second working mechanism 624 moves to a front hub bolt position.

After mounting of a tire W in the second mounting region 618b has been completed, the same process as described above will be performed on another automobile body 616.

As shown in FIG. 43, using the nut chuck 638, the nut supply mechanism 628 repeats the process of feeding front wheel nuts 630 from the nut stock 632 to the nut table 634 and arraying the front wheel nuts 630 on the nut table 634, and also repeats the process of feeding rear wheel nuts 630 from the nut stock 632 to the nut table 634 and arraying the rear wheel nuts 630 on the nut table 634.

Since the assembly line 610 includes the tire mounting apparatus 612, disposed one on each side of the automobile body 616, the same operations described above are performed substantially simultaneously on each side.

The nut tightening unit 722a or 722b is replaced depending on the positions of the hub bolts 620 and the bolt holes Wa. For example, the main controller 810 determines whether, based on the image information produced by the first image processor 600, the positions of the bolt holes Wa are different from the position of the nut tightening unit 722a or 722b currently in use. If the positions are different, the main controller 810 may replace one of the nut tightening units 722a, 722b with the other.

According to the sixth embodiment, as described above, in the tire positioning process (S126, S166 in FIG. 41) and the nut tightening process (S128, S138 in FIG. 41 and S157, S166 in FIG. 42), the positions where the pair of gripper arms 662 grip the tire W are limited to upper and lower portions of the tire W. Consequently, a tire W can relatively easily be installed on the automobile body 616, even if the clearance 822 between the tire W and the fender 820 is small.

More specifically, when the tire W is not in contact with the ground, the tire W, the first mounting region 618a, and the second mounting region 618b are biased by suspensions, not shown, and are positioned lower than when the tire W is in contact with the ground, because the tire W is not subject to reactive forces from the ground. Therefore, before the tire W is mounted, the clearance 822 between the first mounting region 618a and the second mounting region 618b (particularly upper portions thereof) and the fender 820 is greater than the clearance 822 after the tire W is mounted and held in contact with the ground. According to the sixth embodiment, during the process of positioning a tire in a tire mounting region (tire positioning process) and the process of tightening nuts 630 on the hub bolts 620 (nut tightening process), positions where the pair of gripper arms 662 grip the tire W are limited to upper and lower portions of the tire W. When the tire W is in contact with the ground, even if the clearances between left, right, and upper portions of the tire W and the fender 820 are small, thus making it difficult for the tire W to be gripped with either of the gripper arms 662, it is still possible to grip the tire W in the clearance 822, and hence the tire W can be mounted on the motor vehicle relatively easily.

According to the sixth embodiment, the rotational axis Y1, along which rotational drive power for tightening the nuts 630 is transmitted, is offset from the rotational axis Y2. Therefore, it is possible to transmit rotational drive power to the nut tighteners 726 of the nut tightening units 722a, 722b, where the nut tighteners 726 are positioned in different layouts. Rotational drive power, which is needed to tighten the nuts 630 with the nut tightening units 722a, 722b, can thus be supplied from the single rotational drive power generator 678. Stated otherwise, even though a plurality of rotational drive power generators 678 are not provided, tires W can still be mounted on a plurality of automobile bodies 616 in which hub bolts 620 and bolt holes Wa have different layouts, by replacing one of the nut tightening units 722a, 722b with the other. Accordingly, the tire mounting apparatus can be reduced in size and cost overall.

The third rods 728 of the first working mechanism 622 have tapered ends 728a, and the rotational drive power transmitters 686 of the second working mechanism 624 have the tubular sockets 698. When the ends 728a engage in the tubular sockets 698, rotational drive power can be transmitted therebetween. Even if the rotational axis Y1 of the rotational drive power transmitters 686 and the rotational axis Y2 of the third rods 728 become offset from each other, the tubular sockets 698 of the second working mechanism 624 and the third rods 728 of the first working mechanism 622 engage with each other, thus making it possible to transmit rotational drive power.

According to the sixth embodiment, furthermore, the first working mechanism 622 grips a tire W and tightens nuts 630. The second working mechanism 624 generates rotational drive power for tightening the nuts 630, and transmits rotational drive power to the nut tightening mechanism 652 of the first working mechanism 622 in order to tighten the nuts 630. Consequently, the first working mechanism 622 and the second working mechanism 624 are effectively made smaller and simpler than if the tire W were gripped and the nuts 630 were tightened only by a single working mechanism. Since the tire W is gripped and the nuts 630 are tightened by a single working mechanism (the first working mechanism 622), the tire W and the nuts 630 are less likely to change their relative positions, thus making it possible to easily identify positions where the nuts 630 are to be tightened.

The first working mechanism 622 places a plurality of nuts 630 in association with respective hub bolts 620, and performs the nut tightening process (S128, S138 in FIG. 41, and S157, S166 in FIG. 42) while the tire gripping mechanism 650 is fixed in position. In the nut tightening process, therefore, it is possible to keep the first working mechanism 622 in a constant attitude, and to control the first working mechanism 622 with ease.

The second working mechanism 624 includes the rotational drive power transmitters 686 (tubular sockets 698) for transmitting rotational drive power. The nut tightening mechanism 652 of the first working mechanism 622 includes the third rod 728, the bearings 730, the wrench 732, and the helical spring 734, for each of the hub bolts 620. Thus, it is easy to tighten the nuts 630 with the nut tightening mechanism 652 while the tire W is fixed in position by the tire gripping mechanism 650.

The present invention is not limited to the above embodiments, but may incorporate and employ various additional structural details based on the content of the above description.

The invention claimed is:

1. A tire mounting method for automatically mounting a tire onto hub bolts of a motor vehicle, comprising the steps of:
   gripping the tire and temporarily tightening nuts on the hub bolts on which the tire has been placed with a first working mechanism;
   after the tire is set to a first mounting region by the first working mechanism, fully tightening the nuts that have been temporarily tightened by the first working mechanism with a second working mechanism, which is disposed in association with the first mounting region on a front wheel side of the motor vehicle, and has a base arm and an arm separate and distinct from the first working mechanism; and
   after the tire is set to a second mounting region by the first working mechanism, fully tightening the nuts that have been temporarily tightened by the first working mechanism with a third working mechanism, which is disposed in association with the second mounting region on the rear wheel side of the motor vehicle, and has a base arm and an arm separate and distinct from the first working mechanism and the second working mechanism,
   wherein all of the first working mechanism, the second working mechanism, and the third working mechanism are positioned on a same side of the motor vehicle when viewed along a direction in which the motor vehicle is conveyed, and the first working mechanism is disposed between the second working mechanism and the third working mechanism.

2. The tire mounting method according to claim 1, wherein the first working mechanism, the second working mechanism, and the third working mechanism operate out of interference with each other.

3. The tire mounting method according to claim 1, further comprising the steps of:
   detecting positions of the hub bolts in the first mounting region with the second working mechanism; and
   detecting positions of the hub bolts in the second mounting region with the third working mechanism.

4. The tire mounting method according to claim 3, further comprising the steps of:
   detecting bolt holes of the tire, which is disposed in a tire supply; and
   controlling operation of the first working mechanism based on the positions of the hub bolts in the first mounting region and the second mounting region, and positions of the bolt holes of the tire.

* * * * *